(12) United States Patent
Ibukuro et al.

(10) Patent No.: US 6,697,546 B2
(45) Date of Patent: Feb. 24, 2004

(54) OPTICAL NODE SYSTEM AND SWITCHED CONNECTION METHOD

(75) Inventors: Sadao Ibukuro, Kawasaki (JP); Junichi Yoshimura, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 09/748,863

(22) Filed: Dec. 28, 2000

(65) Prior Publication Data

US 2001/0024540 A1 Sep. 27, 2001

(30) Foreign Application Priority Data

Mar. 21, 2000 (JP) ........................................ 2000-078949

(51) Int. Cl.[7] ................................................. G02B 6/35
(52) U.S. Cl. ............................. 385/16; 385/17; 385/18; 398/56; 398/111
(58) Field of Search ............................. 385/16, 17, 18, 385/24; 359/110, 119, 124; 398/56, 111

(56) References Cited

U.S. PATENT DOCUMENTS

| | | | | |
|---|---|---|---|---|
| 5,086,349 A | * | 2/1992 | Okayama et al. | 359/124 |
| 5,903,371 A | * | 5/1999 | Arecco et al. | 359/119 |
| 5,978,120 A | * | 11/1999 | Dumortier | 359/140 |
| 6,266,168 B1 | * | 7/2001 | Denkin et al. | 359/110 |
| 6,321,004 B1 | * | 11/2001 | Duerksen et al. | 385/24 |
| 6,456,406 B1 | * | 9/2002 | Arecco et al. | 359/119 |

FOREIGN PATENT DOCUMENTS

JP    A-9-74577    3/1997

* cited by examiner

Primary Examiner—John D. Lee
Assistant Examiner—Jennifer Doan
(74) Attorney, Agent, or Firm—Staas & Halsey LLP

(57) ABSTRACT

A protection switch is configured for an input optical signal using an n×n optical switch. Furthermore, a signal to be added and dropped is also configured using an n×n optical switch. Especially, the n×n optical switch uses a complete group switch. Thus, a signal can be output from any input port to any output port. Therefore, a more extensible NPE can be configured at an optical signal level, and a switch is simple and less expensive. As a result, unlike the conventional technology, an NPE itself can be simple and less expensive.

16 Claims, 52 Drawing Sheets

STATE OF OPTICAL INTENSITY MONITOR

|  | STATE 1 | STATE 2 | STATE 3 |
|---|---|---|---|
| High level MONITOR | ○ | ○ | × |
| Low level MONITOR | ○ | × | × |
| STATE INDICATION | ○ | △ | × |

FIG. 10

ADD SIDE SWITCH DETERMINATION TABLE

| STATE | LINE SELECTION | 2:1 SELECTOR | MONITOR DETECTION AND DETERMINATION |
|---|---|---|---|
| 1 | WORK | SYSTEM 0 | FIG. 12 |
| 2 |  | SYSTEM 1 | FIG. 13 |
| 3 | PROTECTION | SYSTEM 0 | FIG. 14 |
| 4 |  | SYSTEM 1 | FIG. 15 |

FIG. 11

| NUMBER | $M_{3W}$ | $M_{02W}$ | $M_{01}$ | DETERMINATION | SWITCH-TO TARGET |
|---|---|---|---|---|---|
| 1 | ○ | ○ | ○ | FAULT IN TRANSMISSION LINE BETWEEN ONPE AND TRANSPONDER | SWITCH TO STATE 3 WITH PROTECTION AS LINE SELECTION |
| 2 | △ | ○ | ○ | FAULT IN 2:1 SELECTOR | SWITCH TO STATE 3 WITH PROTECTION AS LINE SELECTION |
| 3 | × | ○ | ○ | FAULT IN 2:1 SELECTOR | SWITCH TO STATE 3 WITH PROTECTION AS LINE SELECTION |
| 4 | ○ | △ | ○ | FAULT IN TRANSMISSION LINE BETWEEN ONPE AND TRANSPONDER | SWITCH TO STATE 3 WITH PROTECTION AS LINE SELECTION |
| 5 | △ | △ | ○ | FAULT IN 4n×4n SW | SWITCH TO STATE 2 WITH 2:1 SELECTOR SET TO SYSTEM 1 |
| 6 | × | △ | ○ | FAULT IN 4n×4n SW | SWITCH TO STATE 2 WITH 2:1 SELECTOR SET TO SYSTEM 1 |
| 7 | ○ | × | ○ | FAULT IN MONITOR OF $M_{3W}$. MONITOR OF $M_{02W}$ IS CORRECT. | SWITCH TO STATE 2 WITH 2:1 SELECTOR SET TO SYSTEM 1 |
| 8 | △ | × | ○ | FAULT IN 4n×4n SW | SWITCH TO STATE 2 WITH 2:1 SELECTOR SET TO SYSTEM 1 |
| 9 | × | × | ○ | FAULT IN 4n×4n SW | SWITCH TO STATE 2 WITH 2:1 SELECTOR SET TO SYSTEM 1 |
| 10 | ○ | ○ | △ | FAULT IN TRANSMISSION LINE BETWEEN ONPE AND TRANSPONDER | SWITCH TO STATE 3 WITH PROTECTION AS LINE SELECTION |
| 11 | △ | ○ | △ | FAULT IN CLIENT SYSTEM 0 (INCLUDING TRANSMISSION LINE) | SWITCH TO STATE 2 WITH 2:1 SELECTOR SET TO SYSTEM 1 |
| 12 | × | ○ | △ | FAULT IN 2:1 SELECTOR | SWITCH TO STATE 3 WITH PROTECTION AS LINE SELECTION |
| 13 | ○ | △ | △ | FAULT IN TRANSMISSION LINE BETWEEN ONPE AND TRANSPONDER | SWITCH TO STATE 3 WITH PROTECTION AS LINE SELECTION |
| 14 | △ | △ | △ | FAULT IN CLIENT SYSTEM 0 (INCLUDING TRANSMISSION LINE) | SWITCH TO STATE 2 WITH 2:1 SELECTOR SET TO SYSTEM 1 |
| 15 | × | △ | △ | FAULT IN CLIENT SYSTEM 0 (INCLUDING TRANSMISSION LINE) | SWITCH TO STATE 2 WITH 2:1 SELECTOR SET TO SYSTEM 1 |
| 16 | ○ | × | △ | FAULT IN MONITOR OF $M_{3W}$. $M_{02W}$, $M_{3W}$. MONITOR OF $M_{01}$ IS CORRECT | SWITCH TO STATE 2 WITH 2:1 SELECTOR SET TO SYSTEM 1 |
| 17 | △ | × | △ | FAULT IN CLIENT SYSTEM 0 (INCLUDING TRANSMISSION LINE) | SWITCH TO STATE 2 WITH 2:1 SELECTOR SET TO SYSTEM 1 |
| 18 | × | × | △ | FAULT IN CLIENT SYSTEM 0 (INCLUDING TRANSMISSION LINE) | SWITCH TO STATE 2 WITH 2:1 SELECTOR SET TO SYSTEM 1 |
| 19 | ○ | ○ | × | FAULT IN MONITOR OF $M_{02W}$, $M_{3W}$. MONITOR OF $M_{01}$ IS CORRECT | SWITCH TO STATE 2 WITH 2:1 SELECTOR SET TO SYSTEM 1 |
| 20 | △ | ○ | × | FAULT IN MONITOR OF $M_{02W}$. MONITOR OF $M_{01}$ IS CORRECT | SWITCH TO STATE 2 WITH 2:1 SELECTOR SET TO SYSTEM 1 |
| 21 | × | ○ | × | FAULT IN MONITOR OF $M_{3W}$. MONITOR OF $M_{01}$ IS CORRECT | SWITCH TO STATE 2 WITH 2:1 SELECTOR SET TO SYSTEM 1 |
| 22 | ○ | △ | × | FAULT IN MONITOR OF $M_{3W}$. MONITOR OF $M_{01}$ IS CORRECT | SWITCH TO STATE 2 WITH 2:1 SELECTOR SET TO SYSTEM 1 |
| 23 | △ | △ | × | FAULT IN CLIENT SYSTEM 0 (INCLUDING TRANSMISSION LINE) | SWITCH TO STATE 2 WITH 2:1 SELECTOR SET TO SYSTEM 1 |
| 24 | × | △ | × | FAULT IN CLIENT SYSTEM 0 (INCLUDING TRANSMISSION LINE) | SWITCH TO STATE 2 WITH 2:1 SELECTOR SET TO SYSTEM 1 |
| 25 | ○ | × | × | FAULT IN MONITOR OF $M_{3W}$. MONITOR OF $M_{01}$ IS CORRECT | SWITCH TO STATE 2 WITH 2:1 SELECTOR SET TO SYSTEM 1 |
| 26 | △ | × | × | FAULT IN CLIENT SYSTEM 0 (INCLUDING TRANSMISSION LINE) | SWITCH TO STATE 2 WITH 2:1 SELECTOR SET TO SYSTEM 1 |
| 27 | × | × | × | FAULT IN CLIENT SYSTEM 0 (INCLUDING TRANSMISSION LINE) | SWITCH TO STATE 2 WITH 2:1 SELECTOR SET TO SYSTEM 1 |

F I G. 1 2

| NUMBER | $M_{3W}$ | $M_{12W}$ | $M_{11}$ | DETERMINATION | SWITCH-TO TARGET |
|---|---|---|---|---|---|
| 1 | O | O | O | FAULT IN TRANSMISSION LINE BETWEEN ONPE AND TRANSPONDER | SWITCH TO STATE 4 WITH PROTECTION AS LINE SELECTION |
| 2 | △ | O | O | FAULT IN 2:1 SELECTOR | SWITCH TO STATE 4 WITH PROTECTION AS LINE SELECTION |
| 3 | × | O | O | FAULT IN 2:1 SELECTOR | SWITCH TO STATE 4 WITH PROTECTION AS LINE SELECTION |
| 4 | O | △ | O | FAULT IN TRANSMISSION LINE BETWEEN ONPE AND TRANSPONDER | SWITCH TO STATE 4 WITH PROTECTION AS LINE SELECTION |
| 5 | △ | △ | O | FAULT IN 4n×4n SW | SWITCH TO STATE 1 WITH 2:1 SELECTOR SET TO SYSTEM 1 |
| 6 | × | △ | O | FAULT IN 4n×4n SW | SWITCH TO STATE 1 WITH 2:1 SELECTOR SET TO SYSTEM 1 |
| 7 | O | × | O | FAULT IN MONITOR OF $M_{3W}$. MONITOR OF $M_{12W}$ IS CORRECT. | SWITCH TO STATE 1 WITH 2:1 SELECTOR SET TO SYSTEM 1 |
| 8 | △ | × | O | FAULT IN 4n×4n SW | SWITCH TO STATE 1 WITH 2:1 SELECTOR SET TO SYSTEM 1 |
| 9 | × | × | O | FAULT IN 4n×4n SW | SWITCH TO STATE 1 WITH 2:1 SELECTOR SET TO SYSTEM 1 |
| 10 | O | O | △ | FAULT IN TRANSMISSION LINE BETWEEN ONPE AND TRANSPONDER | SWITCH TO STATE 4 WITH PROTECTION AS LINE SELECTION |
| 11 | △ | O | △ | FAULT IN TRANSMISSION LINE BETWEEN ONPE AND TRANSPONDER | SWITCH TO STATE 4 WITH PROTECTION AS LINE SELECTION |
| 12 | × | O | △ | FAULT IN 2:1 SELECTOR | SWITCH TO STATE 4 WITH PROTECTION AS LINE SELECTION |
| 13 | O | △ | △ | FAULT IN TRANSMISSION LINE BETWEEN ONPE AND TRANSPONDER | SWITCH TO STATE 4 WITH PROTECTION AS LINE SELECTION |
| 14 | △ | △ | △ | FAULT IN CLIENT SYSTEM 1 (INCLUDING TRANSMISSION LINE) | SWITCH TO STATE 1 WITH 2:1 SELECTOR SET TO SYSTEM 1 |
| 15 | × | △ | △ | FAULT IN CLIENT SYSTEM 1 (INCLUDING TRANSMISSION LINE) | SWITCH TO STATE 1 WITH 2:1 SELECTOR SET TO SYSTEM 1 |
| 16 | O | × | △ | FAULT IN MONITOR OF $M_{3W}$. MONITOR OF $M_{12W}$ IS CORRECT. | SWITCH TO STATE 1 WITH 2:1 SELECTOR SET TO SYSTEM 1 |
| 17 | △ | × | △ | FAULT IN CLIENT SYSTEM 1 (INCLUDING TRANSMISSION LINE) | SWITCH TO STATE 1 WITH 2:1 SELECTOR SET TO SYSTEM 1 |
| 18 | × | × | △ | FAULT IN CLIENT SYSTEM 1 (INCLUDING TRANSMISSION LINE) | SWITCH TO STATE 1 WITH 2:1 SELECTOR SET TO SYSTEM 1 |
| 19 | O | O | × | FAULT IN MONITOR OF $M_{12W}$. MONITOR OF $M_{01}$ IS CORRECT. | SWITCH TO STATE 1 WITH 2:1 SELECTOR SET TO SYSTEM 1 |
| 20 | △ | O | × | FAULT IN MONITOR OF $M_{12W}$. MONITOR OF $M_{01}$ IS CORRECT. | SWITCH TO STATE 1 WITH 2:1 SELECTOR SET TO SYSTEM 1 |
| 21 | × | O | × | FAULT IN MONITOR OF $M_{12W}$. MONITOR OF $M_{01}$ IS CORRECT. | SWITCH TO STATE 1 WITH 2:1 SELECTOR SET TO SYSTEM 1 |
| 22 | O | △ | × | FAULT IN MONITOR OF $M_{3W}$. MONITOR OF $M_{01}$ IS CORRECT. | SWITCH TO STATE 1 WITH 2:1 SELECTOR SET TO SYSTEM 1 |
| 23 | △ | △ | × | FAULT IN CLIENT SYSTEM 1 (INCLUDING TRANSMISSION LINE) | SWITCH TO STATE 1 WITH 2:1 SELECTOR SET TO SYSTEM 1 |
| 24 | × | △ | × | FAULT IN CLIENT SYSTEM 1 (INCLUDING TRANSMISSION LINE) | SWITCH TO STATE 1 WITH 2:1 SELECTOR SET TO SYSTEM 1 |
| 25 | O | × | × | FAULT IN MONITOR OF $M_{3W}$. MONITOR OF $M_{01}$ IS CORRECT. | SWITCH TO STATE 1 WITH 2:1 SELECTOR SET TO SYSTEM 1 |
| 26 | △ | × | × | FAULT IN CLIENT SYSTEM 1 (INCLUDING TRANSMISSION LINE) | SWITCH TO STATE 1 WITH 2:1 SELECTOR SET TO SYSTEM 1 |
| 27 | × | × | × | FAULT IN CLIENT SYSTEM 1 (INCLUDING TRANSMISSION LINE) | SWITCH TO STATE 1 WITH 2:1 SELECTOR SET TO SYSTEM 1 |

FIG. 13

| NUMBER | $M_{3W}$ | $M_{02W}$ | $M_{01}$ | DETERMINATION | SWITCH-TO TARGET |
|---|---|---|---|---|---|
| 1 | ○ | ○ | ○ | FAULT IN TRANSMISSION LINE BETWEEN ONPE AND TRANSPONDER | SWITCH TO STATE 1 WITH PROTECTION AS LINE SELECTION |
| 2 | △ | ○ | ○ | FAULT IN 2:1 SELECTOR | SWITCH TO STATE 1 WITH PROTECTION AS LINE SELECTION |
| 3 | × | ○ | ○ | FAULT IN 2:1 SELECTOR | SWITCH TO STATE 1 WITH PROTECTION AS LINE SELECTION |
| 4 | ○ | △ | ○ | FAULT IN TRANSMISSION LINE BETWEEN ONPE AND TRANSPONDER | SWITCH TO STATE 1 WITH PROTECTION AS LINE SELECTION |
| 5 | △ | △ | ○ | FAULT IN 4n×4n SW | SWITCH TO STATE 4 WITH 2:1 SELECTOR SET TO SYSTEM 1 |
| 6 | × | △ | ○ | FAULT IN 4n×4n SW | SWITCH TO STATE 4 WITH 2:1 SELECTOR SET TO SYSTEM 1 |
| 7 | ○ | × | ○ | FAULT IN MONITOR OF $M_{01}$. MONITOR OF $M_{02W}$ IS CORRECT. | SWITCH TO STATE 4 WITH 2:1 SELECTOR SET TO SYSTEM 1 |
| 8 | △ | × | ○ | FAULT IN 4n×4n SW | SWITCH TO STATE 4 WITH 2:1 SELECTOR SET TO SYSTEM 1 |
| 9 | × | × | ○ | FAULT IN 4n×4n SW | SWITCH TO STATE 4 WITH 2:1 SELECTOR SET TO SYSTEM 1 |
| 10 | ○ | ○ | △ | FAULT IN TRANSMISSION LINE BETWEEN ONPE AND TRANSPONDER | SWITCH TO STATE 1 WITH PROTECTION AS LINE SELECTION |
| 11 | △ | ○ | △ | FAULT IN TRANSMISSION LINE BETWEEN ONPE AND TRANSPONDER | SWITCH TO STATE 1 WITH PROTECTION AS LINE SELECTION |
| 12 | × | ○ | △ | FAULT IN 2:1 SELECTOR | SWITCH TO STATE 1 WITH PROTECTION AS LINE SELECTION |
| 13 | ○ | △ | △ | FAULT IN TRANSMISSION LINE BETWEEN ONPE AND TRANSPONDER | SWITCH TO STATE 1 WITH PROTECTION AS LINE SELECTION |
| 14 | △ | △ | △ | FAULT IN CLIENT SYSTEM 0 (INCLUDING TRANSMISSION LINE) | SWITCH TO STATE 4 WITH 2:1 SELECTOR SET TO SYSTEM 1 |
| 15 | × | △ | △ | FAULT IN CLIENT SYSTEM 0 (INCLUDING TRANSMISSION LINE) | SWITCH TO STATE 4 WITH 2:1 SELECTOR SET TO SYSTEM 1 |
| 16 | ○ | × | △ | FAULT IN MONITOR OF $M_{3W}$. $M_{3W}$. MONITOR OF $M_{01}$ IS CORRECT. | SWITCH TO STATE 4 WITH 2:1 SELECTOR SET TO SYSTEM 1 |
| 17 | △ | × | △ | FAULT IN CLIENT SYSTEM 0 (INCLUDING TRANSMISSION LINE) | SWITCH TO STATE 4 WITH 2:1 SELECTOR SET TO SYSTEM 1 |
| 18 | × | × | △ | FAULT IN MONITOR OF $M_{3W}$. MONITOR OF $M_{01}$ IS CORRECT. | SWITCH TO STATE 4 WITH 2:1 SELECTOR SET TO SYSTEM 1 |
| 19 | ○ | ○ | × | FAULT IN MONITOR OF $M_{02W}$. MONITOR OF $M_{01}$ IS CORRECT. | SWITCH TO STATE 4 WITH 2:1 SELECTOR SET TO SYSTEM 1 |
| 20 | △ | ○ | × | FAULT IN MONITOR OF $M_{02W}$. MONITOR OF $M_{01}$ IS CORRECT. | SWITCH TO STATE 4 WITH 2:1 SELECTOR SET TO SYSTEM 1 |
| 21 | × | ○ | × | FAULT IN MONITOR OF $M_{3W}$. MONITOR OF $M_{01}$ IS CORRECT. | SWITCH TO STATE 4 WITH 2:1 SELECTOR SET TO SYSTEM 1 |
| 22 | ○ | △ | × | FAULT IN CLIENT SYSTEM 0 (INCLUDING TRANSMISSION LINE) | SWITCH TO STATE 4 WITH 2:1 SELECTOR SET TO SYSTEM 1 |
| 23 | △ | △ | × | FAULT IN CLIENT SYSTEM 0 (INCLUDING TRANSMISSION LINE) | SWITCH TO STATE 4 WITH 2:1 SELECTOR SET TO SYSTEM 1 |
| 24 | × | △ | × | FAULT IN CLIENT SYSTEM 0 (INCLUDING TRANSMISSION LINE) | SWITCH TO STATE 4 WITH 2:1 SELECTOR SET TO SYSTEM 1 |
| 25 | ○ | × | × | FAULT IN MONITOR OF $M_{01}$. MONITOR OF $M_{01}$ IS CORRECT. | SWITCH TO STATE 4 WITH 2:1 SELECTOR SET TO SYSTEM 1 |
| 26 | △ | × | × | FAULT IN CLIENT SYSTEM 0 (INCLUDING TRANSMISSION LINE) | SWITCH TO STATE 4 WITH 2:1 SELECTOR SET TO SYSTEM 1 |
| 27 | × | × | × | FAULT IN CLIENT SYSTEM 0 (INCLUDING TRANSMISSION LINE) | SWITCH TO STATE 4 WITH 2:1 SELECTOR SET TO SYSTEM 1 |

FIG. 14

| NUMBER | $M_{3W}$ | $M_{12W}$ | $M_{11}$ | DETERMINATION | SWITCH-TO TARGET |
|---|---|---|---|---|---|
| 1 | ○ | ○ | ○ | FAULT IN TRANSMISSION LINE BETWEEN ONPE AND TRANSPONDER | SWITCH TO STATE 2 WITH PROTECTION AS LINE SELECTION |
| 2 | △ | ○ | ○ | FAULT IN 2:1 SELECTOR | SWITCH TO STATE 2 WITH PROTECTION AS LINE SELECTION |
| 3 | × | ○ | ○ | FAULT IN 2:1 SELECTOR | SWITCH TO STATE 2 WITH PROTECTION AS LINE SELECTION |
| 4 | ○ | △ | ○ | FAULT IN TRANSMISSION LINE BETWEEN ONPE AND TRANSPONDER | SWITCH TO STATE 2 WITH PROTECTION AS LINE SELECTION |
| 5 | △ | △ | ○ | FAULT IN 4n×4n SW | SWITCH TO STATE 3 WITH 2:1 SELECTOR SET TO SYSTEM 1 |
| 6 | × | △ | ○ | FAULT IN 4n×4n SW | SWITCH TO STATE 3 WITH 2:1 SELECTOR SET TO SYSTEM 1 |
| 7 | ○ | × | ○ | FAULT IN MONITOR OF $M_{3W}$. MONITOR OF $M_{12W}$ IS CORRECT. | SWITCH TO STATE 3 WITH 2:1 SELECTOR SET TO SYSTEM 1 |
| 8 | △ | × | ○ | FAULT IN 4n×4n SW | SWITCH TO STATE 3 WITH 2:1 SELECTOR SET TO SYSTEM 1 |
| 9 | × | × | ○ | FAULT IN 4n×4n SW | SWITCH TO STATE 3 WITH 2:1 SELECTOR SET TO SYSTEM 1 |
| 10 | ○ | ○ | △ | FAULT IN TRANSMISSION LINE BETWEEN ONPE AND TRANSPONDER | SWITCH TO STATE 2 WITH PROTECTION AS LINE SELECTION |
| 11 | △ | ○ | △ | FAULT IN TRANSMISSION LINE BETWEEN ONPE AND TRANSPONDER | SWITCH TO STATE 2 WITH PROTECTION AS LINE SELECTION |
| 12 | × | ○ | △ | FAULT IN 2:1 SELECTOR | SWITCH TO STATE 2 WITH PROTECTION AS LINE SELECTION |
| 13 | ○ | △ | △ | FAULT IN TRANSMISSION LINE BETWEEN ONPE AND TRANSPONDER | SWITCH TO STATE 2 WITH PROTECTION AS LINE SELECTION |
| 14 | △ | △ | △ | FAULT IN CLIENT SYSTEM 1 (INCLUDING TRANSMISSION LINE) | SWITCH TO STATE 3 WITH 2:1 SELECTOR SET TO SYSTEM 1 |
| 15 | × | △ | △ | FAULT IN CLIENT SYSTEM 1 (INCLUDING TRANSMISSION LINE) | SWITCH TO STATE 3 WITH 2:1 SELECTOR SET TO SYSTEM 1 |
| 16 | ○ | × | △ | FAULT IN MONITOR OF $M_{3W}$. MONITOR OF $M_{01}$ IS CORRECT. | SWITCH TO STATE 3 WITH 2:1 SELECTOR SET TO SYSTEM 1 |
| 17 | △ | × | △ | FAULT IN CLIENT SYSTEM 1 (INCLUDING TRANSMISSION LINE) | SWITCH TO STATE 3 WITH 2:1 SELECTOR SET TO SYSTEM 1 |
| 18 | × | × | △ | FAULT IN CLIENT SYSTEM 1 (INCLUDING TRANSMISSION LINE) | SWITCH TO STATE 3 WITH 2:1 SELECTOR SET TO SYSTEM 1 |
| 19 | ○ | ○ | × | FAULT IN MONITOR OF $M_{3W}$, $M_{12W}$. MONITOR OF $M_{01}$ IS CORRECT. | SWITCH TO STATE 3 WITH 2:1 SELECTOR SET TO SYSTEM 1 |
| 20 | △ | ○ | × | FAULT IN MONITOR OF $M_{12W}$. MONITOR OF $M_{01}$ IS CORRECT. | SWITCH TO STATE 3 WITH 2:1 SELECTOR SET TO SYSTEM 1 |
| 21 | × | ○ | × | FAULT IN MONITOR OF $M_{12W}$. MONITOR OF $M_{01}$ IS CORRECT. | SWITCH TO STATE 3 WITH 2:1 SELECTOR SET TO SYSTEM 1 |
| 22 | ○ | △ | × | FAULT IN MONITOR OF $M_{3W}$. MONITOR OF $M_{01}$ IS CORRECT. | SWITCH TO STATE 3 WITH 2:1 SELECTOR SET TO SYSTEM 1 |
| 23 | △ | △ | × | FAULT IN CLIENT SYSTEM 1 (INCLUDING TRANSMISSION LINE) | SWITCH TO STATE 3 WITH 2:1 SELECTOR SET TO SYSTEM 1 |
| 24 | × | △ | × | FAULT IN CLIENT SYSTEM 1 (INCLUDING TRANSMISSION LINE) | SWITCH TO STATE 3 WITH 2:1 SELECTOR SET TO SYSTEM 1 |
| 25 | ○ | × | × | FAULT IN MONITOR OF $M_{3W}$. MONITOR OF $M_{01}$ IS CORRECT. | SWITCH TO STATE 3 WITH 2:1 SELECTOR SET TO SYSTEM 1 |
| 26 | △ | × | × | FAULT IN CLIENT SYSTEM 1 (INCLUDING TRANSMISSION LINE) | SWITCH TO STATE 3 WITH 2:1 SELECTOR SET TO SYSTEM 1 |
| 27 | × | × | × | FAULT IN CLIENT SYSTEM 1 (INCLUDING TRANSMISSION LINE) | SWITCH TO STATE 3 WITH 2:1 SELECTOR SET TO SYSTEM 1 |

F I G. 1 5

| STATE | LINE SELECTION | SELECTING 4n × 4n SW | FERF MONITOR SYSTEM | MONITOR SYSTEM | MONITOR DETECTION AND DETERMINATION |
|---|---|---|---|---|---|
| 1 | WORK | SELECTING SYSTEM 0 | | SYSTEM 0 | FIGS. 18, 19, 20 |
| 2 | | | | SYSTEM 1 | FIGS. 21, 22, 23 |
| 3 | | SELECTING SYSTEM 1 | | SYSTEM 0 | FIGS. 24, 25, 26 |
| 4 | | | | SYSTEM 1 | FIGS. 27, 28, 29 |
| 5 | PROTECTION | SELECTING SYSTEM 0 | | SYSTEM 0 | FIGS. 30, 31, 32 |
| 6 | | | | SYSTEM 1 | FIGS. 33, 34, 35 |
| 7 | | SELECTING SYSTEM 1 | | SYSTEM 0 | FIGS. 36, 37, 38 |
| 8 | | | | SYSTEM 1 | FIGS. 39, 40, 41 |

FIG. 17

WHEN FERF IS DETECTED (1)

| NUMBER | M1W | M2WO | M300 | M40 | DETERMINATION | SWITCH-TO TARGET |
|---|---|---|---|---|---|---|
| 1 | O | O | O | O | FAULT IN TRANSMISSION LINE OF SYSTEM 0 ON CLIENT SIDE | SWITCH TO STATE 2 WITH FERF MONITOR SWITCHED TO SYSTEM 1 |
| 2 | O | O | O | △ | FAULT IN 2:1 SEL | SWITCH TO STATE 2 WITH FERF MONITOR SWITCHED TO SYSTEM 1 |
| 3 | O | O | O | × | FAULT IN 2:1 SEL | SWITCH TO STATE 2 WITH FERF MONITOR SWITCHED TO SYSTEM 1 |
| 4 | O | O | △ | O | FAULT IN 4n×4n SW SYSTEM 0 | SWITCH TO STATE 3 WITH SYSTEM 1 SELECTED FOR 4n×4n SW |
| 5 | O | O | △ | △ | FAULT IN 4n×4n SW SYSTEM 0 | SWITCH TO STATE 3 WITH SYSTEM 1 SELECTED FOR 4n×4n SW |
| 6 | O | O | △ | × | FAULT IN 4n×4n SW SYSTEM 0 | SWITCH TO STATE 3 WITH SYSTEM 1 SELECTED FOR 4n×4n SW |
| 7 | O | O | × | O | FAULT IN MONITOR OF $M_{40}$. DETERMINATION OF $M_{300}$ IS CORRECT. | SWITCH TO STATE 3 WITH SYSTEM 1 SELECTED FOR 4n×4n SW |
| 8 | O | O | × | △ | FAULT IN 4n×4n SW SYSTEM 0 | SWITCH TO STATE 3 WITH SYSTEM 1 SELECTED FOR 4n×4n SW |
| 9 | O | O | × | × | FAULT IN 4n×4n SW SYSTEM 0 | SWITCH TO STATE 3 WITH SYSTEM 1 SELECTED FOR 4n×4n SW |
| 10 | O | △ | O | O | FAULT IN TRANSMISSION LINE OF SYSTEM 0 ON CLIENT SIDE | SWITCH TO STATE 2 WITH FERF MONITOR SWITCHED TO SYSTEM 1 |
| 11 | O | △ | O | △ | FAULT IN 2:1 SEL | SWITCH TO STATE 2 WITH FERF MONITOR SWITCHED TO SYSTEM 1 |
| 12 | O | △ | O | × | FAULT IN 2:1 SEL | SWITCH TO STATE 2 WITH FERF MONITOR SWITCHED TO SYSTEM 1 |
| 13 | O | △ | △ | O | FAULT IN 1:2 DIS | SWITCH TO STATE 5 WITH PROTECTION AS LINE SELECTION |
| 14 | O | △ | △ | △ | FAULT IN 1:2 DIS | SWITCH TO STATE 5 WITH PROTECTION AS LINE SELECTION |
| 15 | O | △ | △ | × | FAULT IN 1:2 DIS | SWITCH TO STATE 5 WITH PROTECTION AS LINE SELECTION |
| 16 | O | △ | × | O | FAULT IN MONITOR OF $M_{40}$. MONITOR OF $M_{300}$ IS CORRECT. | SWITCH TO STATE 3 WITH SYSTEM 1 SELECTED FOR 4n×4n SW |
| 17 | O | △ | × | △ | FAULT IN 1:2 DIS | SWITCH TO STATE 5 WITH PROTECTION AS LINE SELECTION |
| 18 | O | △ | × | × | FAULT IN 1:2 DIS | SWITCH TO STATE 5 WITH PROTECTION AS LINE SELECTION |
| 19 | O | × | O | O | FAULT IN MONITOR OF $M_{300}$ AND $M_{40}$. DETERMINATION OF $M_{2WO}$ IS CORRECT. | SWITCH TO STATE 3 WITH SYSTEM 1 SELECTED FOR 4n×4n SW |
| 20 | O | × | O | △ | FAULT IN MONITOR OF $M_{300}$. DETERMINATION OF $M_{2WO}$ IS CORRECT. | SWITCH TO STATE 3 WITH SYSTEM 1 SELECTED FOR 4n×4n SW |
| 21 | O | × | O | × | FAULT IN MONITOR OF $M_{300}$. DETERMINATION OF $M_{2WO}$ IS CORRECT. | SWITCH TO STATE 3 WITH SYSTEM 1 SELECTED FOR 4n×4n SW |
| 22 | O | × | △ | O | FAULT IN MONITOR OF $M_{40}$. DETERMINATION OF $M_{2WO}$ IS CORRECT. | SWITCH TO STATE 3 WITH SYSTEM 1 SELECTED FOR 4n×4n SW |
| 23 | O | × | △ | △ | FAULT IN 1:2 DIS | SWITCH TO STATE 5 WITH PROTECTION AS LINE SELECTION |
| 24 | O | × | △ | × | FAULT IN 1:2 DIS | SWITCH TO STATE 5 WITH PROTECTION AS LINE SELECTION |
| 25 | O | × | × | O | FAULT IN MONITOR OF $M_{40}$. DETERMINATION OF $M_{2WO}$ IS CORRECT. | SWITCH TO STATE 3 WITH SYSTEM 1 SELECTED FOR 4n×4n SW |
| 26 | O | × | × | △ | FAULT IN 1:2 DIS | SWITCH TO STATE 5 WITH PROTECTION AS LINE SELECTION |
| 27 | O | × | × | × | FAULT IN 1:2 DIS | SWITCH TO STATE 5 WITH PROTECTION AS LINE SELECTION |

FIG. 18

WHEN FERF IS DETECTED (2)

| NUMBER | $M_{1W}$ | $M_{2W0}$ | $M_{300}$ | $M_{40}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 2 WITH FERF MONITOR SWITCHED TO SYSTEM 1 |
| 29 | △ | ○ | ○ | △ | FAULT IN TRANSMISSION LINE OF SYSTEM 0 ON CLIENT SIDE | SWITCH TO STATE 2 WITH FERF MONITOR SWITCHED TO SYSTEM 1 |
| 30 | △ | ○ | ○ | × | FAULT IN TRANSMISSION LINE OF SYSTEM 0 ON CLIENT SIDE | SWITCH TO STATE 2 WITH FERF MONITOR SWITCHED TO SYSTEM 1 |
| 31 | △ | ○ | △ | ○ | FAULT IN TRANSMISSION LINE OF SYSTEM 0 ON CLIENT SIDE | SWITCH TO STATE 2 WITH FERF MONITOR SWITCHED TO SYSTEM 1 |
| 32 | △ | ○ | △ | △ | FAULT IN 4n×4n SW SYSTEM 0 | SWITCH TO STATE 3 WITH SYSTEM 1 SELECTED FOR 4n×4n SW |
| 33 | △ | ○ | △ | × | FAULT IN 1:2 DIS | SWITCH TO STATE 5 WITH PROTECTION AS LINE SELECTION |
| 34 | △ | ○ | × | ○ | FAULT IN MONITOR OF $M_{40}$. DETERMINATION OF $M_{2W0}$ IS CORRECT. | SWITCH TO STATE 3 WITH SYSTEM 1 SELECTED FOR 4n×4n SW |
| 35 | △ | ○ | × | △ | FAULT IN 4n×4n SW SYSTEM 0 | SWITCH TO STATE 3 WITH SYSTEM 1 SELECTED FOR 4n×4n SW |
| 36 | △ | ○ | × | × | FAULT IN 4n×4n SW SYSTEM 0 | SWITCH TO STATE 3 WITH SYSTEM 1 SELECTED FOR 4n×4n SW |
| 37 | △ | △ | ○ | ○ | FAULT IN TRANSMISSION LINE OF SYSTEM 0 ON CLIENT SIDE | SWITCH TO STATE 2 WITH FERF MONITOR SWITCHED TO SYSTEM 1 |
| 38 | △ | △ | ○ | △ | FAULT IN TRANSMISSION LINE BETWEEN TRANSPONDER AND 1:2 BRANCH | SWITCH TO STATE 5 WITH PROTECTION AS LINE SELECTION |
| 39 | △ | △ | ○ | × | FAULT IN 2:1 SEL | SWITCH TO STATE 2 WITH FERF MONITOR SWITCHED TO SYSTEM 1 |
| 40 | △ | △ | △ | ○ | FAULT IN TRANSMISSION LINE BETWEEN TRANSPONDER AND 1:2 BRANCH | SWITCH TO STATE 5 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 5 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 5 WITH PROTECTION AS LINE SELECTION |
| 43 | △ | △ | × | ○ | FAULT IN MONITOR OF $M_{300}$. DETERMINATION OF $M_{2W0}$ IS CORRECT. | SWITCH TO STATE 5 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 5 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 5 WITH PROTECTION AS LINE SELECTION |
| 46 | △ | × | ○ | ○ | FAULT IN MONITOR OF $M_{2W0}$ AND $M_{300}$. DETERMINATION OF $M_{40}$ IS CORRECT. | SWITCH TO STATE 5 WITH PROTECTION AS LINE SELECTION |
| 47 | △ | × | ○ | △ | FAULT IN MONITOR OF $M_{300}$. DETERMINATION OF $M_{2W0}$ IS CORRECT. | SWITCH TO STATE 5 WITH PROTECTION AS LINE SELECTION |
| 48 | △ | × | ○ | × | FAULT IN MONITOR OF $M_{2W0}$. DETERMINATION OF $M_{300}$ IS CORRECT. | SWITCH TO STATE 5 WITH PROTECTION AS LINE SELECTION |
| 49 | △ | × | △ | ○ | FAULT IN MONITOR OF $M_{2W0}$. DETERMINATION OF $M_{300}$ IS CORRECT. | SWITCH TO STATE 5 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 5 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 5 WITH PROTECTION AS LINE SELECTION |
| 52 | △ | × | × | ○ | FAULT IN MONITOR OF $M_{2W0}$. DETERMINATION OF $M_{300}$ IS CORRECT. | SWITCH TO STATE 5 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 5 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 5 WITH PROTECTION AS LINE SELECTION |

FIG. 19

WHEN FERF IS DETECTED (3)

| NUMBER | $M_{1W}$ | $M_{2W0}$ | $M_{300}$ | $M_{40}$ | DETERMINATION | SWITCH-TO TARGET |
|---|---|---|---|---|---|---|
| 55 | × | ○ | ○ | ○ | FAULT IN MONITOR OF $M_{2W0}$. DETERMINATION OF $M_{1W}$ IS CORRECT. | SWITCH TO STATE 5 WITH PROTECTION AS LINE SELECTION |
| 56 | × | ○ | ○ | △ | FAULT IN MONITOR OF $M_{2W0}$, $M_{300}$ AND $M_{40}$. DETERMINATION OF $M_{1W}$ IS CORRECT. | SWITCH TO STATE 5 WITH PROTECTION AS LINE SELECTION |
| 57 | × | ○ | ○ | × | FAULT IN MONITOR OF $M_{2W0}$ AND $M_{300}$. DETERMINATION OF $M_{1W}$ IS CORRECT. | SWITCH TO STATE 5 WITH PROTECTION AS LINE SELECTION |
| 58 | × | ○ | △ | ○ | FAULT IN MONITOR OF $M_{2W0}$ AND $M_{300}$. DETERMINATION OF $M_{1W}$ IS CORRECT. | SWITCH TO STATE 5 WITH PROTECTION AS LINE SELECTION |
| 59 | × | ○ | △ | △ | FAULT IN MONITOR OF $M_{2W0}$. DETERMINATION OF $M_{1W}$ IS CORRECT. | SWITCH TO STATE 5 WITH PROTECTION AS LINE SELECTION |
| 60 | × | ○ | △ | × | FAULT IN MONITOR OF $M_{2W0}$, $M_{300}$ AND $M_{40}$. DETERMINATION OF $M_{1W}$ IS CORRECT. | SWITCH TO STATE 5 WITH PROTECTION AS LINE SELECTION |
| 61 | × | ○ | × | ○ | FAULT IN MONITOR OF $M_{2W0}$ AND $M_{40}$. DETERMINATION OF $M_{1W}$ IS CORRECT. | SWITCH TO STATE 5 WITH PROTECTION AS LINE SELECTION |
| 62 | × | ○ | × | △ | FAULT IN MONITOR OF $M_{2W0}$. DETERMINATION OF $M_{1W}$ IS CORRECT. | SWITCH TO STATE 5 WITH PROTECTION AS LINE SELECTION |
| 63 | × | ○ | × | × | FAULT IN MONITOR OF $M_{2W0}$. DETERMINATION OF $M_{1W}$ IS CORRECT. | SWITCH TO STATE 5 WITH PROTECTION AS LINE SELECTION |
| 64 | × | △ | ○ | ○ | FAULT IN MONITOR OF $M_{300}$ AND $M_{40}$. DETERMINATION OF $M_{1W}$ IS CORRECT. | SWITCH TO STATE 5 WITH PROTECTION AS LINE SELECTION |
| 65 | × | △ | ○ | △ | FAULT IN MONITOR OF $M_{300}$. DETERMINATION OF $M_{1W}$ IS CORRECT. | SWITCH TO STATE 5 WITH PROTECTION AS LINE SELECTION |
| 66 | × | △ | ○ | × | FAULT IN MONITOR OF $M_{300}$. DETERMINATION OF $M_{1W}$ IS CORRECT. | SWITCH TO STATE 5 WITH PROTECTION AS LINE SELECTION |
| 67 | × | △ | △ | ○ | FAULT IN MONITOR OF $M_{40}$. DETERMINATION OF $M_{1W}$ IS CORRECT. | SWITCH TO STATE 5 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 5 WITH PROTECTION AS LINE SELECTION |
| 69 | × | △ | △ | × | FAULT IN MONITOR OF $M_{300}$. DETERMINATION OF $M_{1W}$ IS CORRECT. | SWITCH TO STATE 5 WITH PROTECTION AS LINE SELECTION |
| 70 | × | △ | × | ○ | FAULT IN MONITOR OF $M_{40}$. DETERMINATION OF $M_{1W}$ IS CORRECT. | SWITCH TO STATE 5 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 5 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 5 WITH PROTECTION AS LINE SELECTION |
| 73 | × | × | ○ | ○ | FAULT IN MONITOR OF $M_{300}$ AND $M_{40}$. DETERMINATION OF $M_{1W}$ IS CORRECT. | SWITCH TO STATE 5 WITH PROTECTION AS LINE SELECTION |
| 74 | × | × | ○ | △ | FAULT IN MONITOR OF $M_{300}$. DETERMINATION OF $M_{1W}$ IS CORRECT. | SWITCH TO STATE 5 WITH PROTECTION AS LINE SELECTION |
| 75 | × | × | ○ | × | FAULT IN TRANSMISSION LINE BETWEEN TRANSPONDER AND 1:2 BRANCH | SWITCH TO STATE 5 WITH PROTECTION AS LINE SELECTION |
| 76 | × | × | △ | ○ | FAULT IN MONITOR OF $M_{300}$. DETERMINATION OF $M_{1W}$ IS CORRECT. | SWITCH TO STATE 5 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 5 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 5 WITH PROTECTION AS LINE SELECTION |
| 79 | × | × | × | ○ | FAULT IN MONITOR OF $M_{40}$. DETERMINATION OF $M_{1W}$ IS CORRECT. | SWITCH TO STATE 5 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 5 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 5 WITH PROTECTION AS LINE SELECTION |

F I G. 2 0

WHEN FERF IS DETECTED (1)

| NUMBER | $M_{1W}$ | $M_{2W0}$ | $M_{301}$ | $M_{41}$ | DETERMINATION | SWITCH-TO TARGET |
|---|---|---|---|---|---|---|
| 1 | ○ | ○ | ○ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 2 | ○ | ○ | ○ | △ | FAULT IN 2:1 SEL | SWITCH TO STATE 1 WITH FERF MONITOR SWITCHED TO SYSTEM 0 |
| 3 | ○ | ○ | ○ | × | FAULT IN 2:1 SEL | SWITCH TO STATE 1 WITH FERF MONITOR SWITCHED TO SYSTEM 0 |
| 4 | ○ | ○ | △ | ○ | FAULT IN 4n×4n SW SYSTEM 0 | SWITCH TO STATE 4 WITH SYSTEM 1 SELECTED FOR 4n×4n SW |
| 5 | ○ | ○ | △ | △ | FAULT IN 4n×4n SW SYSTEM 0 | SWITCH TO STATE 4 WITH SYSTEM 1 SELECTED FOR 4n×4n SW |
| 6 | ○ | ○ | △ | × | FAULT IN 4n×4n SW SYSTEM 0 | SWITCH TO STATE 4 WITH SYSTEM 1 SELECTED FOR 4n×4n SW |
| 7 | ○ | ○ | × | ○ | FAULT IN MONITOR OF $M_{40}$- DETERMINATION OF $M_{300}$ IS CORRECT. | SWITCH TO STATE 4 WITH SYSTEM 1 SELECTED FOR 4n×4n SW |
| 8 | ○ | ○ | × | △ | FAULT IN 4n×4n SW SYSTEM 0 | SWITCH TO STATE 4 WITH SYSTEM 1 SELECTED FOR 4n×4n SW |
| 9 | ○ | ○ | × | × | FAULT IN 4n×4n SW SYSTEM 0 | SWITCH TO STATE 4 WITH SYSTEM 1 SELECTED FOR 4n×4n SW |
| 10 | ○ | △ | ○ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 11 | ○ | △ | ○ | △ | FAULT IN 2:1 SEL | SWITCH TO STATE 1 WITH FERF MONITOR SWITCHED TO SYSTEM 0 |
| 12 | ○ | △ | ○ | × | FAULT IN 2:1 SEL | SWITCH TO STATE 1 WITH FERF MONITOR SWITCHED TO SYSTEM 0 |
| 13 | ○ | △ | △ | ○ | FAULT IN 1:2 DIS | SWITCH TO STATE 6 WITH PROTECTION AS LINE SELECTION |
| 14 | ○ | △ | △ | △ | FAULT IN 1:2 DIS | SWITCH TO STATE 6 WITH PROTECTION AS LINE SELECTION |
| 15 | ○ | △ | △ | × | FAULT IN 1:2 DIS | SWITCH TO STATE 6 WITH PROTECTION AS LINE SELECTION |
| 16 | ○ | △ | × | ○ | FAULT IN MONITOR OF $M_{40}$- MONITOR OF $M_{300}$ IS CORRECT. | SWITCH TO STATE 4 WITH SYSTEM 1 SELECTED FOR 4n×4n SW |
| 17 | ○ | △ | × | △ | FAULT IN 1:2 DIS | SWITCH TO STATE 6 WITH PROTECTION AS LINE SELECTION |
| 18 | ○ | △ | × | × | FAULT IN 1:2 DIS | SWITCH TO STATE 6 WITH PROTECTION AS LINE SELECTION |
| 19 | ○ | × | ○ | ○ | FAULT IN MONITOR OF $M_{300}$ AND $M_{40}$- DETERMINATION OF $M_{2W0}$ IS CORRECT. | SWITCH TO STATE 4 WITH SYSTEM 1 SELECTED FOR 4n×4n SW |
| 20 | ○ | × | ○ | △ | FAULT IN MONITOR OF $M_{300}$- DETERMINATION OF $M_{2W0}$ IS CORRECT. | SWITCH TO STATE 4 WITH SYSTEM 1 SELECTED FOR 4n×4n SW |
| 21 | ○ | × | ○ | × | FAULT IN MONITOR OF $M_{300}$- DETERMINATION OF $M_{2W0}$ IS CORRECT. | SWITCH TO STATE 4 WITH SYSTEM 1 SELECTED FOR 4n×4n SW |
| 22 | ○ | × | △ | ○ | FAULT IN MONITOR OF $M_{40}$- DETERMINATION OF $M_{2W0}$ IS CORRECT. | SWITCH TO STATE 6 WITH PROTECTION AS LINE SELECTION |
| 23 | ○ | × | △ | △ | FAULT IN 1:2 DIS | SWITCH TO STATE 6 WITH PROTECTION AS LINE SELECTION |
| 24 | ○ | × | △ | × | FAULT IN 1:2 DIS | SWITCH TO STATE 6 WITH PROTECTION AS LINE SELECTION |
| 25 | ○ | × | × | ○ | FAULT IN MONITOR OF $M_{40}$ | SWITCH TO STATE 4 WITH SYSTEM 1 SELECTED FOR 4n×4n SW |
| 26 | ○ | × | × | △ | FAULT IN 1:2 DIS | SWITCH TO STATE 6 WITH PROTECTION AS LINE SELECTION |
| 27 | ○ | × | × | × | FAULT IN 1:2 DIS | SWITCH TO STATE 6 WITH PROTECTION AS LINE SELECTION |

F I G. 21

WHEN FERF IS DETECTED (2)

| NUMBER | $M_{1W}$ | $M_{2W0}$ | $M_{301}$ | $M_{41}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 29 | △ | ○ | ○ | × | FAULT IN TRANSMISSION LINE OF SYSTEM 0 ON CLIENT SIDE | SWITCH TO STATE 1 WITH FERF MONITOR SWITCHED TO SYSTEM 0 |
| 30 | △ | ○ | △ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 31 | △ | ○ | △ | × | FAULT IN TRANSMISSION LINE OF SYSTEM 0 ON CLIENT SIDE | SWITCH TO STATE 1 WITH FERF MONITOR SWITCHED TO SYSTEM 0 |
| 32 | △ | ○ | ○ | ○ | FAULT IN 4n×4n SW SYSTEM 0 | SWITCH TO STATE 4 WITH SYSTEM 1 SELECTED FOR 4n×4n SW |
| 33 | △ | ○ | ○ | × | FAULT IN 1:2 DIS | SWITCH TO STATE 6 WITH PROTECTION AS LINE SELECTION |
| 34 | △ | ○ | × | ○ | FAULT IN MONITOR OF $M_{40}$. DETERMINATION OF $M_{2W0}$ IS CORRECT. | SWITCH TO STATE 4 WITH SYSTEM 1 SELECTED FOR 4n×4n SW |
| 35 | △ | ○ | × | × | FAULT IN 4n×4n SW SYSTEM 0 | SWITCH TO STATE 4 WITH SYSTEM 1 SELECTED FOR 4n×4n SW |
| 36 | △ | ○ | △ | × | FAULT IN 4n×4n SW SYSTEM 0 | SWITCH TO STATE 4 WITH SYSTEM 1 SELECTED FOR 4n×4n SW |
| 37 | △ | △ | ○ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 38 | △ | △ | ○ | × | FAULT IN TRANSMISSION LINE BETWEEN TRANSPONDER AND 1:2 BRANCH | SWITCH TO STATE 6 WITH PROTECTION AS LINE SELECTION |
| 39 | △ | △ | △ | ○ | FAULT IN 2:1 SEL | SWITCH TO STATE 1 WITH FERF MONITOR SWITCHED TO SYSTEM 0 |
| 40 | △ | △ | △ | × | FAULT IN TRANSMISSION LINE BETWEEN TRANSPONDER AND 1:2 BRANCH | SWITCH TO STATE 6 WITH PROTECTION AS LINE SELECTION |
| 41 | △ | △ | ○ | ○ | FAULT IN TRANSMISSION LINE BETWEEN TRANSPONDER AND 1:2 BRANCH | SWITCH TO STATE 6 WITH PROTECTION AS LINE SELECTION |
| 42 | △ | △ | ○ | × | FAULT IN TRANSMISSION LINE BETWEEN TRANSPONDER AND 1:2 BRANCH | SWITCH TO STATE 6 WITH PROTECTION AS LINE SELECTION |
| 43 | △ | △ | × | ○ | FAULT IN MONITOR OF $M_{300}$. DETERMINATION OF $M_{300}$ IS CORRECT. | SWITCH TO STATE 6 WITH PROTECTION AS LINE SELECTION |
| 44 | △ | △ | × | × | FAULT IN TRANSMISSION LINE BETWEEN TRANSPONDER AND 1:2 BRANCH | SWITCH TO STATE 6 WITH PROTECTION AS LINE SELECTION |
| 45 | △ | △ | △ | × | FAULT IN TRANSMISSION LINE BETWEEN TRANSPONDER AND 1:2 BRANCH | SWITCH TO STATE 6 WITH PROTECTION AS LINE SELECTION |
| 46 | △ | × | ○ | ○ | FAULT IN MONITOR OF $M_{40}$ AND $M_{300}$. DETERMINATION OF $M_{300}$ IS CORRECT. | SWITCH TO STATE 6 WITH PROTECTION AS LINE SELECTION |
| 47 | △ | × | ○ | × | FAULT IN MONITOR OF $M_{300}$. DETERMINATION OF $M_{300}$ IS CORRECT. | SWITCH TO STATE 6 WITH PROTECTION AS LINE SELECTION |
| 48 | △ | × | △ | ○ | FAULT IN MONITOR OF $M_{300}$. DETERMINATION OF $M_{300}$ IS CORRECT. | SWITCH TO STATE 6 WITH PROTECTION AS LINE SELECTION |
| 49 | △ | × | △ | × | FAULT IN MONITOR OF $M_{40}$. DETERMINATION OF $M_{300}$ IS CORRECT. | SWITCH TO STATE 6 WITH PROTECTION AS LINE SELECTION |
| 50 | △ | × | ○ | ○ | FAULT IN TRANSMISSION LINE BETWEEN TRANSPONDER AND 1:2 BRANCH | SWITCH TO STATE 6 WITH PROTECTION AS LINE SELECTION |
| 51 | △ | × | ○ | × | FAULT IN TRANSMISSION LINE BETWEEN TRANSPONDER AND 1:2 BRANCH | SWITCH TO STATE 6 WITH PROTECTION AS LINE SELECTION |
| 52 | △ | × | × | ○ | FAULT IN MONITOR OF $M_{40}$. DETERMINATION OF $M_{300}$ IS CORRECT. | SWITCH TO STATE 6 WITH PROTECTION AS LINE SELECTION |
| 53 | △ | × | × | × | FAULT IN TRANSMISSION LINE BETWEEN TRANSPONDER AND 1:2 BRANCH | SWITCH TO STATE 6 WITH PROTECTION AS LINE SELECTION |
| 54 | △ | × | △ | × | FAULT IN TRANSMISSION LINE BETWEEN TRANSPONDER AND 1:2 BRANCH | SWITCH TO STATE 6 WITH PROTECTION AS LINE SELECTION |

F I G. 2 2

WHEN FERF IS DETECTED (3)

| NUMBER | M$_{1W}$ | M$_{2W0}$ | M$_{301}$ | M$_{41}$ | DETERMINATION | SWITCH-TO TARGET |
|---|---|---|---|---|---|---|
| 55 | × | O | O | O | FAULT IN MONITOR OF M$_{2W0}$, M$_{300}$ AND M$_{40}$- DETERMINATION OF M$_{1W}$ IS CORRECT. | SWITCH TO STATE 6 WITH PROTECTION AS LINE SELECTION |
| 56 | × | O | O | △ | FAULT IN MONITOR OF M$_{2W0}$ AND M$_{300}$- DETERMINATION OF M$_{1W}$ IS CORRECT. | SWITCH TO STATE 6 WITH PROTECTION AS LINE SELECTION |
| 57 | × | O | O | × | FAULT IN MONITOR OF M$_{2W0}$ AND M$_{300}$- DETERMINATION OF M$_{1W}$ IS CORRECT. | SWITCH TO STATE 6 WITH PROTECTION AS LINE SELECTION |
| 58 | × | O | △ | O | FAULT IN MONITOR OF M$_{2W0}$ AND M$_{40}$- DETERMINATION OF M$_{1W}$ IS CORRECT. | SWITCH TO STATE 6 WITH PROTECTION AS LINE SELECTION |
| 59 | × | O | △ | △ | FAULT IN MONITOR OF M$_{2W0}$- DETERMINATION OF M$_{1W}$ IS CORRECT. | SWITCH TO STATE 6 WITH PROTECTION AS LINE SELECTION |
| 60 | × | O | △ | × | FAULT IN MONITOR OF M$_{2W0}$, M$_{300}$ AND M40 DETERMINATION OF M$_{1W}$ IS CORRECT. | SWITCH TO STATE 6 WITH PROTECTION AS LINE SELECTION |
| 61 | × | O | × | O | FAULT IN MONITOR OF M$_{2W0}$ AND M$_{40}$- DETERMINATION OF M$_{1W}$ IS CORRECT. | SWITCH TO STATE 6 WITH PROTECTION AS LINE SELECTION |
| 62 | × | O | × | △ | FAULT IN MONITOR OF M$_{2W0}$- DETERMINATION OF M$_{1W}$ IS CORRECT. | SWITCH TO STATE 6 WITH PROTECTION AS LINE SELECTION |
| 63 | × | O | × | × | FAULT IN MONITOR OF M$_{2W0}$- DETERMINATION OF M$_{1W}$ IS CORRECT. | SWITCH TO STATE 6 WITH PROTECTION AS LINE SELECTION |
| 64 | × | △ | O | O | FAULT IN MONITOR OF M$_{300}$ AND M$_{40}$- DETERMINATION OF M$_{1W}$ IS CORRECT. | SWITCH TO STATE 6 WITH PROTECTION AS LINE SELECTION |
| 65 | × | △ | O | △ | FAULT IN MONITOR OF M$_{300}$- DETERMINATION OF M$_{1W}$ IS CORRECT. | SWITCH TO STATE 6 WITH PROTECTION AS LINE SELECTION |
| 66 | × | △ | O | × | FAULT IN MONITOR OF M$_{300}$- DETERMINATION OF M$_{1W}$ IS CORRECT. | SWITCH TO STATE 6 WITH PROTECTION AS LINE SELECTION |
| 67 | × | △ | △ | O | FAULT IN MONITOR OF M$_{40}$- DETERMINATION OF M$_{1W}$ IS CORRECT. | SWITCH TO STATE 6 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 6 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 6 WITH PROTECTION AS LINE SELECTION |
| 70 | × | △ | × | O | FAULT IN MONITOR OF M$_{40}$- DETERMINATION OF M$_{1W}$ IS CORRECT. | SWITCH TO STATE 6 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 6 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 6 WITH PROTECTION AS LINE SELECTION |
| 73 | × | × | O | O | FAULT IN MONITOR OF M$_{300}$ AND M$_{40}$- DETERMINATION OF M$_{1W}$ IS CORRECT. | SWITCH TO STATE 6 WITH PROTECTION AS LINE SELECTION |
| 74 | × | × | O | △ | FAULT IN MONITOR OF M$_{300}$- DETERMINATION OF M$_{1W}$ IS CORRECT. | SWITCH TO STATE 6 WITH PROTECTION AS LINE SELECTION |
| 75 | × | × | O | × | FAULT IN MONITOR OF M$_{300}$- DETERMINATION OF M$_{1W}$ IS CORRECT. | SWITCH TO STATE 5 WITH PROTECTION AS LINE SELECTION |
| 76 | × | × | △ | O | FAULT IN MONITOR OF M$_{40}$- DETERMINATION OF M$_{1W}$ IS CORRECT. | SWITCH TO STATE 6 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 6 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 6 WITH PROTECTION AS LINE SELECTION |
| 79 | × | × | × | O | FAULT IN MONITOR OF M$_{40}$- DETERMINATION OF M$_{1W}$ IS CORRECT. | SWITCH TO STATE 6 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 6 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 6 WITH PROTECTION AS LINE SELECTION |

FIG. 23

WHEN FERF IS DETECTED (1)

| NUMBER | $M_{1W}$ | $M_{2W1}$ | $M_{310}$ | $M_{40}$ | DETERMINATION | SWITCH-TO TARGET |
|---|---|---|---|---|---|---|
| 1 | ○ | ○ | ○ | ○ | FAULT IN TRANSMISSION LINE OF SYSTEM 1 ON CLIENT SIDE | SWITCH TO STATE 4 WITH FERF MONITOR SWITCHED TO SYSTEM 1 |
| 2 | ○ | ○ | ○ | △ | FAULT IN 2:1 SEL | SWITCH TO STATE 4 WITH FERF MONITOR SWITCHED TO SYSTEM 1 |
| 3 | ○ | ○ | ○ | × | FAULT IN 2:1 SEL | SWITCH TO STATE 4 WITH FERF MONITOR SWITCHED TO SYSTEM 1 |
| 4 | ○ | ○ | △ | ○ | FAULT IN 4n×4n SW SYSTEM 1 | SWITCH TO STATE 1 WITH SYSTEM 0 SELECTED FOR 4n×4n SW |
| 5 | ○ | ○ | △ | △ | FAULT IN 4n×4n SW SYSTEM 1 | SWITCH TO STATE 1 WITH SYSTEM 0 SELECTED FOR 4n×4n SW |
| 6 | ○ | ○ | △ | × | FAULT IN 4n×4n SW SYSTEM 1 | SWITCH TO STATE 1 WITH SYSTEM 0 SELECTED FOR 4n×4n SW |
| 7 | ○ | ○ | × | ○ | FAULT IN MONITOR OF $M_{40}$. DETERMINATION OF $M_{310}$ IS CORRECT. | SWITCH TO STATE 1 WITH SYSTEM 0 SELECTED FOR 4n×4n SW |
| 8 | ○ | ○ | × | △ | FAULT IN 4n×4n SW SYSTEM 1 | SWITCH TO STATE 1 WITH SYSTEM 0 SELECTED FOR 4n×4n SW |
| 9 | ○ | ○ | × | × | FAULT IN 4n×4n SW SYSTEM 1 | SWITCH TO STATE 1 WITH SYSTEM 0 SELECTED FOR 4n×4n SW |
| 10 | ○ | △ | ○ | ○ | FAULT IN TRANSMISSION LINE OF SYSTEM 0 ON CLIENT SIDE | SWITCH TO STATE 4 WITH FERF MONITOR SWITCHED TO SYSTEM 1 |
| 11 | ○ | △ | ○ | △ | FAULT IN 2:1 SEL | SWITCH TO STATE 4 WITH FERF MONITOR SWITCHED TO SYSTEM 1 |
| 12 | ○ | △ | ○ | × | FAULT IN 2:1 SEL | SWITCH TO STATE 4 WITH FERF MONITOR SWITCHED TO SYSTEM 1 |
| 13 | ○ | △ | △ | ○ | FAULT IN 1:2 DIS | SWITCH TO STATE 7 WITH PROTECTION AS LINE SELECTION |
| 14 | ○ | △ | △ | △ | FAULT IN 1:2 DIS | SWITCH TO STATE 7 WITH PROTECTION AS LINE SELECTION |
| 15 | ○ | △ | △ | × | FAULT IN 1:2 DIS | SWITCH TO STATE 7 WITH PROTECTION AS LINE SELECTION |
| 16 | ○ | △ | × | ○ | FAULT IN MONITOR OF $M_{40}$. MONITOR OF $M_{310}$ IS CORRECT. | SWITCH TO STATE 3 WITH SYSTEM 1 SELECTED FOR 4n×4n SW |
| 17 | ○ | △ | × | △ | FAULT IN 1:2 DIS | SWITCH TO STATE 7 WITH PROTECTION AS LINE SELECTION |
| 18 | ○ | △ | × | × | FAULT IN 1:2 DIS | SWITCH TO STATE 7 WITH PROTECTION AS LINE SELECTION |
| 19 | ○ | × | ○ | ○ | FAULT IN MONITOR OF $M_{310}$ AND $M_{40}$. DETERMINATION OF $M_{2W0}$ IS CORRECT. | SWITCH TO STATE 1 WITH SYSTEM 0 SELECTED FOR 4n×4n SW |
| 20 | ○ | × | ○ | △ | FAULT IN MONITOR OF $M_{310}$. DETERMINATION OF $M_{2W1}$ IS CORRECT. | SWITCH TO STATE 1 WITH SYSTEM 0 SELECTED FOR 4n×4n SW |
| 21 | ○ | × | ○ | × | FAULT IN MONITOR OF $M_{310}$. DETERMINATION OF $M_{2W1}$ IS CORRECT. | SWITCH TO STATE 1 WITH SYSTEM 0 SELECTED FOR 4n×4n SW |
| 22 | ○ | × | △ | ○ | FAULT IN MONITOR OF $M_{40}$. DETERMINATION OF $M_{2W1}$ IS CORRECT. | SWITCH TO STATE 1 WITH SYSTEM 0 SELECTED FOR 4n×4n SW |
| 23 | ○ | × | △ | △ | FAULT IN 1:2 DIS | SWITCH TO STATE 7 WITH PROTECTION AS LINE SELECTION |
| 24 | ○ | × | △ | × | FAULT IN 1:2 DIS | SWITCH TO STATE 7 WITH PROTECTION AS LINE SELECTION |

WHEN FERF IS DETECTED (2)

| NUMBER | $M_{1W}$ | $M_{2W1}$ | $M_{310}$ | $M_{40}$ | DETERMINATION | SWITCH-TO TARGET |
|---|---|---|---|---|---|---|
| 25 | ○ | × | × | ○ | FAULT IN MONITOR OF $M_{40}$- DETERMINATION OF $M_{2W1}$ IS CORRECT. | SWITCH TO STATE 1 WITH SYSTEM 0 SELECTED FOR 4n×4n SW |
| 26 | ○ | × | × | △ | FAULT IN 1:2 DIS | SWITCH TO STATE 7 WITH PROTECTION AS LINE SELECTION |
| 27 | ○ | × | × | × | FAULT IN 1:2 DIS | SWITCH TO STATE 7 WITH PROTECTION AS LINE SELECTION |
| 28 | △ | ○ | ○ | ○ | FAULT IN TRANSMISSION LINE OF SYSTEM 0 ON CLIENT SIDE | SWITCH TO STATE 4 WITH FERF MONITOR SWITCHED TO SYSTEM 1 |
| 29 | △ | ○ | ○ | △ | FAULT IN TRANSMISSION LINE OF SYSTEM 0 ON CLIENT SIDE | SWITCH TO STATE 4 WITH FERF MONITOR SWITCHED TO SYSTEM 1 |
| 30 | △ | ○ | ○ | × | FAULT IN TRANSMISSION LINE OF SYSTEM 0 ON CLIENT SIDE | SWITCH TO STATE 4 WITH FERF MONITOR SWITCHED TO SYSTEM 1 |
| 31 | △ | ○ | △ | ○ | FAULT IN TRANSMISSION LINE OF SYSTEM 0 ON CLIENT SIDE | SWITCH TO STATE 4 WITH FERF MONITOR SWITCHED TO SYSTEM 1 |
| 32 | △ | ○ | △ | △ | FAULT IN 4n×4n SW SYSTEM 1 | SWITCH TO STATE 7 WITH PROTECTION AS LINE SELECTION |
| 33 | △ | ○ | △ | × | FAULT IN 1:2 DIS | SWITCH TO STATE 7 WITH PROTECTION AS LINE SELECTION |
| 34 | △ | ○ | × | ○ | FAULT IN MONITOR OF $M_{40}$- DETERMINATION OF $M_{2W1}$ IS CORRECT. | SWITCH TO STATE 1 WITH SYSTEM 0 SELECTED FOR 4n×4n SW |
| 35 | △ | ○ | × | △ | FAULT IN 4n×4n SW SYSTEM 1 | SWITCH TO STATE 1 WITH SYSTEM 0 SELECTED FOR 4n×4n SW |
| 36 | △ | ○ | × | × | FAULT IN 4n×4n SW SYSTEM 1 | SWITCH TO STATE 1 WITH SYSTEM 0 SELECTED FOR 4n×4n SW |
| 37 | △ | △ | ○ | ○ | FAULT IN TRANSMISSION LINE OF SYSTEM 0 ON CLIENT SIDE | SWITCH TO STATE 2 WITH FERF MONITOR SWITCHED TO SYSTEM 1 |
| 38 | △ | △ | ○ | △ | FAULT IN TRANSMISSION LINE BETWEEN TRANSPONDER AND 1:2 BRANCH | SWITCH TO STATE 7 WITH PROTECTION AS LINE SELECTION |
| 39 | △ | △ | ○ | × | FAULT IN 2:1 SEL | SWITCH TO STATE 4 WITH FERF MONITOR SWITCHED TO SYSTEM 1 |
| 40 | △ | △ | △ | ○ | FAULT IN TRANSMISSION LINE BETWEEN TRANSPONDER AND 1:2 BRANCH | SWITCH TO STATE 7 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 7 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 7 WITH PROTECTION AS LINE SELECTION |
| 43 | △ | △ | × | ○ | FAULT IN MONITOR OF $M_{310}$- DETERMINATION OF $M_{2W1}$ IS CORRECT. | SWITCH TO STATE 7 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 7 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 7 WITH PROTECTION AS LINE SELECTION |
| 46 | △ | × | ○ | ○ | FAULT IN MONITOR OF $M_{40}$ AND $M_{310}$- DETERMINATION OF $M_{2W1}$ IS CORRECT. | SWITCH TO STATE 7 WITH PROTECTION AS LINE SELECTION |
| 47 | △ | × | ○ | △ | FAULT IN MONITOR OF $M_{310}$- DETERMINATION OF $M_{2W1}$ IS CORRECT. | SWITCH TO STATE 7 WITH PROTECTION AS LINE SELECTION |
| 48 | △ | × | ○ | × | FAULT IN MONITOR OF $M_{310}$- DETERMINATION OF $M_{2W1}$ IS CORRECT. | SWITCH TO STATE 7 WITH PROTECTION AS LINE SELECTION |
| 49 | △ | × | △ | ○ | FAULT IN MONITOR OF $M_{40}$- DETERMINATION OF $M_{2W1}$ IS CORRECT. | SWITCH TO STATE 7 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 7 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 7 WITH PROTECTION AS LINE SELECTION |
| 52 | △ | × | × | ○ | FAULT IN MONITOR OF $M_{40}$- DETERMINATION OF $M_{2W1}$ IS CORRECT. | SWITCH TO STATE 7 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 7 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 7 WITH PROTECTION AS LINE SELECTION |

WHEN FERF IS DETECTED (3)

| NUMBER | $M_{1W}$ | $M_{2W1}$ | $M_{310}$ | $M_{40}$ | DETERMINATION | SWITCH-TO TARGET |
|---|---|---|---|---|---|---|
| 55 | × | O | O | O | FAULT IN MONITOR OF $M_{2W1}$, $M_{310}$ AND $M_{40}$. DETERMINATION OF $M_{1W}$ IS CORRECT. | SWITCH TO STATE 7 WITH PROTECTION AS LINE SELECTION |
| 56 | × | O | O | △ | FAULT IN MONITOR OF $M_{2W1}$ AND $M_{310}$. DETERMINATION OF $M_{1W}$ IS CORRECT. | SWITCH TO STATE 7 WITH PROTECTION AS LINE SELECTION |
| 57 | × | O | O | × | FAULT IN MONITOR OF $M_{2W1}$ AND $M_{310}$. DETERMINATION OF $M_{1W}$ IS CORRECT. | SWITCH TO STATE 7 WITH PROTECTION AS LINE SELECTION |
| 58 | × | O | △ | O | FAULT IN MONITOR OF $M_{2W1}$ AND $M_{40}$. DETERMINATION OF $M_{1W}$ IS CORRECT. | SWITCH TO STATE 7 WITH PROTECTION AS LINE SELECTION |
| 59 | × | O | △ | △ | FAULT IN MONITOR OF $M_{2W1}$. DETERMINATION OF $M_{1W}$ IS CORRECT. | SWITCH TO STATE 7 WITH PROTECTION AS LINE SELECTION |
| 60 | × | O | △ | × | FAULT IN MONITOR OF $M_{2W1}$. DETERMINATION OF $M_{1W}$ IS CORRECT. | SWITCH TO STATE 7 WITH PROTECTION AS LINE SELECTION |
| 61 | × | O | × | O | FAULT IN MONITOR OF $M_{2W1}$, $M_{310}$ AND $M_{40}$. DETERMINATION OF $M_{1W}$ IS CORRECT. | SWITCH TO STATE 7 WITH PROTECTION AS LINE SELECTION |
| 62 | × | O | × | △ | FAULT IN MONITOR OF $M_{2W1}$. DETERMINATION OF $M_{1W}$ IS CORRECT. | SWITCH TO STATE 7 WITH PROTECTION AS LINE SELECTION |
| 63 | × | O | × | × | FAULT IN MONITOR OF $M_{2W1}$. DETERMINATION OF $M_{1W}$ IS CORRECT. | SWITCH TO STATE 7 WITH PROTECTION AS LINE SELECTION |
| 64 | × | △ | O | O | FAULT IN MONITOR OF $M_{310}$ AND $M_{40}$. DETERMINATION OF $M_{1W}$ IS CORRECT. | SWITCH TO STATE 7 WITH PROTECTION AS LINE SELECTION |
| 65 | × | △ | O | △ | FAULT IN MONITOR OF $M_{310}$. DETERMINATION OF $M_{1W}$ IS CORRECT. | SWITCH TO STATE 7 WITH PROTECTION AS LINE SELECTION |
| 66 | × | △ | O | × | FAULT IN MONITOR OF $M_{310}$. DETERMINATION OF $M_{1W}$ IS CORRECT. | SWITCH TO STATE 7 WITH PROTECTION AS LINE SELECTION |
| 67 | × | △ | △ | O | FAULT IN MONITOR OF $M_{40}$. DETERMINATION OF $M_{1W}$ IS CORRECT. | SWITCH TO STATE 7 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 7 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 7 WITH PROTECTION AS LINE SELECTION |
| 70 | × | △ | × | O | FAULT IN MONITOR OF $M_{40}$. DETERMINATION OF $M_{1W}$ IS CORRECT. | SWITCH TO STATE 7 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 7 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 7 WITH PROTECTION AS LINE SELECTION |
| 73 | × | × | O | O | FAULT IN MONITOR OF $M_{310}$ AND $M_{40}$. DETERMINATION OF $M_{1W}$ IS CORRECT. | SWITCH TO STATE 7 WITH PROTECTION AS LINE SELECTION |
| 74 | × | × | O | △ | FAULT IN MONITOR OF $M_{310}$. DETERMINATION OF $M_{1W}$ IS CORRECT. | SWITCH TO STATE 7 WITH PROTECTION AS LINE SELECTION |
| 75 | × | × | O | × | FAULT IN MONITOR OF $M_{310}$. DETERMINATION OF $M_{1W}$ IS CORRECT. | SWITCH TO STATE 7 WITH PROTECTION AS LINE SELECTION |
| 76 | × | × | △ | O | FAULT IN MONITOR OF $M_{40}$. DETERMINATION OF $M_{1W}$ IS CORRECT. | SWITCH TO STATE 7 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 7 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 7 WITH PROTECTION AS LINE SELECTION |
| 79 | × | × | × | O | FAULT IN MONITOR OF $M_{40}$. DETERMINATION OF $M_{1W}$ IS CORRECT. | SWITCH TO STATE 7 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 7 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 7 WITH PROTECTION AS LINE SELECTION |

F I G. 2 6

WHEN FERF IS DETECTED (1)

| NUMBER | $M_{4W}$ | $M_{2W1}$ | $M_{311}$ | $M_{41}$ | DETERMINATION | SWITCH-TO TARGET |
|---|---|---|---|---|---|---|
| 1 | O | O | O | O | FAULT IN TRANSMISSION LINE OF SYSTEM 1 ON CLIENT SIDE | SWITCH TO STATE 3 WITH FERF MONITOR SWITCHED TO SYSTEM 0 |
| 2 | O | O | O | △ | FAULT IN 2:1 SEL | SWITCH TO STATE 3 WITH FERF MONITOR SWITCHED TO SYSTEM 0 |
| 3 | O | O | O | × | FAULT IN 2:1 SEL | SWITCH TO STATE 3 WITH FERF MONITOR SWITCHED TO SYSTEM 0 |
| 4 | O | O | △ | O | FAULT IN 4n×4n SW SYSTEM 1 | SWITCH TO STATE 2 WITH SYSTEM 0 SELECTED FOR 4n×4n SW |
| 5 | O | O | △ | △ | FAULT IN 4n×4n SW SYSTEM 1 | SWITCH TO STATE 2 WITH SYSTEM 0 SELECTED FOR 4n×4n SW |
| 6 | O | O | △ | × | FAULT IN 4n×4n SW SYSTEM 1 | SWITCH TO STATE 2 WITH SYSTEM 0 SELECTED FOR 4n×4n SW |
| 7 | O | O | × | O | FAULT IN MONITOR OF $M_{40}$. DETERMINATION OF $M_{310}$ IS CORRECT. | SWITCH TO STATE 2 WITH SYSTEM 0 SELECTED FOR 4n×4n SW |
| 8 | O | O | × | △ | FAULT IN 4n×4n SW SYSTEM 1 | SWITCH TO STATE 2 WITH SYSTEM 0 SELECTED FOR 4n×4n SW |
| 9 | O | O | × | × | FAULT IN 4n×4n SW SYSTEM 1 | SWITCH TO STATE 2 WITH SYSTEM 0 SELECTED FOR 4n×4n SW |
| 10 | O | △ | O | O | FAULT IN TRANSMISSION LINE OF SYSTEM 0 ON CLIENT SIDE | SWITCH TO STATE 3 WITH FERF MONITOR SWITCHED TO SYSTEM 0 |
| 11 | O | △ | O | △ | FAULT IN 2:1 SEL | SWITCH TO STATE 3 WITH FERF MONITOR SWITCHED TO SYSTEM 0 |
| 12 | O | △ | O | × | FAULT IN 2:1 SEL | SWITCH TO STATE 3 WITH FERF MONITOR SWITCHED TO SYSTEM 0 |
| 13 | O | △ | △ | O | FAULT IN 1:2 DIS | SWITCH TO STATE 8 WITH PROTECTION AS LINE SELECTION |
| 14 | O | △ | △ | △ | FAULT IN 1:2 DIS | SWITCH TO STATE 8 WITH PROTECTION AS LINE SELECTION |
| 15 | O | △ | △ | × | FAULT IN 1:2 DIS | SWITCH TO STATE 8 WITH PROTECTION AS LINE SELECTION |
| 16 | O | △ | × | O | FAULT IN MONITOR OF $M_{40}$. MONITOR OF $M_{310}$ IS CORRECT. | SWITCH TO STATE 2 WITH SYSTEM 0 SELECTED FOR 4n×4n SW |
| 17 | O | △ | × | △ | FAULT IN 1:2 DIS | SWITCH TO STATE 8 WITH PROTECTION AS LINE SELECTION |
| 18 | O | △ | × | × | FAULT IN 1:2 DIS | SWITCH TO STATE 8 WITH PROTECTION AS LINE SELECTION |
| 19 | O | × | O | O | FAULT IN MONITOR OF $M_{310}$ AND $M_{40}$. DETERMINATION OF $M_{2W0}$ IS CORRECT. | SWITCH TO STATE 2 WITH SYSTEM 0 SELECTED FOR 4n×4n SW |
| 20 | O | × | O | △ | FAULT IN MONITOR OF $M_{310}$. DETERMINATION OF $M_{2W0}$ IS CORRECT. | SWITCH TO STATE 2 WITH SYSTEM 0 SELECTED FOR 4n×4n SW |
| 21 | O | × | O | × | FAULT IN MONITOR OF $M_{310}$. DETERMINATION OF $M_{40}$ IS CORRECT. | SWITCH TO STATE 2 WITH SYSTEM 0 SELECTED FOR 4n×4n SW |
| 22 | O | × | △ | O | FAULT IN MONITOR OF $M_{40}$. DETERMINATION OF $M_{2W1}$ IS CORRECT. | SWITCH TO STATE 8 WITH PROTECTION AS LINE SELECTION |
| 23 | O | × | △ | △ | FAULT IN 1:2 DIS | SWITCH TO STATE 8 WITH PROTECTION AS LINE SELECTION |
| 24 | O | × | △ | × | FAULT IN 1:2 DIS | SWITCH TO STATE 8 WITH PROTECTION AS LINE SELECTION |
| 25 | O | × | × | O | FAULT IN MONITOR OF $M_{40}$. DETERMINATION OF $M_{2W1}$ IS CORRECT. | SWITCH TO STATE 2 WITH SYSTEM 0 SELECTED FOR 4n×4n SW |
| 26 | O | × | × | △ | FAULT IN 1:2 DIS | SWITCH TO STATE 8 WITH PROTECTION AS LINE SELECTION |
| 27 | O | × | × | × | FAULT IN 1:2 DIS | SWITCH TO STATE 8 WITH PROTECTION AS LINE SELECTION |

F I G. 2 7

WHEN FERF IS DETECTED (2)

| NUMBER | $M_{1W}$ | $M_{2W1}$ | $M_{311}$ | $M_{41}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 3 WITH FERF MONITOR SWITCHED TO SYSTEM 0 |
| 29 | △ | ○ | ○ | △ | FAULT IN TRANSMISSION LINE OF SYSTEM 0 ON CLIENT SIDE | SWITCH TO STATE 3 WITH FERF MONITOR SWITCHED TO SYSTEM 0 |
| 30 | △ | ○ | ○ | × | FAULT IN TRANSMISSION LINE OF SYSTEM 0 ON CLIENT SIDE | SWITCH TO STATE 3 WITH FERF MONITOR SWITCHED TO SYSTEM 0 |
| 31 | △ | ○ | △ | ○ | FAULT IN TRANSMISSION LINE OF SYSTEM 0 ON CLIENT SIDE | SWITCH TO STATE 3 WITH FERF MONITOR SWITCHED TO SYSTEM 0 |
| 32 | △ | ○ | △ | △ | FAULT IN $4n \times 4n$ SW SYSTEM 1 | SWITCH TO STATE 2 WITH SYSTEM 0 SELECTED FOR $4n \times 4n$ SW |
| 33 | △ | ○ | △ | × | FAULT IN 1:2 DIS | SWITCH TO STATE 8 WITH PROTECTION AS LINE SELECTION |
| 34 | △ | ○ | × | ○ | FAULT IN MONITOR OF $M_{2W1}$. DETERMINATION OF $M_{2W1}$ IS CORRECT. | SWITCH TO STATE 2 WITH SYSTEM 0 SELECTED FOR $4n \times 4n$ SW |
| 35 | △ | ○ | × | △ | FAULT IN $4n \times 4n$ SW SYSTEM 1 | SWITCH TO STATE 2 WITH SYSTEM 0 SELECTED FOR $4n \times 4n$ SW |
| 36 | △ | ○ | × | × | FAULT IN $4n \times 4n$ SW SYSTEM 1 | SWITCH TO STATE 2 WITH SYSTEM 0 SELECTED FOR $4n \times 4n$ SW |
| 37 | △ | △ | ○ | ○ | FAULT IN TRANSMISSION LINE OF SYSTEM 0 ON CLIENT SIDE | SWITCH TO STATE 1 WITH FERF MONITOR SWITCHED TO SYSTEM 0 |
| 38 | △ | △ | ○ | △ | FAULT IN TRANSMISSION LINE BETWEEN TRANSPONDER AND 1:2 BRANCH | SWITCH TO STATE 8 WITH PROTECTION AS LINE SELECTION |
| 39 | △ | △ | ○ | × | FAULT IN 2:1 SEL | SWITCH TO STATE 3 WITH FERF MONITOR SWITCHED TO SYSTEM 0 |
| 40 | △ | △ | △ | ○ | FAULT IN TRANSMISSION LINE BETWEEN TRANSPONDER AND 1:2 BRANCH | SWITCH TO STATE 8 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 8 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 8 WITH PROTECTION AS LINE SELECTION |
| 43 | △ | △ | × | ○ | FAULT IN MONITOR OF $M_{40}$. DETERMINATION OF $M_{310}$ IS CORRECT. | SWITCH TO STATE 8 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 8 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 8 WITH PROTECTION AS LINE SELECTION |
| 46 | △ | × | ○ | ○ | FAULT IN MONITOR OF $M_{40}$ AND $M_{310}$. DETERMINATION OF $M_{310}$ IS CORRECT. | SWITCH TO STATE 8 WITH PROTECTION AS LINE SELECTION |
| 47 | △ | × | ○ | △ | FAULT IN MONITOR OF $M_{310}$. DETERMINATION OF $M_{2W1}$ IS CORRECT. | SWITCH TO STATE 8 WITH PROTECTION AS LINE SELECTION |
| 48 | △ | × | ○ | × | FAULT IN MONITOR OF $M_{310}$. DETERMINATION OF $M_{2W1}$ IS CORRECT. | SWITCH TO STATE 8 WITH PROTECTION AS LINE SELECTION |
| 49 | △ | × | △ | ○ | FAULT IN MONITOR OF $M_{40}$. DETERMINATION OF $M_{2W1}$ IS CORRECT. | SWITCH TO STATE 8 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 8 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 8 WITH PROTECTION AS LINE SELECTION |
| 52 | △ | × | × | ○ | FAULT IN MONITOR OF $M_{40}$. DETERMINATION OF $M_{310}$ IS CORRECT. | SWITCH TO STATE 8 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 8 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 8 WITH PROTECTION AS LINE SELECTION |

WHEN FERF IS DETECTED (3)

| NUMBER | $M_{1W}$ | $M_{2W1}$ | $M_{311}$ | $M_{41}$ | DETERMINATION | SWITCH-TO TARGET |
|---|---|---|---|---|---|---|
| 55 | × | ○ | ○ | ○ | FAULT IN MONITOR OF $M_{2W1}$-, $M_{310}$- AND $M_{40}$- DETERMINATION OF $M_{1W}$ IS CORRECT. | SWITCH TO STATE 8 WITH PROTECTION AS LINE SELECTION |
| 56 | × | ○ | ○ | △ | FAULT IN MONITOR OF $M_{2W1}$-, $M_{310}$ AND $M_{310}$- DETERMINATION OF $M_{1W}$ IS CORRECT. | SWITCH TO STATE 8 WITH PROTECTION AS LINE SELECTION |
| 57 | × | ○ | ○ | × | FAULT IN MONITOR OF $M_{2W1}$-, $M_{310}$ AND $M_{310}$- DETERMINATION OF $M_{1W}$ IS CORRECT. | SWITCH TO STATE 8 WITH PROTECTION AS LINE SELECTION |
| 58 | × | ○ | △ | ○ | FAULT IN MONITOR OF $M_{2W1}$- AND $M_{40}$- DETERMINATION OF $M_{1W}$ IS CORRECT. | SWITCH TO STATE 8 WITH PROTECTION AS LINE SELECTION |
| 59 | × | ○ | △ | △ | FAULT IN MONITOR OF $M_{2W1}$-. DETERMINATION OF $M_{1W}$ IS CORRECT. | SWITCH TO STATE 8 WITH PROTECTION AS LINE SELECTION |
| 60 | × | ○ | △ | × | FAULT IN MONITOR OF $M_{2W1}$-, $M_{310}$ AND $M_{40}$- DETERMINATION OF $M_{1W}$ IS CORRECT. | SWITCH TO STATE 8 WITH PROTECTION AS LINE SELECTION |
| 61 | × | ○ | × | ○ | FAULT IN MONITOR OF $M_{2W1}$- AND $M_{40}$- DETERMINATION OF $M_{1W}$ IS CORRECT. | SWITCH TO STATE 8 WITH PROTECTION AS LINE SELECTION |
| 62 | × | ○ | × | △ | FAULT IN MONITOR OF $M_{2W1}$-. DETERMINATION OF $M_{1W}$ IS CORRECT. | SWITCH TO STATE 8 WITH PROTECTION AS LINE SELECTION |
| 63 | × | ○ | × | × | FAULT IN MONITOR OF $M_{310}$- AND $M_{40}$- DETERMINATION OF $M_{1W}$ IS CORRECT. | SWITCH TO STATE 8 WITH PROTECTION AS LINE SELECTION |
| 64 | × | △ | ○ | ○ | FAULT IN MONITOR OF $M_{310}$- AND $M_{40}$- DETERMINATION OF $M_{1W}$ IS CORRECT. | SWITCH TO STATE 8 WITH PROTECTION AS LINE SELECTION |
| 65 | × | △ | ○ | △ | FAULT IN MONITOR OF $M_{310}$-. DETERMINATION OF $M_{1W}$ IS CORRECT. | SWITCH TO STATE 8 WITH PROTECTION AS LINE SELECTION |
| 66 | × | △ | ○ | × | FAULT IN MONITOR OF $M_{310}$-. DETERMINATION OF $M_{1W}$ IS CORRECT. | SWITCH TO STATE 8 WITH PROTECTION AS LINE SELECTION |
| 67 | × | △ | △ | ○ | FAULT IN MONITOR OF $M_{40}$-. DETERMINATION OF $M_{1W}$ IS CORRECT. | SWITCH TO STATE 8 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 8 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 8 WITH PROTECTION AS LINE SELECTION |
| 70 | × | △ | × | ○ | FAULT IN MONITOR OF $M_{40}$-. DETERMINATION OF $M_{1W}$ IS CORRECT. | SWITCH TO STATE 8 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 8 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 8 WITH PROTECTION AS LINE SELECTION |
| 73 | × | × | ○ | ○ | FAULT IN MONITOR OF $M_{310}$- AND $M_{40}$- DETERMINATION OF $M_{1W}$ IS CORRECT. | SWITCH TO STATE 8 WITH PROTECTION AS LINE SELECTION |
| 74 | × | × | ○ | △ | FAULT IN MONITOR OF $M_{310}$-. DETERMINATION OF $M_{1W}$ IS CORRECT. | SWITCH TO STATE 8 WITH PROTECTION AS LINE SELECTION |
| 75 | × | × | ○ | × | FAULT IN MONITOR OF $M_{310}$-. DETERMINATION OF $M_{1W}$ IS CORRECT. | SWITCH TO STATE 8 WITH PROTECTION AS LINE SELECTION |
| 76 | × | × | △ | ○ | FAULT IN MONITOR OF $M_{40}$-. DETERMINATION OF $M_{1W}$ IS CORRECT. | SWITCH TO STATE 8 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 8 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 8 WITH PROTECTION AS LINE SELECTION |
| 79 | × | × | × | ○ | FAULT IN MONITOR OF $M_{40}$-. DETERMINATION OF $M_{1W}$ IS CORRECT. | SWITCH TO STATE 8 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 8 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 8 WITH PROTECTION AS LINE SELECTION |

WHEN FERF IS DETECTED (1)

| NUMBER | $M_{1P}$ | $M_{2PO}$ | $M_{300}$ | $M_{40}$ | DETERMINATION | SWITCH-TO TARGET |
|---|---|---|---|---|---|---|
| 1 | O | O | O | O | FAULT IN TRANSMISSION LINE OF SYSTEM 0 ON CLIENT SIDE | SWITCH TO STATE 6 WITH FERF MONITOR SWITCHED TO SYSTEM 1 |
| 2 | O | O | O | △ | FAULT IN 2:1 SEL | SWITCH TO STATE 6 WITH FERF MONITOR SWITCHED TO SYSTEM 1 |
| 3 | O | O | O | × | FAULT IN 2:1 SEL | SWITCH TO STATE 6 WITH FERF MONITOR SWITCHED TO SYSTEM 1 |
| 4 | O | O | △ | O | FAULT IN 4n×4n SW SYSTEM 0 | SWITCH TO STATE 7 WITH SYSTEM 1 SELECTED FOR 4n×4n SW |
| 5 | O | O | △ | △ | FAULT IN 4n×4n SW SYSTEM 0 | SWITCH TO STATE 7 WITH SYSTEM 1 SELECTED FOR 4n×4n SW |
| 6 | O | O | △ | × | FAULT IN 4n×4n SW SYSTEM 0 | SWITCH TO STATE 7 WITH SYSTEM 1 SELECTED FOR 4n×4n SW |
| 7 | O | O | × | O | FAULT IN MONITOR OF $M_{40}$. DETERMINATION OF $M_{300}$ IS CORRECT. | SWITCH TO STATE 7 WITH SYSTEM 1 SELECTED FOR 4n×4n SW |
| 8 | O | O | × | △ | FAULT IN 4n×4n SW SYSTEM 0 | SWITCH TO STATE 7 WITH SYSTEM 1 SELECTED FOR 4n×4n SW |
| 9 | O | O | × | × | FAULT IN 4n×4n SW SYSTEM 0 | SWITCH TO STATE 7 WITH SYSTEM 1 SELECTED FOR 4n×4n SW |
| 10 | O | △ | O | O | FAULT IN TRANSMISSION LINE OF SYSTEM 0 ON CLIENT SIDE | SWITCH TO STATE 6 WITH FERF MONITOR SWITCHED TO SYSTEM 1 |
| 11 | O | △ | O | △ | FAULT IN 2:1 SEL | SWITCH TO STATE 6 WITH FERF MONITOR SWITCHED TO SYSTEM 1 |
| 12 | O | △ | O | × | FAULT IN 2:1 SEL | SWITCH TO STATE 6 WITH FERF MONITOR SWITCHED TO SYSTEM 1 |
| 13 | O | △ | △ | O | FAULT IN 1:2 DIS | SWITCH TO STATE 1 WITH PROTECTION AS LINE SELECTION |
| 14 | O | △ | △ | △ | FAULT IN 1:2 DIS | SWITCH TO STATE 1 WITH PROTECTION AS LINE SELECTION |
| 15 | O | △ | △ | × | FAULT IN 1:2 DIS | SWITCH TO STATE 1 WITH PROTECTION AS LINE SELECTION |
| 16 | O | △ | × | O | FAULT IN MONITOR OF $M_{41}$. MONITOR OF $M_{41}$ IS CORRECT. | SWITCH TO STATE 7 WITH SYSTEM 1 SELECTED FOR 4n×4n SW |
| 17 | O | △ | × | △ | FAULT IN 1:2 DIS | SWITCH TO STATE 1 WITH PROTECTION AS LINE SELECTION |
| 18 | O | △ | × | × | FAULT IN 1:2 DIS | SWITCH TO STATE 1 WITH PROTECTION AS LINE SELECTION |
| 19 | O | × | O | O | FAULT IN MONITOR OF $M_{301}$ AND $M_{41}$. DETERMINATION OF $M_{2PO}$ IS CORRECT. | SWITCH TO STATE 7 WITH SYSTEM 1 SELECTED FOR 4n×4n SW |
| 20 | O | × | O | △ | FAULT IN MONITOR OF $M_{301}$. DETERMINATION OF $M_{2PO}$ IS CORRECT. | SWITCH TO STATE 7 WITH SYSTEM 1 SELECTED FOR 4n×4n SW |
| 21 | O | × | O | × | FAULT IN MONITOR OF $M_{301}$. DETERMINATION OF $M_{2PO}$ IS CORRECT. | SWITCH TO STATE 7 WITH SYSTEM 1 SELECTED FOR 4n×4n SW |
| 22 | O | × | △ | O | FAULT IN MONITOR OF $M_{41}$. DETERMINATION OF $M_{2PO}$ IS CORRECT. | SWITCH TO STATE 7 WITH SYSTEM 1 SELECTED FOR 4n×4n SW |
| 23 | O | × | △ | △ | FAULT IN 1:2 DIS | SWITCH TO STATE 1 WITH PROTECTION AS LINE SELECTION |
| 24 | O | × | △ | × | FAULT IN 1:2 DIS | SWITCH TO STATE 1 WITH PROTECTION AS LINE SELECTION |
| 25 | O | × | × | O | FAULT IN MONITOR OF $M_{41}$. DETERMINATION OF $M_{2PO}$ IS CORRECT. | SWITCH TO STATE 7 WITH SYSTEM 1 SELECTED FOR 4n×4n SW |
| 26 | O | × | × | △ | FAULT IN 1:2 DIS | SWITCH TO STATE 1 WITH PROTECTION AS LINE SELECTION |
| 27 | O | × | × | × | FAULT IN 1:2 DIS | SWITCH TO STATE 1 WITH PROTECTION AS LINE SELECTION |

F I G. 3 0

WHEN FERF IS DETECTED (2)

| NUMBER | $M_{1P}$ | $M_{2P0}$ | $M_{300}$ | $M_{40}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 6 WITH FERF MONITOR SWITCHED TO SYSTEM 1 |
| 29 | △ | ○ | ○ | △ | FAULT IN TRANSMISSION LINE OF SYSTEM 0 ON CLIENT SIDE | SWITCH TO STATE 6 WITH FERF MONITOR SWITCHED TO SYSTEM 1 |
| 30 | △ | ○ | ○ | × | FAULT IN TRANSMISSION LINE OF SYSTEM 0 ON CLIENT SIDE | SWITCH TO STATE 6 WITH FERF MONITOR SWITCHED TO SYSTEM 1 |
| 31 | △ | ○ | △ | ○ | FAULT IN TRANSMISSION LINE OF SYSTEM 0 ON CLIENT SIDE | SWITCH TO STATE 6 WITH FERF MONITOR SWITCHED TO SYSTEM 1 |
| 32 | △ | ○ | △ | △ | FAULT IN 4n×4n SW SYSTEM 0 | SWITCH TO STATE 7 WITH SYSTEM 1 SELECTED FOR 4n×4n SW |
| 33 | △ | ○ | △ | × | FAULT IN 1:2 DIS | SWITCH TO STATE 1 WITH PROTECTION AS LINE SELECTION |
| 34 | △ | ○ | × | ○ | FAULT IN MONITOR OF $M_{41}$. DETERMINATION OF $M_{2P0}$ IS CORRECT. | SWITCH TO STATE 7 WITH SYSTEM 1 SELECTED FOR 4n×4n SW |
| 35 | △ | ○ | × | △ | FAULT IN 4n×4n SW SYSTEM 0 | SWITCH TO STATE 7 WITH SYSTEM 1 SELECTED FOR 4n×4n SW |
| 36 | △ | ○ | × | × | FAULT IN 4n×4n SW SYSTEM 0 | SWITCH TO STATE 7 WITH SYSTEM 1 SELECTED FOR 4n×4n SW |
| 37 | △ | △ | ○ | ○ | FAULT IN TRANSMISSION LINE OF SYSTEM 0 ON CLIENT SIDE | SWITCH TO STATE 6 WITH FERF MONITOR SWITCHED TO SYSTEM 1 |
| 38 | △ | △ | ○ | △ | FAULT IN TRANSMISSION LINE BETWEEN TRANSPONDER AND 1:2 BRANCH | SWITCH TO STATE 1 WITH PROTECTION AS LINE SELECTION |
| 39 | △ | △ | ○ | × | FAULT IN 2:1 SEL | SWITCH TO STATE 6 WITH FERF MONITOR SWITCHED TO SYSTEM 1 |
| 40 | △ | △ | △ | ○ | FAULT IN TRANSMISSION LINE BETWEEN TRANSPONDER AND 1:2 BRANCH | SWITCH TO STATE 1 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 1 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 1 WITH PROTECTION AS LINE SELECTION |
| 43 | △ | △ | × | ○ | FAULT IN MONITOR OF $M_{301}$. DETERMINATION OF $M_{2P0}$ IS CORRECT. | SWITCH TO STATE 1 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 1 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 1 WITH PROTECTION AS LINE SELECTION |
| 46 | △ | × | ○ | ○ | FAULT IN MONITOR OF $M_{41}$ AND $M_{301}$. DETERMINATION OF $M_{2P0}$ IS CORRECT. | SWITCH TO STATE 1 WITH PROTECTION AS LINE SELECTION |
| 47 | △ | × | ○ | △ | FAULT IN MONITOR OF $M_{301}$. DETERMINATION OF $M_{2P0}$ IS CORRECT. | SWITCH TO STATE 1 WITH PROTECTION AS LINE SELECTION |
| 48 | △ | × | ○ | × | FAULT IN MONITOR OF $M_{300}$. DETERMINATION OF $M_{2P0}$ IS CORRECT. | SWITCH TO STATE 1 WITH PROTECTION AS LINE SELECTION |
| 49 | △ | × | △ | ○ | FAULT IN MONITOR OF $M_{41}$. DETERMINATION OF $M_{301}$ IS CORRECT. | SWITCH TO STATE 1 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 1 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 1 WITH PROTECTION AS LINE SELECTION |
| 52 | △ | × | × | ○ | FAULT IN MONITOR OF $M_{41}$. DETERMINATION OF $M_{301}$ IS CORRECT. | SWITCH TO STATE 1 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 1 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 1 WITH PROTECTION AS LINE SELECTION |

FIG. 31

WHEN FERF IS DETECTED (3)

| NUMBER | $M_{1P}$ | $M_{2P0}$ | $M_{301}$ | $M_{40}$ | DETERMINATION | SWITCH-TO TARGET |
|---|---|---|---|---|---|---|
| 55 | x | O | O | O | FAULT IN MONITOR OF $M_{2P0}$. DETERMINATION OF $M_{1P}$ IS CORRECT. | SWITCH TO STATE 1 WITH PROTECTION AS LINE SELECTION |
| 56 | x | O | O | △ | FAULT IN MONITOR OF $M_{2P0}$. DETERMINATION OF $M_{1P}$ IS CORRECT. | SWITCH TO STATE 1 WITH PROTECTION AS LINE SELECTION |
| 57 | x | O | O | x | FAULT IN MONITOR OF $M_{2P0}$. DETERMINATION OF $M_{1P}$ IS CORRECT. | SWITCH TO STATE 1 WITH PROTECTION AS LINE SELECTION |
| 58 | x | O | △ | O | FAULT IN MONITOR OF $M_{2P0}$. DETERMINATION OF $M_{1P}$ IS CORRECT. | SWITCH TO STATE 1 WITH PROTECTION AS LINE SELECTION |
| 59 | x | O | △ | △ | FAULT IN MONITOR OF $M_{2P0}$. DETERMINATION OF $M_{1P}$ IS CORRECT. | SWITCH TO STATE 1 WITH PROTECTION AS LINE SELECTION |
| 60 | x | O | △ | x | FAULT IN MONITOR OF $M_{2P0}$. DETERMINATION OF $M_{1PW}$ IS CORRECT. | SWITCH TO STATE 1 WITH PROTECTION AS LINE SELECTION |
| 61 | x | O | x | O | FAULT IN MONITOR OF $M_{2P0}$. DETERMINATION OF $M_{1P}$ IS CORRECT. | SWITCH TO STATE 1 WITH PROTECTION AS LINE SELECTION |
| 62 | x | O | x | △ | FAULT IN MONITOR OF $M_{2P0}$. DETERMINATION OF $M_{1P}$ IS CORRECT. | SWITCH TO STATE 1 WITH PROTECTION AS LINE SELECTION |
| 63 | x | O | x | x | FAULT IN MONITOR OF $M_{2P0}$. DETERMINATION OF $M_{1P}$ IS CORRECT. | SWITCH TO STATE 1 WITH PROTECTION AS LINE SELECTION |
| 64 | x | △ | O | O | FAULT IN MONITOR OF $M_{301}$. DETERMINATION OF $M_{1P}$ IS CORRECT. | SWITCH TO STATE 1 WITH PROTECTION AS LINE SELECTION |
| 65 | x | △ | O | △ | FAULT IN MONITOR OF $M_{301}$. DETERMINATION OF $M_{1P}$ IS CORRECT. | SWITCH TO STATE 1 WITH PROTECTION AS LINE SELECTION |
| 66 | x | △ | O | x | FAULT IN MONITOR OF $M_{301}$. DETERMINATION OF $M_{1P}$ IS CORRECT. | SWITCH TO STATE 1 WITH PROTECTION AS LINE SELECTION |
| 67 | x | △ | △ | O | FAULT IN MONITOR OF $M_{41}$. DETERMINATION OF $M_{1P}$ IS CORRECT. | SWITCH TO STATE 1 WITH PROTECTION AS LINE SELECTION |
| 68 | x | △ | △ | △ | FAULT IN TRANSMISSION LINE BETWEEN TRANSPONDER AND 1:2 BRANCH | SWITCH TO STATE 1 WITH PROTECTION AS LINE SELECTION |
| 69 | x | △ | △ | x | FAULT IN TRANSMISSION LINE BETWEEN TRANSPONDER AND 1:2 BRANCH | SWITCH TO STATE 1 WITH PROTECTION AS LINE SELECTION |
| 70 | x | △ | x | O | FAULT IN MONITOR OF $M_{41}$. DETERMINATION OF $M_{1P}$ IS CORRECT. | SWITCH TO STATE 1 WITH PROTECTION AS LINE SELECTION |
| 71 | x | △ | x | △ | FAULT IN TRANSMISSION LINE BETWEEN TRANSPONDER AND 1:2 BRANCH | SWITCH TO STATE 1 WITH PROTECTION AS LINE SELECTION |
| 72 | x | △ | x | x | FAULT IN TRANSMISSION LINE BETWEEN TRANSPONDER AND 1:2 BRANCH | SWITCH TO STATE 1 WITH PROTECTION AS LINE SELECTION |
| 73 | x | x | O | O | FAULT IN MONITOR OF $M_{301}$. DETERMINATION OF $M_{1P}$ IS CORRECT. | SWITCH TO STATE 1 WITH PROTECTION AS LINE SELECTION |
| 74 | x | x | O | △ | FAULT IN MONITOR OF $M_{301}$. DETERMINATION OF $M_{1W}$ IS CORRECT. | SWITCH TO STATE 1 WITH PROTECTION AS LINE SELECTION |
| 75 | x | x | O | x | FAULT IN MONITOR OF $M_{301}$. DETERMINATION OF $M_{1P}$ IS CORRECT. | SWITCH TO STATE 1 WITH PROTECTION AS LINE SELECTION |
| 76 | x | x | △ | O | FAULT IN MONITOR OF $M_{301}$. DETERMINATION OF $M_{1P}$ IS CORRECT. | SWITCH TO STATE 1 WITH PROTECTION AS LINE SELECTION |
| 77 | x | x | △ | △ | FAULT IN TRANSMISSION LINE BETWEEN TRANSPONDER AND 1:2 BRANCH | SWITCH TO STATE 1 WITH PROTECTION AS LINE SELECTION |
| 78 | x | x | △ | x | FAULT IN TRANSMISSION LINE BETWEEN TRANSPONDER AND 1:2 BRANCH | SWITCH TO STATE 1 WITH PROTECTION AS LINE SELECTION |
| 79 | x | x | x | O | FAULT IN MONITOR OF $M_{41}$. DETERMINATION OF $M_{1P}$ IS CORRECT. | SWITCH TO STATE 1 WITH PROTECTION AS LINE SELECTION |
| 80 | x | x | x | △ | FAULT IN TRANSMISSION LINE BETWEEN TRANSPONDER AND 1:2 BRANCH | SWITCH TO STATE 1 WITH PROTECTION AS LINE SELECTION |
| 81 | x | x | x | x | FAULT IN TRANSMISSION LINE BETWEEN TRANSPONDER AND 1:2 BRANCH | SWITCH TO STATE 1 WITH PROTECTION AS LINE SELECTION |

F I G. 32

WHEN FERF IS DETECTED (1)

| NUMBER | $M_{1P}$ | $M_{2PO}$ | $M_{301}$ | $M_{41}$ | DETERMINATION | SWITCH-TO TARGET |
|---|---|---|---|---|---|---|
| 1 | ○ | ○ | ○ | ○ | FAULT IN TRANSMISSION LINE OF SYSTEM 1 ON CLIENT SIDE | SWITCH TO STATE 5 WITH FERF MONITOR SWITCHED TO SYSTEM 0 |
| 2 | ○ | ○ | ○ | △ | FAULT IN 2:1 SEL | SWITCH TO STATE 5 WITH FERF MONITOR SWITCHED TO SYSTEM 0 |
| 3 | ○ | ○ | ○ | × | FAULT IN 2:1 SEL | SWITCH TO STATE 5 WITH FERF MONITOR SWITCHED TO SYSTEM 0 |
| 4 | ○ | ○ | △ | ○ | FAULT IN 4n×4n SW SYSTEM 0 | SWITCH TO STATE 7 WITH SYSTEM 1 SELECTED FOR 4n×4n SW |
| 5 | ○ | ○ | △ | △ | FAULT IN 4n×4n SW SYSTEM 0 | SWITCH TO STATE 7 WITH SYSTEM 1 SELECTED FOR 4n×4n SW |
| 6 | ○ | ○ | △ | × | FAULT IN 4n×4n SW SYSTEM 0 | SWITCH TO STATE 7 WITH SYSTEM 1 SELECTED FOR 4n×4n SW |
| 7 | ○ | ○ | × | ○ | FAULT IN MONITOR OF $M_{40}$. DETERMINATION OF $M_{300}$ IS CORRECT. | SWITCH TO STATE 7 WITH SYSTEM 1 SELECTED FOR 4n×4n SW |
| 8 | ○ | ○ | × | △ | FAULT IN 4n×4n SW SYSTEM 0 | SWITCH TO STATE 7 WITH SYSTEM 1 SELECTED FOR 4n×4n SW |
| 9 | ○ | ○ | × | × | FAULT IN 4n×4n SW SYSTEM 0 | SWITCH TO STATE 7 WITH SYSTEM 1 SELECTED FOR 4n×4n SW |
| 10 | ○ | △ | ○ | ○ | FAULT IN TRANSMISSION LINE OF SYSTEM 0 ON CLIENT SIDE | SWITCH TO STATE 5 WITH FERF MONITOR SWITCHED TO SYSTEM 0 |
| 11 | ○ | △ | ○ | △ | FAULT IN 2:1 SEL | SWITCH TO STATE 5 WITH FERF MONITOR SWITCHED TO SYSTEM 0 |
| 12 | ○ | △ | ○ | × | FAULT IN 2:1 SEL | SWITCH TO STATE 5 WITH FERF MONITOR SWITCHED TO SYSTEM 0 |
| 13 | ○ | △ | △ | ○ | FAULT IN 1:2 DIS | SWITCH TO STATE 2 WITH PROTECTION AS LINE SELECTION |
| 14 | ○ | △ | △ | △ | FAULT IN 1:2 DIS | SWITCH TO STATE 2 WITH PROTECTION AS LINE SELECTION |
| 15 | ○ | △ | △ | × | FAULT IN 1:2 DIS | SWITCH TO STATE 2 WITH PROTECTION AS LINE SELECTION |
| 16 | ○ | △ | × | ○ | FAULT IN MONITOR OF $M_{41}$. MONITOR OF $M_{301}$ IS CORRECT. | SWITCH TO STATE 7 WITH SYSTEM 1 SELECTED FOR 4n×4n SW |
| 17 | ○ | △ | × | △ | FAULT IN 1:2 DIS | SWITCH TO STATE 2 WITH PROTECTION AS LINE SELECTION |
| 18 | ○ | △ | × | × | FAULT IN 1:2 DIS | SWITCH TO STATE 2 WITH PROTECTION AS LINE SELECTION |
| 19 | ○ | × | ○ | ○ | FAULT IN MONITOR OF $M_{301}$ AND $M_{41}$. DETERMINATION OF $M_{2P0}$ IS CORRECT. | SWITCH TO STATE 7 WITH SYSTEM 1 SELECTED FOR 4n×4n SW |
| 20 | ○ | × | ○ | △ | FAULT IN MONITOR OF $M_{301}$. DETERMINATION OF $M_{2P0}$ IS CORRECT. | SWITCH TO STATE 7 WITH SYSTEM 1 SELECTED FOR 4n×4n SW |
| 21 | ○ | × | ○ | × | FAULT IN MONITOR OF $M_{301}$. DETERMINATION OF $M_{2P0}$ IS CORRECT. | SWITCH TO STATE 7 WITH SYSTEM 1 SELECTED FOR 4n×4n SW |
| 22 | ○ | × | △ | ○ | FAULT IN MONITOR OF $M_{41}$. DETERMINATION OF $M_{2P0}$ IS CORRECT. | SWITCH TO STATE 2 WITH PROTECTION AS LINE SELECTION |
| 23 | ○ | × | △ | △ | FAULT IN 1:2 DIS | SWITCH TO STATE 2 WITH PROTECTION AS LINE SELECTION |
| 24 | ○ | × | △ | × | FAULT IN 1:2 DIS | SWITCH TO STATE 2 WITH PROTECTION AS LINE SELECTION |
| 25 | ○ | × | × | ○ | FAULT IN MONITOR OF $M_{41}$. DETERMINATION OF $M_{2P0}$ IS CORRECT. | SWITCH TO STATE 7 WITH SYSTEM 1 SELECTED FOR 4n×4n SW |
| 26 | ○ | × | × | △ | FAULT IN 1:2 DIS | SWITCH TO STATE 2 WITH PROTECTION AS LINE SELECTION |
| 27 | ○ | × | × | × | FAULT IN 1:2 DIS | SWITCH TO STATE 2 WITH PROTECTION AS LINE SELECTION |

F I G. 3 3

WHEN FERF IS DETECTED (2)

| NUMBER | $M_{1P}$ | $M_{2P0}$ | $M_{301}$ | $M_{41}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 5 WITH FERF MONITOR SWITCHED TO SYSTEM 0 |
| 29 | △ | ○ | ○ | △ | FAULT IN TRANSMISSION LINE OF SYSTEM 0 ON CLIENT SIDE | SWITCH TO STATE 5 WITH FERF MONITOR SWITCHED TO SYSTEM 0 |
| 30 | △ | ○ | △ | × | FAULT IN TRANSMISSION LINE OF SYSTEM 0 ON CLIENT SIDE | SWITCH TO STATE 5 WITH FERF MONITOR SWITCHED TO SYSTEM 0 |
| 31 | △ | ○ | △ | ○ | FAULT IN TRANSMISSION LINE OF SYSTEM 0 ON CLIENT SIDE | SWITCH TO STATE 5 WITH FERF MONITOR SWITCHED TO SYSTEM 0 |
| 32 | △ | ○ | △ | △ | FAULT IN 4n×4n SW SYSTEM 0 | SWITCH TO STATE 7 WITH SYSTEM 1 SELECTED FOR 4n×4n SW |
| 33 | △ | ○ | ○ | × | FAULT IN 1:2 DIS | SWITCH TO STATE 2 WITH PROTECTION AS LINE SELECTION |
| 34 | △ | ○ | × | ○ | FAULT IN MONITOR OF $M_{41}$. DETERMINATION OF $M_{2P0}$ IS CORRECT. | SWITCH TO STATE 7 WITH SYSTEM 1 SELECTED FOR 4n×4n SW |
| 35 | △ | ○ | × | △ | FAULT IN 4n×4n SW SYSTEM 0 | SWITCH TO STATE 7 WITH SYSTEM 1 SELECTED FOR 4n×4n SW |
| 36 | △ | ○ | × | × | FAULT IN 4n×4n SW SYSTEM 0 | SWITCH TO STATE 7 WITH SYSTEM 1 SELECTED FOR 4n×4n SW |
| 37 | △ | △ | ○ | ○ | FAULT IN TRANSMISSION LINE OF SYSTEM 0 ON CLIENT SIDE | SWITCH TO STATE 5 WITH FERF MONITOR SWITCHED TO SYSTEM 0 |
| 38 | △ | △ | ○ | △ | FAULT IN TRANSMISSION LINE BETWEEN TRANSPONDER AND 1:2 BRANCH | SWITCH TO STATE 2 WITH PROTECTION AS LINE SELECTION |
| 39 | △ | △ | ○ | × | FAULT IN 2:1 SEL | SWITCH TO STATE 2 WITH PROTECTION AS LINE SELECTION |
| 40 | △ | △ | △ | ○ | FAULT IN TRANSMISSION LINE BETWEEN TRANSPONDER AND 1:2 BRANCH | SWITCH TO STATE 2 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 2 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 2 WITH PROTECTION AS LINE SELECTION |
| 43 | △ | △ | × | ○ | FAULT IN MONITOR OF $M_{41}$. DETERMINATION OF $M_{301}$ IS CORRECT. | SWITCH TO STATE 2 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 2 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 2 WITH PROTECTION AS LINE SELECTION |
| 46 | △ | × | ○ | ○ | FAULT IN MONITOR OF $M_{41}$ AND $M_{301}$. DETERMINATION OF $M_{2P0}$ IS CORRECT. | SWITCH TO STATE 2 WITH PROTECTION AS LINE SELECTION |
| 47 | △ | × | ○ | △ | FAULT IN MONITOR OF $M_{301}$. DETERMINATION OF $M_{2P0}$ IS CORRECT. | SWITCH TO STATE 2 WITH PROTECTION AS LINE SELECTION |
| 48 | △ | × | ○ | × | FAULT IN MONITOR OF $M_{300}$. DETERMINATION OF $M_{2P0}$ IS CORRECT. | SWITCH TO STATE 2 WITH PROTECTION AS LINE SELECTION |
| 49 | △ | × | △ | ○ | FAULT IN MONITOR OF $M_{41}$. DETERMINATION OF $M_{2P0}$ IS CORRECT. | SWITCH TO STATE 2 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 2 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 2 WITH PROTECTION AS LINE SELECTION |
| 52 | △ | × | × | ○ | FAULT IN MONITOR OF $M_{301}$. DETERMINATION OF $M_{2P0}$ IS CORRECT. | SWITCH TO STATE 2 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 2 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 2 WITH PROTECTION AS LINE SELECTION |

FIG. 34

WHEN FERF IS DETECTED (3)

| NUMBER | $M_{1P}$ | $M_{2P0}$ | $M_{301}$ | $M_{41}$ | DETERMINATION | SWITCH-TO TARGET |
|---|---|---|---|---|---|---|
| 55 | × | ○ | ○ | ○ | FAULT IN MONITOR OF $M_{2P0}$. DETERMINATION OF $M_{301}$ AND $M_{41}$. DETERMINATION OF $M_{1P}$ IS CORRECT. | SWITCH TO STATE 2 WITH PROTECTION AS LINE SELECTION |
| 56 | × | ○ | ○ | △ | FAULT IN MONITOR OF $M_{2P0}$ AND $M_{301}$. DETERMINATION OF $M_{1P}$ IS CORRECT. | SWITCH TO STATE 2 WITH PROTECTION AS LINE SELECTION |
| 57 | × | ○ | ○ | × | FAULT IN MONITOR OF $M_{2P0}$ AND $M_{301}$. DETERMINATION OF $M_{1P}$ IS CORRECT. | SWITCH TO STATE 2 WITH PROTECTION AS LINE SELECTION |
| 58 | × | ○ | △ | ○ | FAULT IN MONITOR OF $M_{2P0}$ AND $M_{301}$. DETERMINATION OF $M_{1P}$ IS CORRECT. | SWITCH TO STATE 2 WITH PROTECTION AS LINE SELECTION |
| 59 | × | ○ | △ | △ | FAULT IN MONITOR OF $M_{2P0}$. DETERMINATION OF $M_{1P}$ IS CORRECT. | SWITCH TO STATE 2 WITH PROTECTION AS LINE SELECTION |
| 60 | × | ○ | △ | × | FAULT IN MONITOR OF $M_{2P0}$, $M_{301}$ AND $M_{41}$. DETERMINATION OF $M_{1P}$ IS CORRECT. | SWITCH TO STATE 2 WITH PROTECTION AS LINE SELECTION |
| 61 | × | ○ | × | ○ | FAULT IN MONITOR OF $M_{2P0}$ AND $M_{301}$. DETERMINATION OF $M_{1P}$ IS CORRECT. | SWITCH TO STATE 2 WITH PROTECTION AS LINE SELECTION |
| 62 | × | ○ | × | △ | FAULT IN MONITOR OF $M_{2P0}$. DETERMINATION OF $M_{1PW}$ IS CORRECT. | SWITCH TO STATE 2 WITH PROTECTION AS LINE SELECTION |
| 63 | × | ○ | × | × | FAULT IN MONITOR OF $M_{2P0}$. DETERMINATION OF $M_{1P}$ IS CORRECT. | SWITCH TO STATE 2 WITH PROTECTION AS LINE SELECTION |
| 64 | × | △ | ○ | ○ | FAULT IN MONITOR OF $M_{301}$ AND $M_{41}$. DETERMINATION OF $M_{1P}$ IS CORRECT. | SWITCH TO STATE 2 WITH PROTECTION AS LINE SELECTION |
| 65 | × | △ | ○ | △ | FAULT IN MONITOR OF $M_{301}$. DETERMINATION OF $M_{1P}$ IS CORRECT. | SWITCH TO STATE 2 WITH PROTECTION AS LINE SELECTION |
| 66 | × | △ | ○ | × | FAULT IN MONITOR OF $M_{301}$. DETERMINATION OF $M_{1P}$ IS CORRECT. | SWITCH TO STATE 2 WITH PROTECTION AS LINE SELECTION |
| 67 | × | △ | △ | ○ | FAULT IN MONITOR OF $M_{41}$. DETERMINATION OF $M_{1P}$ IS CORRECT. | SWITCH TO STATE 2 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 2 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 2 WITH PROTECTION AS LINE SELECTION |
| 70 | × | △ | × | ○ | FAULT IN MONITOR OF $M_{41}$. DETERMINATION OF $M_{1P}$ IS CORRECT. | SWITCH TO STATE 2 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 2 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 2 WITH PROTECTION AS LINE SELECTION |
| 73 | × | × | ○ | ○ | FAULT IN MONITOR OF $M_{301}$ AND $M_{41}$. DETERMINATION OF $M_{1P}$ IS CORRECT. | SWITCH TO STATE 2 WITH PROTECTION AS LINE SELECTION |
| 74 | × | × | ○ | △ | FAULT IN MONITOR OF $M_{301}$. DETERMINATION OF $M_{1P}$ IS CORRECT. | SWITCH TO STATE 2 WITH PROTECTION AS LINE SELECTION |
| 75 | × | × | ○ | × | FAULT IN MONITOR OF $M_{301}$. DETERMINATION OF $M_{1P}$ IS CORRECT. | SWITCH TO STATE 2 WITH PROTECTION AS LINE SELECTION |
| 76 | × | × | △ | ○ | FAULT IN MONITOR OF $M_{41}$. DETERMINATION OF $M_{1P}$ IS CORRECT. | SWITCH TO STATE 2 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 2 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 2 WITH PROTECTION AS LINE SELECTION |
| 79 | × | × | × | ○ | FAULT IN MONITOR OF $M_{41}$. DETERMINATION OF $M_{1P}$ IS CORRECT. | SWITCH TO STATE 2 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 2 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 2 WITH PROTECTION AS LINE SELECTION |

F I G. 3 5

WHEN FERF IS DETECTED (1)

| NUMBER | $M_{1P}$ | $M_{2P1}$ | $M_{3P1}$ | $M_{301}$ | $M_{41}$ | DETERMINATION | SWITCH-TO TARGET |
|---|---|---|---|---|---|---|---|
| 1 | O | O | O | O | O | FAULT IN TRANSMISSION LINE OF SYSTEM 1 ON CLIENT SIDE | SWITCH TO STATE 8 WITH FERF MONITOR SWITCHED TO SYSTEM 1 |
| 2 | O | O | O | O | △ | FAULT IN 2:1 SEL | SWITCH TO STATE 8 WITH FERF MONITOR SWITCHED TO SYSTEM 1 |
| 3 | O | O | O | O | × | FAULT IN 2:1 SEL | SWITCH TO STATE 8 WITH FERF MONITOR SWITCHED TO SYSTEM 1 |
| 4 | O | O | O | △ | O | FAULT IN 4n×4n SW SYSTEM 1 | SWITCH TO STATE 5 WITH SYSTEM 0 SELECTED FOR 4n×4n SW |
| 5 | O | O | O | △ | △ | FAULT IN 4n×4n SW SYSTEM 1 | SWITCH TO STATE 5 WITH SYSTEM 0 SELECTED FOR 4n×4n SW |
| 6 | O | O | O | △ | × | FAULT IN 4n×4n SW SYSTEM 1 | SWITCH TO STATE 5 WITH SYSTEM 0 SELECTED FOR 4n×4n SW |
| 7 | O | O | O | × | O | FAULT IN MONITOR OF $M_{41}$. DETERMINATION OF $M_{311}$ IS CORRECT. | SWITCH TO STATE 5 WITH SYSTEM 0 SELECTED FOR 4n×4n SW |
| 8 | O | O | O | × | △ | FAULT IN 4n×4n SW SYSTEM 1 | SWITCH TO STATE 5 WITH SYSTEM 0 SELECTED FOR 4n×4n SW |
| 9 | O | O | O | × | × | FAULT IN 4n×4n SW SYSTEM 1 | SWITCH TO STATE 5 WITH SYSTEM 0 SELECTED FOR 4n×4n SW |
| 10 | O | O | △ | O | O | FAULT IN TRANSMISSION LINE OF SYSTEM 0 ON CLIENT SIDE | SWITCH TO STATE 8 WITH FERF MONITOR SWITCHED TO SYSTEM 1 |
| 11 | O | O | △ | O | △ | FAULT IN 2:1 SEL | SWITCH TO STATE 8 WITH FERF MONITOR SWITCHED TO SYSTEM 1 |
| 12 | O | O | △ | O | × | FAULT IN 2:1 SEL | SWITCH TO STATE 8 WITH FERF MONITOR SWITCHED TO SYSTEM 1 |
| 13 | O | O | △ | △ | O | FAULT IN 1:2 DIS | SWITCH TO STATE 3 WITH PROTECTION AS LINE SELECTION |
| 14 | O | O | △ | △ | △ | FAULT IN 1:2 DIS | SWITCH TO STATE 3 WITH PROTECTION AS LINE SELECTION |
| 15 | O | O | △ | △ | × | FAULT IN 1:2 DIS | SWITCH TO STATE 3 WITH PROTECTION AS LINE SELECTION |
| 16 | O | O | △ | × | O | FAULT IN MONITOR OF $M_{41}$. MONITOR OF $M_{311}$ IS CORRECT. | SWITCH TO STATE 3 WITH PROTECTION AS LINE SELECTION |
| 17 | O | O | △ | × | △ | FAULT IN 1:2 DIS | SWITCH TO STATE 3 WITH PROTECTION AS LINE SELECTION |
| 18 | O | O | △ | × | × | FAULT IN 1:2 DIS | SWITCH TO STATE 3 WITH PROTECTION AS LINE SELECTION |
| 19 | O | O | × | O | O | FAULT IN MONITOR OF $M_{311}$ AND $M_{41}$. DETERMINATION OF $M_{2P1}$ IS CORRECT. | SWITCH TO STATE 5 WITH SYSTEM 0 SELECTED FOR 4n×4n SW |
| 20 | O | O | × | O | △ | FAULT IN MONITOR OF $M_{311}$. DETERMINATION OF $M_{2P1}$ IS CORRECT. | SWITCH TO STATE 5 WITH SYSTEM 0 SELECTED FOR 4n×4n SW |
| 21 | O | O | × | O | × | FAULT IN MONITOR OF $M_{311}$. DETERMINATION OF $M_{2P1}$ IS CORRECT. | SWITCH TO STATE 5 WITH SYSTEM 0 SELECTED FOR 4n×4n SW |
| 22 | O | O | × | △ | O | FAULT IN MONITOR OF $M_{41}$. DETERMINATION OF $M_{2P1}$ IS CORRECT. | SWITCH TO STATE 3 WITH PROTECTION AS LINE SELECTION |
| 23 | O | O | × | △ | △ | FAULT IN 1:2 DIS | SWITCH TO STATE 3 WITH PROTECTION AS LINE SELECTION |
| 24 | O | O | × | △ | × | FAULT IN 1:2 DIS | SWITCH TO STATE 3 WITH PROTECTION AS LINE SELECTION |
| 25 | O | O | × | × | O | FAULT IN MONITOR OF $M_{41}$. DETERMINATION OF $M_{2P1}$ IS CORRECT. | SWITCH TO STATE 3 WITH PROTECTION AS LINE SELECTION |
| 26 | O | O | × | × | △ | FAULT IN 1:2 DIS | SWITCH TO STATE 3 WITH PROTECTION AS LINE SELECTION |
| 27 | O | O | × | × | × | FAULT IN 1:2 DIS | SWITCH TO STATE 3 WITH PROTECTION AS LINE SELECTION |

WHEN FERF IS DETECTED (2)

| NUMBER | $M_{1P}$ | $M_{2P1}$ | $M_{301}$ | $M_{41}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 8 WITH FERF MONITOR SWITCHED TO SYSTEM 1 |
| 29 | △ | ○ | ○ | △ | FAULT IN TRANSMISSION LINE OF SYSTEM 0 ON CLIENT SIDE | SWITCH TO STATE 8 WITH FERF MONITOR SWITCHED TO SYSTEM 1 |
| 30 | △ | ○ | ○ | × | FAULT IN TRANSMISSION LINE OF SYSTEM 0 ON CLIENT SIDE | SWITCH TO STATE 8 WITH FERF MONITOR SWITCHED TO SYSTEM 1 |
| 31 | △ | ○ | △ | ○ | FAULT IN TRANSMISSION LINE OF SYSTEM 0 ON CLIENT SIDE | SWITCH TO STATE 8 WITH FERF MONITOR SWITCHED TO SYSTEM 1 |
| 32 | △ | ○ | △ | △ | FAULT IN 4n×4n SW SYSTEM 1 | SWITCH TO STATE 3 WITH PROTECTION AS LINE SELECTION |
| 33 | △ | ○ | △ | × | FAULT IN 1:2 DIS | SWITCH TO STATE 3 WITH PROTECTION AS LINE SELECTION |
| 34 | △ | ○ | × | ○ | FAULT IN MONITOR OF $M_{41}$. DETERMINATION OF $M_{2P1}$ IS CORRECT. | SWITCH TO STATE 5 WITH SYSTEM 0 SELECTED FOR 4n×4n SW |
| 35 | △ | ○ | × | △ | FAULT IN 4n×4n SW SYSTEM 1 | SWITCH TO STATE 5 WITH SYSTEM 0 SELECTED FOR 4n×4n SW |
| 36 | △ | ○ | × | × | FAULT IN 4n×4n SW SYSTEM 1 | SWITCH TO STATE 5 WITH SYSTEM 0 SELECTED FOR 4n×4n SW |
| 37 | △ | △ | ○ | ○ | FAULT IN TRANSMISSION LINE OF SYSTEM 0 ON CLIENT SIDE | SWITCH TO STATE 8 WITH FERF MONITOR SWITCHED TO SYSTEM 1 |
| 38 | △ | △ | ○ | △ | FAULT IN TRANSMISSION LINE BETWEEN TRANSPONDER AND 1:2 BRANCH | SWITCH TO STATE 3 WITH PROTECTION AS LINE SELECTION |
| 39 | △ | △ | ○ | × | FAULT IN 2:1 SEL | SWITCH TO STATE 8 WITH FERF MONITOR SWITCHED TO SYSTEM 1 |
| 40 | △ | △ | △ | ○ | FAULT IN TRANSMISSION LINE BETWEEN TRANSPONDER AND 1:2 BRANCH | SWITCH TO STATE 3 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 3 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 3 WITH PROTECTION AS LINE SELECTION |
| 43 | △ | △ | × | ○ | FAULT IN MONITOR OF $M_{41}$. DETERMINATION OF $M_{311}$ IS CORRECT. | SWITCH TO STATE 3 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 3 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 3 WITH PROTECTION AS LINE SELECTION |
| 46 | △ | × | ○ | ○ | FAULT IN MONITOR OF $M_{41}$ AND $M_{311}$. DETERMINATION OF $M_{2P1}$ IS CORRECT. | SWITCH TO STATE 3 WITH PROTECTION AS LINE SELECTION |
| 47 | △ | × | ○ | △ | FAULT IN TRANSMISSION LINE BETWEEN TRANSPONDER AND 1:2 BRANCH | SWITCH TO STATE 3 WITH PROTECTION AS LINE SELECTION |
| 48 | △ | × | ○ | × | FAULT IN MONITOR OF $M_{2P1}$. DETERMINATION OF $M_{311}$ IS CORRECT. | SWITCH TO STATE 3 WITH PROTECTION AS LINE SELECTION |
| 49 | △ | × | △ | ○ | FAULT IN MONITOR OF $M_{41}$. DETERMINATION OF $M_{311}$ IS CORRECT. | SWITCH TO STATE 3 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 3 WITH PROTECTION AS LINE SELECTION |
| 51 | △ | × | △ | × | FAULT IN MONITOR OF $M_{2P1}$. DETERMINATION OF $M_{311}$ IS CORRECT. | SWITCH TO STATE 3 WITH PROTECTION AS LINE SELECTION |
| 52 | △ | × | × | ○ | FAULT IN TRANSMISSION LINE BETWEEN TRANSPONDER AND 1:2 BRANCH | SWITCH TO STATE 3 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 3 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 3 WITH PROTECTION AS LINE SELECTION |

WHEN FERF IS DETECTED (3)

| NUMBER | $M_{1P}$ | $M_{2P1}$ | $M_{301}$ | $M_{41}$ | DETERMINATION | SWITCH-TO TARGET |
|---|---|---|---|---|---|---|
| 55 | × | ○ | ○ | ○ | FAULT IN MONITOR OF $M_{2P1}$, $M_{311}$ AND $M_{41}$. DETERMINATION OF $M_{1P}$ IS CORRECT. | SWITCH TO STATE 3 WITH PROTECTION AS LINE SELECTION |
| 56 | × | ○ | ○ | △ | FAULT IN MONITOR OF $M_{2P1}$ AND $M_{311}$. DETERMINATION OF $M_{1P}$ IS CORRECT. | SWITCH TO STATE 3 WITH PROTECTION AS LINE SELECTION |
| 57 | × | ○ | ○ | × | FAULT IN MONITOR OF $M_{2P1}$ AND $M_{311}$. DETERMINATION OF $M_{1P}$ IS CORRECT. | SWITCH TO STATE 3 WITH PROTECTION AS LINE SELECTION |
| 58 | × | ○ | △ | ○ | FAULT IN MONITOR OF $M_{2P1}$ AND $M_{41}$. DETERMINATION OF $M_{1P}$ IS CORRECT. | SWITCH TO STATE 3 WITH PROTECTION AS LINE SELECTION |
| 59 | × | ○ | △ | △ | FAULT IN MONITOR OF $M_{2P1}$. DETERMINATION OF $M_{1P}$ IS CORRECT. | SWITCH TO STATE 3 WITH PROTECTION AS LINE SELECTION |
| 60 | × | ○ | △ | × | FAULT IN MONITOR OF $M_{2P1}$, $M_{311}$ AND $M_{41}$. DETERMINATION OF $M_{1P}$ IS CORRECT. | SWITCH TO STATE 3 WITH PROTECTION AS LINE SELECTION |
| 61 | × | ○ | × | ○ | FAULT IN MONITOR OF $M_{2P1}$ AND $M_{41}$. DETERMINATION OF $M_{1P}$ IS CORRECT. | SWITCH TO STATE 3 WITH PROTECTION AS LINE SELECTION |
| 62 | × | ○ | × | △ | FAULT IN MONITOR OF $M_{2P1}$. DETERMINATION OF $M_{1P}$ IS CORRECT. | SWITCH TO STATE 3 WITH PROTECTION AS LINE SELECTION |
| 63 | × | ○ | × | × | FAULT IN MONITOR OF $M_{2P1}$. DETERMINATION OF $M_{1P}$ IS CORRECT. | SWITCH TO STATE 3 WITH PROTECTION AS LINE SELECTION |
| 64 | × | △ | ○ | ○ | FAULT IN MONITOR OF $M_{311}$ AND $M_{41}$. DETERMINATION OF $M_{1P}$ IS CORRECT. | SWITCH TO STATE 3 WITH PROTECTION AS LINE SELECTION |
| 65 | × | △ | ○ | △ | FAULT IN MONITOR OF $M_{311}$. DETERMINATION OF $M_{1P}$ IS CORRECT. | SWITCH TO STATE 3 WITH PROTECTION AS LINE SELECTION |
| 66 | × | △ | ○ | × | FAULT IN MONITOR OF $M_{311}$. DETERMINATION OF $M_{1P}$ IS CORRECT. | SWITCH TO STATE 3 WITH PROTECTION AS LINE SELECTION |
| 67 | × | △ | △ | ○ | FAULT IN MONITOR OF $M_{41}$. DETERMINATION OF $M_{1P}$ IS CORRECT. | SWITCH TO STATE 3 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 3 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 3 WITH PROTECTION AS LINE SELECTION |
| 70 | × | △ | × | ○ | FAULT IN MONITOR OF $M_{41}$. DETERMINATION OF $M_{1P}$ IS CORRECT. | SWITCH TO STATE 3 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 3 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 3 WITH PROTECTION AS LINE SELECTION |
| 73 | × | × | ○ | ○ | FAULT IN MONITOR OF $M_{311}$ AND $M_{41}$. DETERMINATION OF $M_{1P}$ IS CORRECT. | SWITCH TO STATE 3 WITH PROTECTION AS LINE SELECTION |
| 74 | × | × | ○ | △ | FAULT IN MONITOR OF $M_{311}$. DETERMINATION OF $M_{1P}$ IS CORRECT. | SWITCH TO STATE 3 WITH PROTECTION AS LINE SELECTION |
| 75 | × | × | ○ | × | FAULT IN MONITOR OF $M_{311}$. DETERMINATION OF $M_{1P}$ IS CORRECT. | SWITCH TO STATE 3 WITH PROTECTION AS LINE SELECTION |
| 76 | × | × | △ | ○ | FAULT IN MONITOR OF $M_{41}$. DETERMINATION OF $M_{1P}$ IS CORRECT. | SWITCH TO STATE 3 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 3 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 3 WITH PROTECTION AS LINE SELECTION |
| 79 | × | × | × | ○ | FAULT IN MONITOR OF $M_{41}$. DETERMINATION OF $M_{1P}$ IS CORRECT. | SWITCH TO STATE 3 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 3 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 3 WITH PROTECTION AS LINE SELECTION |

FIG. 38

WHEN FERF IS DETECTED (1)

| NUMBER | $M_{1P}$ | $M_{2P1}$ | $M_{311}$ | $M_{41}$ | DETERMINATION | SWITCH-TO TARGET |
|---|---|---|---|---|---|---|
| 1 | O | O | O | O | FAULT IN TRANSMISSION LINE OF SYSTEM 1 ON CLIENT SIDE | SWITCH TO STATE 7 WITH FERF MONITOR SWITCHED TO SYSTEM 0 |
| 2 | O | O | O | △ | FAULT IN 2:1 SEL | SWITCH TO STATE 7 WITH FERF MONITOR SWITCHED TO SYSTEM 0 |
| 3 | O | O | O | × | FAULT IN 2:1 SEL | SWITCH TO STATE 7 WITH FERF MONITOR SWITCHED TO SYSTEM 0 |
| 4 | O | O | △ | O | FAULT IN 4n×4n SW SYSTEM 1 | SWITCH TO STATE 6 WITH SYSTEM 0 SELECTED FOR 4n×4n SW |
| 5 | O | O | △ | △ | FAULT IN 4n×4n SW SYSTEM 1 | SWITCH TO STATE 6 WITH SYSTEM 0 SELECTED FOR 4n×4n SW |
| 6 | O | O | △ | × | FAULT IN 4n×4n SW SYSTEM 1 | SWITCH TO STATE 6 WITH SYSTEM 0 SELECTED FOR 4n×4n SW |
| 7 | O | O | × | O | FAULT IN MONITOR OF $M_{41}$. DETERMINATION OF $M_{41}$ IS CORRECT. | SWITCH TO STATE 6 WITH SYSTEM 0 SELECTED FOR 4n×4n SW |
| 8 | O | O | × | △ | FAULT IN 4n×4n SW SYSTEM 1 | SWITCH TO STATE 6 WITH SYSTEM 0 SELECTED FOR 4n×4n SW |
| 9 | O | O | × | × | FAULT IN 4n×4n SW SYSTEM 1 | SWITCH TO STATE 6 WITH SYSTEM 0 SELECTED FOR 4n×4n SW |
| 10 | O | △ | O | O | FAULT IN TRANSMISSION LINE OF SYSTEM 0 ON CLIENT SIDE | SWITCH TO STATE 7 WITH FERF MONITOR SWITCHED TO SYSTEM 0 |
| 11 | O | △ | O | △ | FAULT IN 2:1 SEL | SWITCH TO STATE 7 WITH FERF MONITOR SWITCHED TO SYSTEM 0 |
| 12 | O | △ | O | × | FAULT IN 2:1 SEL | SWITCH TO STATE 7 WITH FERF MONITOR SWITCHED TO SYSTEM 0 |
| 13 | O | △ | △ | O | FAULT IN 1:2 DIS | SWITCH TO STATE 4 WITH PROTECTION AS LINE SELECTION |
| 14 | O | △ | △ | △ | FAULT IN 1:2 DIS | SWITCH TO STATE 4 WITH PROTECTION AS LINE SELECTION |
| 15 | O | △ | △ | × | FAULT IN 1:2 DIS | SWITCH TO STATE 4 WITH PROTECTION AS LINE SELECTION |
| 16 | O | △ | × | O | FAULT IN MONITOR OF $M_{311}$ AND $M_{41}$. MONITOR OF $M_{41}$. | SWITCH TO STATE 6 WITH SYSTEM 0 SELECTED FOR 4n×4n SW |
| 17 | O | △ | × | △ | FAULT IN 1:2 DIS | SWITCH TO STATE 4 WITH PROTECTION AS LINE SELECTION |
| 18 | O | △ | × | × | FAULT IN 1:2 DIS | SWITCH TO STATE 4 WITH PROTECTION AS LINE SELECTION |
| 19 | O | × | O | O | FAULT IN MONITOR OF $M_{2P1}$. DETERMINATION OF $M_{2P1}$ IS CORRECT. | SWITCH TO STATE 6 WITH SYSTEM 0 SELECTED FOR 4n×4n SW |
| 20 | O | × | O | △ | FAULT IN MONITOR OF $M_{311}$. DETERMINATION OF $M_{2P1}$ IS CORRECT. | SWITCH TO STATE 6 WITH SYSTEM 0 SELECTED FOR 4n×4n SW |
| 21 | O | × | O | × | FAULT IN MONITOR OF $M_{311}$. DETERMINATION OF $M_{2P1}$ IS CORRECT. | SWITCH TO STATE 6 WITH SYSTEM 0 SELECTED FOR 4n×4n SW |
| 22 | O | × | △ | O | FAULT IN MONITOR OF $M_{41}$. DETERMINATION OF $M_{2P1}$ IS CORRECT. | SWITCH TO STATE 6 WITH SYSTEM 0 SELECTED FOR 4n×4n SW |
| 23 | O | × | △ | △ | FAULT IN 1:2 DIS | SWITCH TO STATE 4 WITH PROTECTION AS LINE SELECTION |
| 24 | O | × | △ | × | FAULT IN 1:2 DIS | SWITCH TO STATE 4 WITH PROTECTION AS LINE SELECTION |
| 25 | O | × | × | O | FAULT IN MONITOR OF $M_{41}$. DETERMINATION OF $M_{2P1}$ IS CORRECT. | SWITCH TO STATE 6 WITH SYSTEM 0 SELECTED FOR 4n×4n SW |
| 26 | O | × | × | △ | FAULT IN 1:2 DIS | SWITCH TO STATE 4 WITH PROTECTION AS LINE SELECTION |
| 27 | O | × | × | × | FAULT IN 1:2 DIS | SWITCH TO STATE 4 WITH PROTECTION AS LINE SELECTION |

FIG. 39

WHEN FERF IS DETECTED (2)

| NUMBER | $M_{1P}$ | $M_{2P1}$ | $M_{311}$ | $M_{41}$ | DETERMINATION | SWITCH-TO TARGET |
|---|---|---|---|---|---|---|
| 28 | △ | ○ | ○ | ○ | FAULT IN TRANSMISSION LINE OF SYSTEM 0 ON CLIENT SIDE | SWITCH TO STATE 7 WITH FERF MONITOR SWITCHED TO SYSTEM 0 |
| 29 | △ | ○ | ○ | △ | FAULT IN TRANSMISSION LINE OF SYSTEM 0 ON CLIENT SIDE | SWITCH TO STATE 7 WITH FERF MONITOR SWITCHED TO SYSTEM 0 |
| 30 | △ | ○ | ○ | × | FAULT IN TRANSMISSION LINE OF SYSTEM 0 ON CLIENT SIDE | SWITCH TO STATE 7 WITH FERF MONITOR SWITCHED TO SYSTEM 0 |
| 31 | △ | ○ | △ | ○ | FAULT IN TRANSMISSION LINE OF SYSTEM 0 ON CLIENT SIDE | SWITCH TO STATE 7 WITH FERF MONITOR SWITCHED TO SYSTEM 0 |
| 32 | △ | ○ | △ | △ | FAULT IN 4n×4n SW SYSTEM 1 | SWITCH TO STATE 4 WITH PROTECTION AS LINE SELECTION |
| 33 | △ | ○ | △ | × | FAULT IN 1:2 DIS | SWITCH TO STATE 4 WITH PROTECTION AS LINE SELECTION |
| 34 | △ | ○ | × | ○ | FAULT IN MONITOR OF $M_{41}$. DETERMINATION OF $M_{2P1}$ IS CORRECT. | SWITCH TO STATE 6 WITH SYSTEM 0 SELECTED FOR 4n×4n SW |
| 35 | △ | ○ | × | △ | FAULT IN 4n×4n SW SYSTEM 1 | SWITCH TO STATE 6 WITH SYSTEM 0 SELECTED FOR 4n×4n SW |
| 36 | △ | ○ | × | × | FAULT IN 4n×4n SW SYSTEM 1 | SWITCH TO STATE 6 WITH SYSTEM 0 SELECTED FOR 4n×4n SW |
| 37 | △ | △ | ○ | ○ | FAULT IN TRANSMISSION LINE OF SYSTEM 0 ON CLIENT SIDE | SWITCH TO STATE 7 WITH FERF MONITOR SWITCHED TO SYSTEM 0 |
| 38 | △ | △ | ○ | △ | FAULT IN TRANSMISSION LINE BETWEEN TRANSPONDER AND 1:2 BRANCH | SWITCH TO STATE 4 WITH PROTECTION AS LINE SELECTION |
| 39 | △ | △ | ○ | × | FAULT IN 2:1 SEL | SWITCH TO STATE 4 WITH PROTECTION AS LINE SELECTION |
| 40 | △ | △ | △ | ○ | FAULT IN TRANSMISSION LINE BETWEEN TRANSPONDER AND 1:2 BRANCH | SWITCH TO STATE 4 WITH PROTECTION AS LINE SELECTION |
| 41 | △ | △ | △ | △ | FAULT IN TRANSMISSION LINE BETWEEN TRANSPONDER AND 1:2 BRANCH | SWITCH TO STATE 4 WITH PROTECTION AS LINE SELECTION |
| 42 | △ | △ | △ | × | FAULT IN TRANSMISSION LINE BETWEEN TRANSPONDER AND 1:2 BRANCH | SWITCH TO STATE 4 WITH PROTECTION AS LINE SELECTION |
| 43 | △ | △ | × | ○ | FAULT IN MONITOR OF $M_{41}$. DETERMINATION OF $M_{311}$ IS CORRECT. | SWITCH TO STATE 4 WITH PROTECTION AS LINE SELECTION |
| 44 | △ | △ | × | △ | FAULT IN TRANSMISSION LINE BETWEEN TRANSPONDER AND 1:2 BRANCH | SWITCH TO STATE 4 WITH PROTECTION AS LINE SELECTION |
| 45 | △ | △ | × | × | FAULT IN TRANSMISSION LINE BETWEEN TRANSPONDER AND 1:2 BRANCH | SWITCH TO STATE 4 WITH PROTECTION AS LINE SELECTION |
| 46 | △ | × | ○ | ○ | FAULT IN MONITOR OF $M_{41}$ AND $M_{311}$. DETERMINATION OF $M_{2P1}$ IS CORRECT. | SWITCH TO STATE 4 WITH PROTECTION AS LINE SELECTION |
| 47 | △ | × | ○ | △ | FAULT IN MONITOR OF $M_{311}$. DETERMINATION OF $M_{2P1}$ IS CORRECT. | SWITCH TO STATE 4 WITH PROTECTION AS LINE SELECTION |
| 48 | △ | × | ○ | × | FAULT IN MONITOR OF $M_{311}$. DETERMINATION OF $M_{2P1}$ IS CORRECT. | SWITCH TO STATE 4 WITH PROTECTION AS LINE SELECTION |
| 49 | △ | × | △ | ○ | FAULT IN MONITOR OF $M_{41}$. DETERMINATION OF $M_{2P1}$ IS CORRECT. | SWITCH TO STATE 4 WITH PROTECTION AS LINE SELECTION |
| 50 | △ | × | △ | △ | FAULT IN TRANSMISSION LINE BETWEEN TRANSPONDER AND 1:2 BRANCH | SWITCH TO STATE 4 WITH PROTECTION AS LINE SELECTION |
| 51 | △ | × | △ | × | FAULT IN TRANSMISSION LINE BETWEEN TRANSPONDER AND 1:2 BRANCH | SWITCH TO STATE 4 WITH PROTECTION AS LINE SELECTION |
| 52 | △ | × | × | ○ | FAULT IN MONITOR OF $M_{41}$. DETERMINATION OF $M_{311}$ IS CORRECT. | SWITCH TO STATE 4 WITH PROTECTION AS LINE SELECTION |
| 53 | △ | × | × | △ | FAULT IN TRANSMISSION LINE BETWEEN TRANSPONDER AND 1:2 BRANCH | SWITCH TO STATE 4 WITH PROTECTION AS LINE SELECTION |
| 54 | △ | × | × | × | FAULT IN TRANSMISSION LINE BETWEEN TRANSPONDER AND 1:2 BRANCH | SWITCH TO STATE 4 WITH PROTECTION AS LINE SELECTION |

FIG. 40

WHEN FERF IS DETECTED (3)

| NUMBER | $M_{1P}$ | $M_{2P1}$ | $M_{311}$ | $M_{41}$ | DETERMINATION | SWITCH-TO TARGET |
|---|---|---|---|---|---|---|
| 55 | × | ○ | ○ | ○ | FAULT IN MONITOR OF $M_{2P1}$, $M_{311}$ AND $M_{41}$: DETERMINATION OF $M_{1P}$ IS CORRECT. | SWITCH TO STATE 4 WITH PROTECTION AS LINE SELECTION |
| 56 | × | ○ | ○ | △ | FAULT IN MONITOR OF $M_{2P1}$, $M_{311}$: DETERMINATION OF $M_{1P}$ IS CORRECT. | SWITCH TO STATE 4 WITH PROTECTION AS LINE SELECTION |
| 57 | × | ○ | ○ | × | FAULT IN MONITOR OF $M_{2P1}$, $M_{311}$: DETERMINATION OF $M_{1P}$ IS CORRECT. | SWITCH TO STATE 4 WITH PROTECTION AS LINE SELECTION |
| 58 | × | ○ | △ | ○ | FAULT IN MONITOR OF $M_{2P1}$ AND $M_{41}$: DETERMINATION OF $M_{1P}$ IS CORRECT. | SWITCH TO STATE 4 WITH PROTECTION AS LINE SELECTION |
| 59 | × | ○ | △ | △ | FAULT IN MONITOR OF $M_{2P1}$: DETERMINATION OF $M_{1P}$ IS CORRECT. | SWITCH TO STATE 4 WITH PROTECTION AS LINE SELECTION |
| 60 | × | ○ | △ | × | FAULT IN MONITOR OF $M_{2P1}$: DETERMINATION OF $M_{1P}$ IS CORRECT. | SWITCH TO STATE 4 WITH PROTECTION AS LINE SELECTION |
| 61 | × | ○ | × | ○ | FAULT IN MONITOR OF $M_{2P1}$ AND $M_{41}$: DETERMINATION OF $M_{1P}$ IS CORRECT. | SWITCH TO STATE 4 WITH PROTECTION AS LINE SELECTION |
| 62 | × | ○ | × | △ | FAULT IN MONITOR OF $M_{2P1}$: DETERMINATION OF $M_{1P}$ IS CORRECT. | SWITCH TO STATE 4 WITH PROTECTION AS LINE SELECTION |
| 63 | × | ○ | × | × | FAULT IN MONITOR OF $M_{2P1}$: DETERMINATION OF $M_{1P}$ IS CORRECT. | SWITCH TO STATE 4 WITH PROTECTION AS LINE SELECTION |
| 64 | × | △ | ○ | ○ | FAULT IN MONITOR OF $M_{311}$ AND $M_{41}$: DETERMINATION OF $M_{1P}$ IS CORRECT. | SWITCH TO STATE 4 WITH PROTECTION AS LINE SELECTION |
| 65 | × | △ | ○ | △ | FAULT IN MONITOR OF $M_{311}$: DETERMINATION OF $M_{1P}$ IS CORRECT. | SWITCH TO STATE 4 WITH PROTECTION AS LINE SELECTION |
| 66 | × | △ | ○ | × | FAULT IN MONITOR OF $M_{311}$: DETERMINATION OF $M_{1P}$ IS CORRECT. | SWITCH TO STATE 4 WITH PROTECTION AS LINE SELECTION |
| 67 | × | △ | △ | ○ | FAULT IN MONITOR OF $M_{41}$: DETERMINATION OF $M_{1P}$ IS CORRECT. | SWITCH TO STATE 4 WITH PROTECTION AS LINE SELECTION |
| 68 | × | △ | △ | △ | FAULT IN TRANSMISSION LINE BETWEEN TRANSPONDER AND 1:2 BRANCH | SWITCH TO STATE 4 WITH PROTECTION AS LINE SELECTION |
| 69 | × | △ | △ | × | FAULT IN TRANSMISSION LINE BETWEEN TRANSPONDER AND 1:2 BRANCH | SWITCH TO STATE 4 WITH PROTECTION AS LINE SELECTION |
| 70 | × | △ | × | ○ | FAULT IN MONITOR OF $M_{41}$: DETERMINATION OF $M_{1P}$ IS CORRECT. | SWITCH TO STATE 4 WITH PROTECTION AS LINE SELECTION |
| 71 | × | △ | × | △ | FAULT IN TRANSMISSION LINE BETWEEN TRANSPONDER AND 1:2 BRANCH | SWITCH TO STATE 4 WITH PROTECTION AS LINE SELECTION |
| 72 | × | △ | × | × | FAULT IN TRANSMISSION LINE BETWEEN TRANSPONDER AND 1:2 BRANCH | SWITCH TO STATE 4 WITH PROTECTION AS LINE SELECTION |
| 73 | × | × | ○ | ○ | FAULT IN MONITOR OF $M_{311}$ AND $M_{41}$: DETERMINATION OF $M_{1P}$ IS CORRECT. | SWITCH TO STATE 4 WITH PROTECTION AS LINE SELECTION |
| 74 | × | × | ○ | △ | FAULT IN MONITOR OF $M_{311}$: DETERMINATION OF $M_{1P}$ IS CORRECT. | SWITCH TO STATE 4 WITH PROTECTION AS LINE SELECTION |
| 75 | × | × | ○ | × | FAULT IN MONITOR OF $M_{311}$: DETERMINATION OF $M_{1P}$ IS CORRECT. | SWITCH TO STATE 4 WITH PROTECTION AS LINE SELECTION |
| 76 | × | × | △ | ○ | FAULT IN MONITOR OF $M_{41}$: DETERMINATION OF $M_{1P}$ IS CORRECT. | SWITCH TO STATE 4 WITH PROTECTION AS LINE SELECTION |
| 77 | × | × | △ | △ | FAULT IN TRANSMISSION LINE BETWEEN TRANSPONDER AND 1:2 BRANCH | SWITCH TO STATE 4 WITH PROTECTION AS LINE SELECTION |
| 78 | × | × | △ | × | FAULT IN TRANSMISSION LINE BETWEEN TRANSPONDER AND 1:2 BRANCH | SWITCH TO STATE 4 WITH PROTECTION AS LINE SELECTION |
| 79 | × | × | × | ○ | FAULT IN MONITOR OF $M_{41}$: DETERMINATION OF $M_{1P}$ IS CORRECT. | SWITCH TO STATE 4 WITH PROTECTION AS LINE SELECTION |
| 80 | × | × | × | △ | FAULT IN TRANSMISSION LINE BETWEEN TRANSPONDER AND 1:2 BRANCH | SWITCH TO STATE 4 WITH PROTECTION AS LINE SELECTION |
| 81 | × | × | × | × | FAULT IN TRANSMISSION LINE BETWEEN TRANSPONDER AND 1:2 BRANCH | SWITCH TO STATE 4 WITH PROTECTION AS LINE SELECTION |

F I G. 4 1

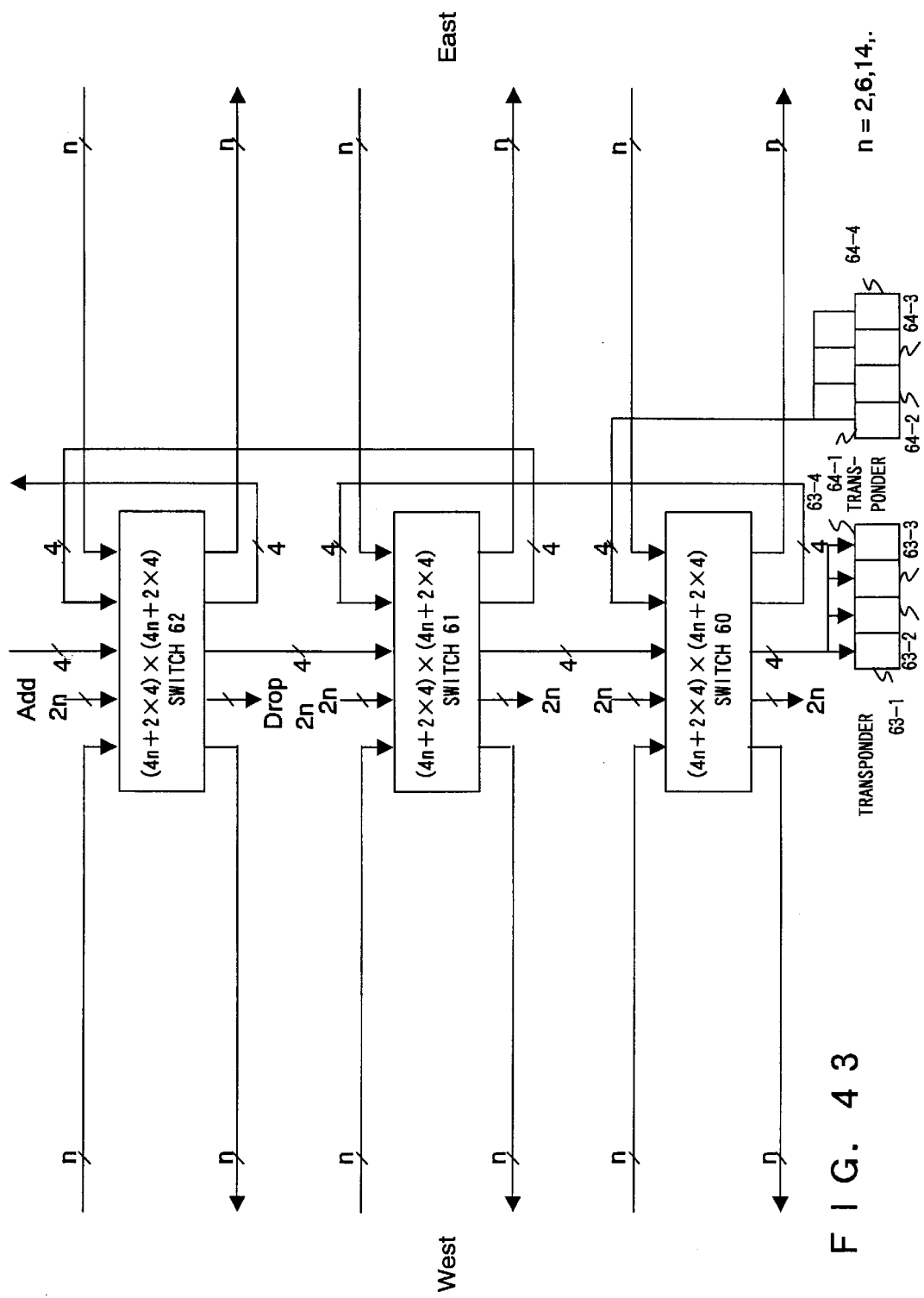
F I G. 43

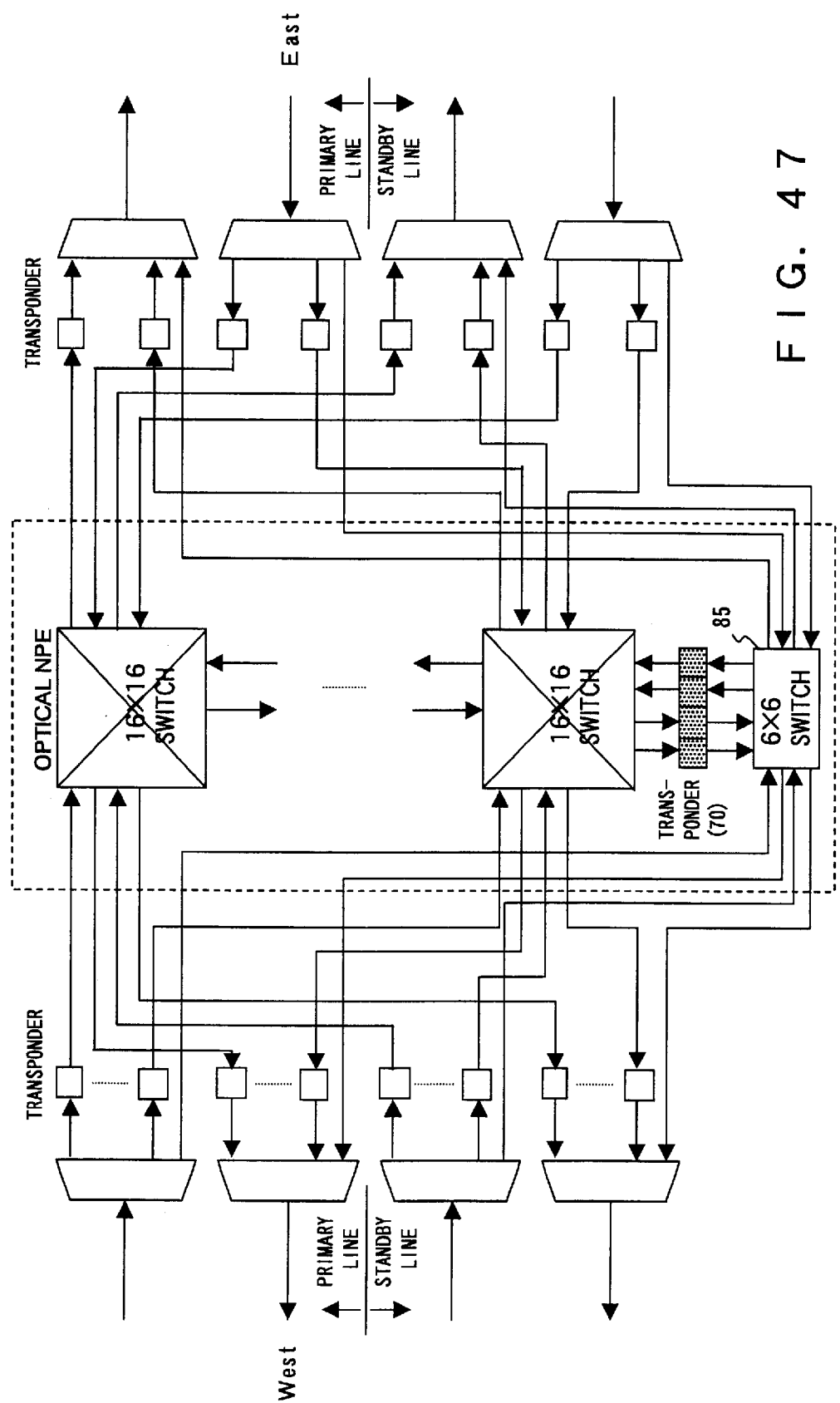
F I G. 47

OPTICAL NODE SYSTEM AND SWITCHED CONNECTION METHOD

BACKGROUND OF THE INVENTION

1. Field of the Invention

The present invention relates to a node connection structure and a node structure appropriate for redundancy, and more specifically to an optical node system and its switched connection method.

2. Description of the Related Art

Recently, a communications network using optical fiber has been developed, and put into practical use. A typical trunk path of an optical communications network is a ring network. Each unit of the ring network is provided with a signal branch device for transmitting an optical signal through the ring network to another network or a signal termination device.

FIG. 1 shows the configuration showing the concept of a ring network.

In FIG. 1, the signal division-multiplexing devices indicated by characters A through I are also referred to as nodes for connecting a ring network to one of another network and a signal termination device. For example, when an optical signal is input from another network to a node, the optical signal transmitted through the ring network is multiplexed with an optical signal input through another network, and transmitted to the ring network. Each node extracts an optical signal to be dropped from the optical signals transmitted through the ring network, and transmits it to another network or a signal termination device.

The conventional signal division-multiplexing device (node) extracts an optical signal through a predetermined specific path as a signal to be dropped from the trunk path, and transmits it to another network or a signal termination device. An optical signal transmitted from another network or a signal transmission device through a predetermined specific path is multiplexed by a signal division-multiplexing device with a signal transmitted through a trunk path, and transmitted to the trunk path. Such a signal division-multiplexing device is referred to as an ADM device (add/drop multiplexer which gathers signals from branch terminal stations, etc. or branches signals from a trunk path to transmit them to the branch terminal stations, etc.).

An ADM device is designed for redundancy to provide continuously services even when it becomes faulty. To attain this, a device referred to as an NPE (network protection equipment for redundancy of a network) is installed. The function of the NPE is incorporated into the conventional ADM device, and a protection switch is switched through a protection path for transmission of a signal.

Redundancy includes, in addition to switching a network between a primary system and a standby system, configuring a system 0 and a system 1 for a switch and an appliance such as an output sector of a switch, etc., providing redundancy for an appliance, looping back or retrieving an output signal before or after a fault of a ring network, etc.

As described above, the conventional ADM device is designed to connect a specific input path to a specific output path, but is not designed to connect all input paths to all output paths. Therefore, a protection switch has only the minimal switching function, and cannot correspond to newly extended functions of a protection switch.

SUMMARY OF THE INVENTION

The present invention aims at providing an optical node system having a simple configuration in which functions and equipment can easily be extended.

A first optical node system according to the present invention includes: a first node having a first switch for switching each of a plurality of optical input channels, outputting lights from a plurality of optical output channels, and containing optical switching ports larger in number than the optical input channels and the optical output channels; and a second node having a second switch for switching each of a plurality of optical input channels, outputting lights from a plurality of optical output channels, and containing optical switching ports larger in number than the optical input channels and the optical output channels. With the configuration, an output port of the second switch having no optical output channel is connected to an input port of the first switch, and an output port of the first switch having no optical output channel is connected to an input port of the second switch.

The second optical node system according to the present invention has a node having a switch including a plurality of input ports and a plurality of output ports with the plurality of input ports switchable to any of the plurality of output ports. The input ports of the switch include at least one port inputting a primary line and a standby line and a port inputting a signal from another node. The output ports of the switch include at least one port outputting a primary line and a standby line and a port outputting a signal to another node.

With the first optical node system according to the present invention, nodes can be easily interconnected using a switch, and the system can be easily extended as necessary in the future.

With the second optical node system according to the present invention, a node can be easily configured for redundancy using a complete group switch of the node. A complete group switch refers to a switch having a plurality of input ports and a plurality of output ports, and can switch all the plurality of input ports to all the output ports. Since a redundancy switch forms a complete group, and any input can be connected to any output, a considerably extensible switch can be configured. Especially, a costly and large redundancy configuration using the conventional ADM device can be improved into a smaller and less expensive configuration according to the present invention.

BRIEF DESCRIPTION OF THE DRAWINGS

FIG. 10 shows a state in which a monitoring operation can be performed;

FIG. 11 is a switch determination table (1) based on the result of the monitors $M_{4W}$ and $M_{5W}$ on the ADD side;

FIG. 12 is a switch determination table (2) based on the result of the monitors $M_{4W}$ and $M_{5W}$ on the ADD side;

FIG. 13 is a switch determination table (3) based on the result of the monitors $M_{4W}$ and $M_{5W}$ on the ADD side;

FIG. 14 is a switch determination table (4) based on the result of the monitors $M_{4W}$ and $M_{5W}$ on the ADD side;

FIG. 15 is a switch determination table (5) based on the result of the monitors $M_{4W}$ and $M_{5W}$ on the ADD side;

FIG. 17 is a switch determination table (1) based on the detection result of the monitor on the DROP side;

FIG. 18 is a switch determination table (2) based on the detection result of the monitor on the DROP side;

FIG. 19 is a switch determination table (3) based on the detection result of the monitor on the DROP side;

FIG. 20 is a switch determination table (4) based on the detection result of the monitor on the DROP side;

FIG. 21 is a switch determination table (5) based on the detection result of the monitor on the DROP side;

FIG. 22 is a switch determination table (6) based on the detection result of the monitor on the DROP side;

FIG. 23 is a switch determination table (7) based on the detection result of the monitor on the DROP side;

FIG. 24 is a switch determination table (8) based on the detection result of the monitor on the DROP side;

FIG. 25 is a switch determination table (9) based on the detection result of the monitor on the DROP side;

FIG. 26 is a switch determination table (10) based on the detection result of the monitor on the DROP side;

FIG. 27 is a switch determination table (11) based on the detection result of the monitor on the DROP side;

FIG. 28 is a switch determination table (12) based on the detection result of the monitor on the DROP side;

FIG. 29 is a switch determination table (13) based on the detection result of the monitor on the DROP side;

FIG. 30 is a switch determination table (14) based on the detection result of the monitor on the DROP side;

FIG. 31 is a switch determination table (15) based on the detection result of the monitor on the DROP side;

FIG. 32 is a switch determination table (16) based on the detection result of the monitor on the DROP side;

FIG. 33 is a switch determination table (17) based on the detection result of the monitor on the DROP side;

FIG. 34 is a switch determination table (18) based on the detection result of the monitor on the DROP side;

FIG. 35 is a switch determination table (19) based on the detection result of the monitor on the DROP side;

FIG. 36 is a switch determination table (20) based on the detection result of the monitor on the DROP side;

FIG. 37 is a switch determination table (21) based on the detection result of the monitor on the DROP side;

FIG. 38 is a switch determination table (22) based on the detection result of the monitor on the DROP side;

FIG. 39 is a switch determination table (23) based on the detection result of the monitor on the DROP side;

FIG. 40 is a switch determination table (24) based on the detection result of the monitor on the DROP side;

FIG. 41 is a switch determination table (25) based on the detection result of the monitor on the DROP side;

FIG. 43 shows another embodiment of the configuration of the switch realizing the redundancy of an appliance;

FIG. 47 shows a further embodiment of the configuration of the protection device to which the configuration shown in FIG. 42 is practically applied;

DESCRIPTION OF THE PREFERRED EMBODIMENTS

Figure 1:
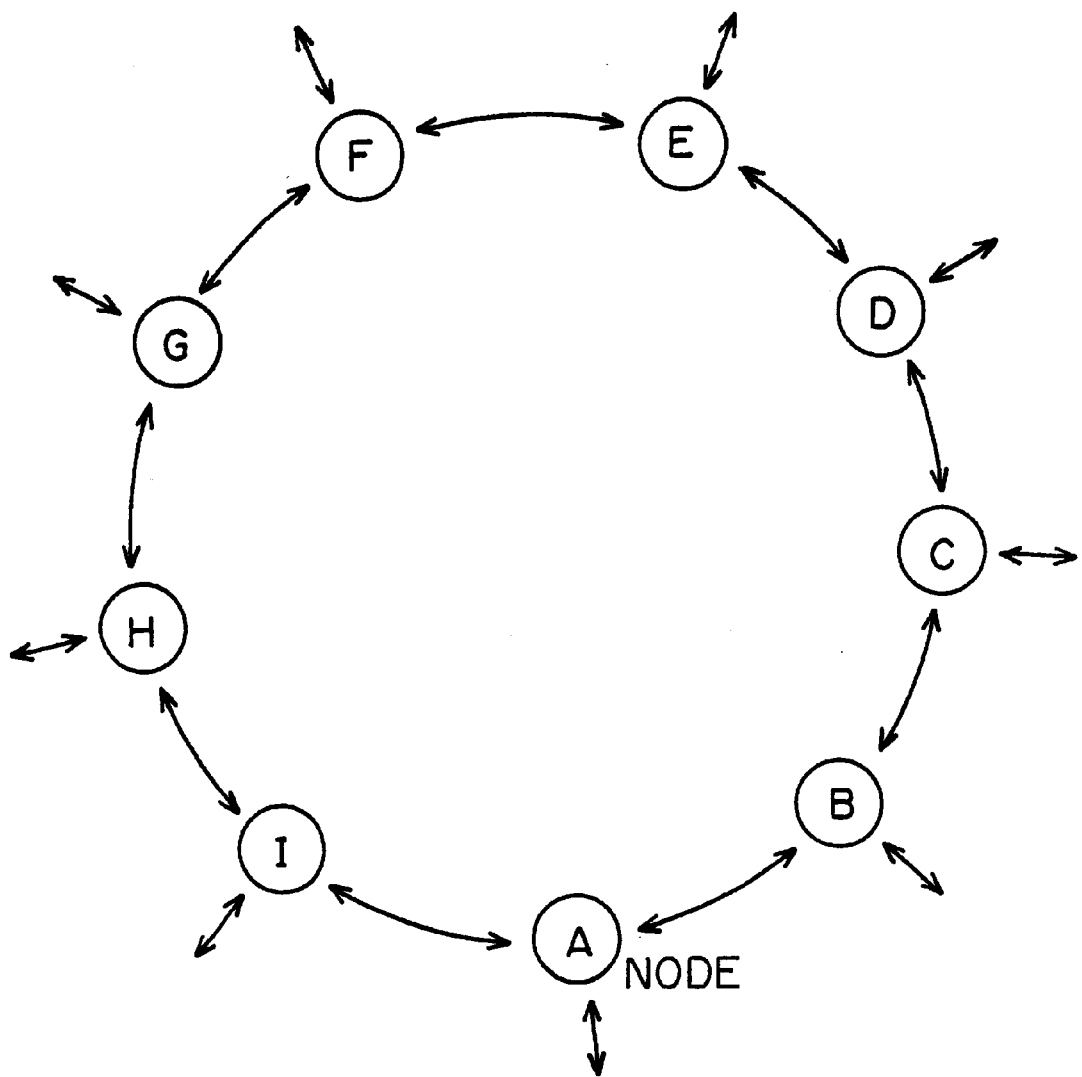
FIG. 1 shows the configuration of the concept of a ring network.

An embodiment of the present invention is applied to a ring network as shown in FIG. 1. However, the present invention is not limited to the ring network (shown in FIG. 1).

In the ring network shown in FIG. 1, a network can be designed in a redundancy system with high flexibility when a 4n×4n complete group switch is installed among input ports to a node, output ports of ADD ports and the node, and DROP ports where the number of clockwise or counter-clockwise outputs in each node is n. ADD·DROP refers to a process, in a node connected to the trunk path, of gathering signals transmitted from a terminal, etc. outside the trunk path, branching a signal from the trunk path, and transmitting a signal to a terminal, etc. outside the trunk path. A complete group switch refers to a switch capable of switch-connecting a signal input from any input port to any output port. The control in a redundancy system can be configured by switch-connecting a complete group switch from the port to which an input of the primary system is connected to the port to which an output of the standby system is connected.

Figure 2:
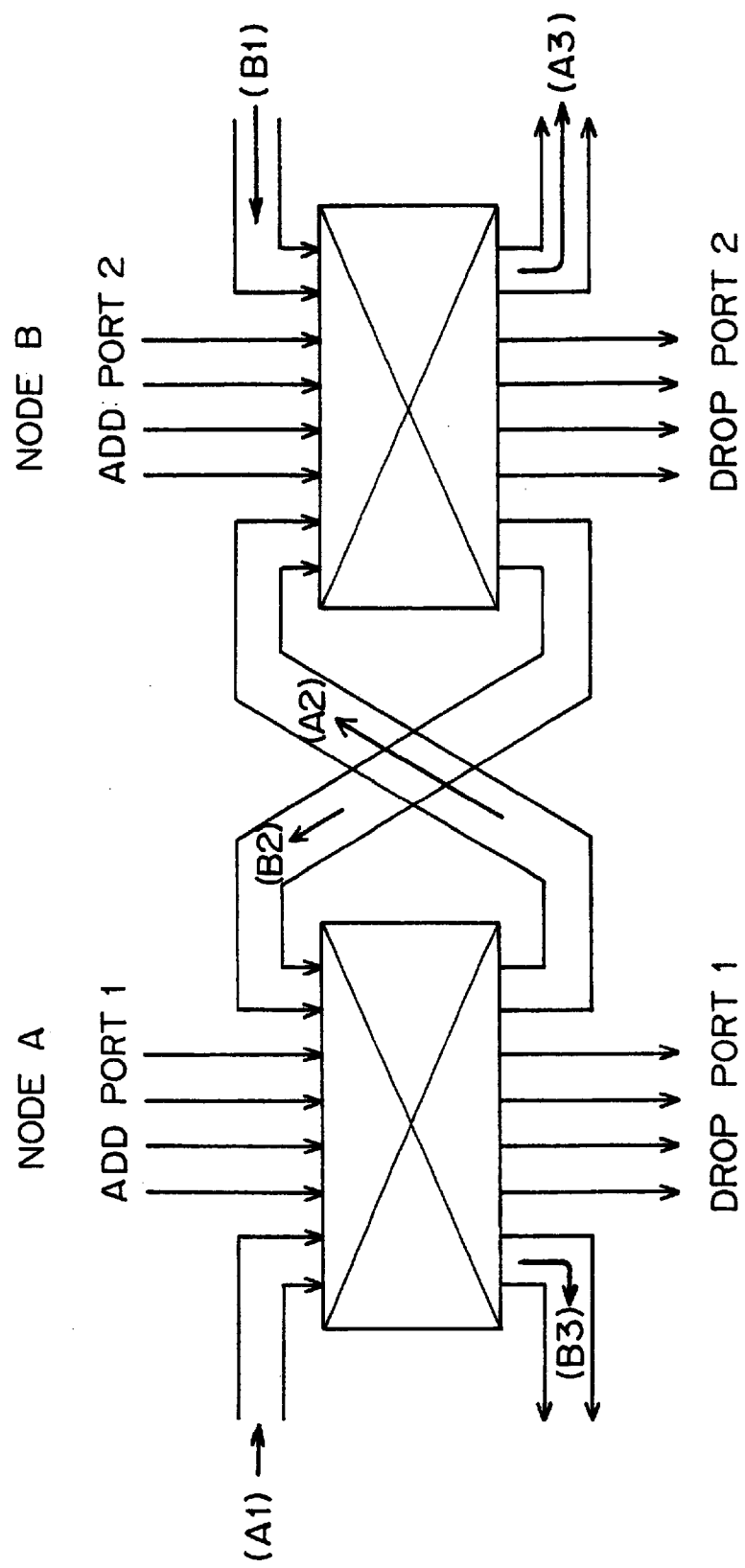
FIG. 2 shows nodes A and B where n=2.

FIG. 2 shows nodes A and B when n=2 with a 4n×4n complete group switch. Since the number n of clockwise outputs is 2 (n=2), for example, the numbers of clockwise, counterclockwise and DROP port outputs are respectively 2, 2, and 4, that is, a total of 8.

In this concept, the 'MS shared protection ring' and the 'MS shared protection ring (transoceanic application) described in ITU-T G841 (the Recommendation published by ITU (International Telecommunication Union) as a worldwide standard) are also based on n=2. That is, with the configuration shown in FIG. 2, the protection ring described in the Recommendation by ITU can be configured. By limiting the switching method corresponding to an occurrence of a fault to the method of an MS shared protection ring, an MS shared protection ring can be configured. By limiting the switching method corresponding to an occurrence of a fault to the method of an MS shared protection ring (transoceanic application), an MS shared protection ring (transoceanic application) can be configured.

Since a complete group switch is used, a flexibility level is very high. When a test is conducted as to whether or not a path can be completely connected, etc. during the production of the device, a path can be freely set for the test. Any connection is allowed as long as an input and an output of the 4n×4n complete group switch can be correctly set.

That is, according to the embodiment shown in FIG. 2, an AD·DROP function and a protection function can be simultaneously realized using a 4n×4n complete group switch.

ADD ports 1 and 2 in nodes A and B receive signals of user data and control data transmitted from a signal transmission device (a user terminal, etc.) and a node of another network. A signal input from the ADD port 1 is output to a path (A2), (B3) or a DROP port 1 in the node A. In addition, a signal input from the ADD port 2 is output to a path (A3), (B2), or a DROP port 2 in the node B. Signals transmitted to the paths (A2), (A3), (B2), and (B3) become primary signals transmitted through a ring network. In addition to the signals input from the ADD ports 1 and 2, a part of the signals of the user data, the control data, etc. input from the paths (A1), (B2), (B1), and (A2) are input from the ring network. The signals output from the DROP ports 1 and 2 are transmitted to a signal termination device such as a user terminal, etc. and a node of another network such as a router, etc.

When there are no errors, a signal passes through a node, adds a signal input from another network of a signal transmission device, or drops a signal to another network or a signal reception device.

For example, a signal passing through the node A and the node B is input from the path (A1) to the input port of the node A, output from the output port, and transmitted to the path (A2). When it is input to the input port of the node B through the path (A2), it is output from the output port of the node B to the path (A3). Thus, a through signal is transmitted from the node A to the node B. Similarly, a through signal from the node B to the node A is transmitted through, for example, the paths (B1), (B2), and (B3).

In the node A, a signal input from the ADD port 1 is output to the path (B3) or the path (A2). A part of the signals input from the path (A1) or the path (B2) is output from the DROP port 1. Similarly, in the node B, a signal input from the ADD port 2 is output from the path (A3) or the path (B2), and a part of the signal input from the path (A2) or the path (B1) to the node B is output to the DROP port 2. Since a complete group switch is used, the ADD port, A1, and A2 can output a signal to any of the B3, DROP port, and A1.

Described below is a case in which an error occurs.

When a signal cannot be transmitted through the path (A2), the path (B2), or these two paths due to a line disconnection, etc., a protection function can be attained by connecting the path (A1) to the path (B3), by connecting the path (B1) to the path (A3), or by connecting both of them. That is, a signal cannot be transmitted in the direction of a line disconnection, but a signal is transmitted through a loop in a node adjacent to a transmission path where a line disconnection has arisen, and a bypass transfer is performed in a ring network, thereby realizing a protection function. A protection function refers to a function for recovery from an error using another device or line with the faulty unit avoided using a method of providing a primary line and a standby line, or bypassing a signal in a ring circuit.

With the configuration shown in FIG. 2, a ring network can be extended. That is, the node A is a node of the first ring network, and the ring network is connected through the ADD port 1 and the DROP port 1. Similarly, the node B is a node of the second ring network different from the first ring network, and the second ring network is connected to the ADD port 2 and the DROP port 2 of the node B. In this case, the paths (A2) and (B2) connect the nodes of the different networks, thereby transmitting and receiving signals between the different networks through the paths (A2) and (B2). That is, using the switch with the configuration shown in FIG. 1, nodes of different networks can be interconnected, and the number of networks can be increased.

Figure 3:
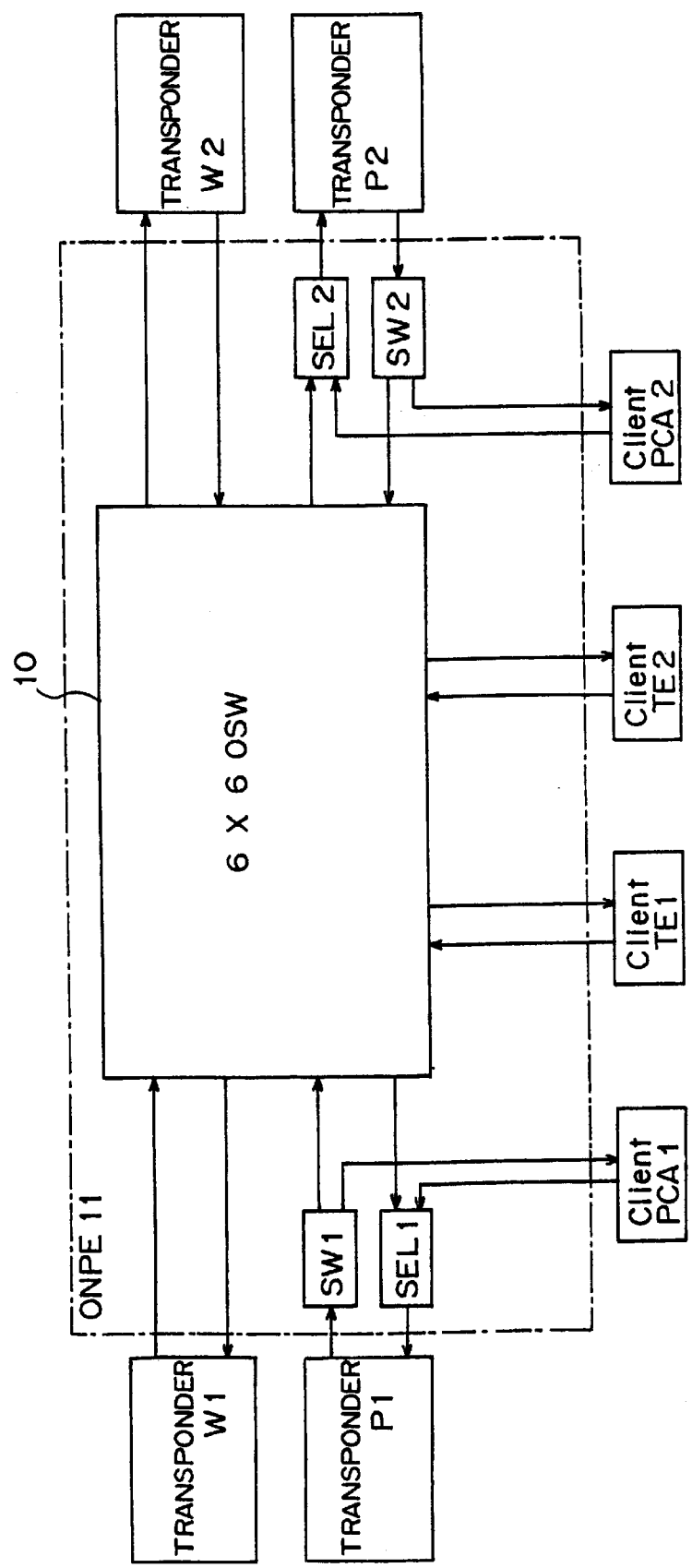
FIG. 3 shows an embodiment of the present invention.

FIG. 3 shows an embodiment of the present invention.

The case shown in FIG. 3 is described below by referring to an example of an optical NPE (ONPE) using an optical switch. The configuration according to the present embodiment can also be realized using an electric switch.

According to the present embodiment, the number of lines input to the ONPE, and the number of lines output from the ONPE are n, and half of them is used as standby lines. In this case, an NPE can be configured by a 3n×3n complete group switch and a 2:1 selector switch.

FIG. 3 shows the configuration of the case in which n=2. In FIG. 3, six ports are used as inputs to, and six ports are used as outputs from an optical switch (6×6 OSW) 10. That is, the output n in the clockwise or counterclockwise direction in a ring network is 2, but a 3n×3n complete group switch is a 6×6 complete group switch. In FIG. 2, there are respectively four AD·DROP inputs and outputs. In FIG. 3, there are two AD·DROP inputs and output to the clients TE1 and TE2. Therefore, there are six outputs, that is, four outputs of the ring network and the clients TE1 and TE2, from the complete group switch 10. Transponders W1 and W2 are signal regenerators provided in the primary line, and input and output signals from the primary line. A transponder refers to a device for converting an input optical signal into an electric signal, regenerating a signal, converting it into an optical signal, and converting and outputting the wavelength and the bit rate of a signal. Transponders P1 and P2 are signal regenerators provided in the standby line, and input and output a signal from the standby line. A client PCA refers to protection channel access for transmitting and receiving a signal for transmission through a protection transmission line when the primary line is normally used. When the primary line is normally used, the standby line is not busy. Therefore, low priority information is transmitted between nodes while the primary line is not switched to the standby line so that the resources as a transmission medium in the standby line can be effectively used.

The MS shared protection rings and the MS shared protection ring (transoceanic application) can be used with the above mentioned configuration.

That is, a signal transmitted through the primary line is input to the transponder W1, for example. The signal in the primary line input from the transponder W1 to the 6×6 OSW 10 passes through the 6×6 optical switch (OSW), and is transmitted as is to the transponder W2, or transmitted to the client TE1 (terminal equipment) or TE2 when there is no error. The signal input to the transponder W2 is transmitted again to the primary line of the ring network. A client TE refers to a network client, transmits and receives a signal carrying information for communications, etc., and can be a user terminal, etc. A user terminal transmits and receives data such as a document, an image, etc. to be transmitted as a signal, and is switched and connected to a trunk line of a ring network using the 6×6 OSW 10 so that data can be transmitted to a destination user or received from a source user. Similarly, a signal in the primary line input through the transponder W2 is transmitted to the transponder W1, the client TE1, or TE2. As described above, when there are no error, the signal input from the transponder W2 passes through the 6×6 OSW 10, then it is transmitted to the transponder W1, and transmitted from the transponder W1 to the primary line. The signal input from the transponder W2 is otherwise input to the input port of the 6×6 OSW 10, the 6×6 OSW 10 switches and connects the signal, and the signal is output from the output port, and is then transmitted to the client TE1 or TE2. The client TE1 or TE2 can be, for example, a user terminal as described above.

When there is no error in the primary line, a signal is transmitted from the clients PCA1 and PCA2 through selectors SEL1 and SEL2 to the standby line to which the transponders P1 and P2 are connected. At this time, the transponders P1 and P2 convert the input optical signal into an electric signal, regenerate a signal, etc., convert it into an optical signal again, and then transmits it to the standby line. The signal transmitted through the standby line is input to the transponders P1 and P2, and is regenerated as described above, and switches SW1 and SW2 transmit the signal to clients PCA1 and PCA2.

The signal transmitted to the standby line when there is no error in the primary line cannot be transmitted as a low priority signal when there occurs an error in the primary line. For example, when an error occurs on the transponder W2 side, an important signal transmitted through the primary line to be input from the transponder W1 to the optical switch (6×6 OSW) 10 is switched and connected by the optical switch (6×6 OSW) 10, and is output to the port to which the selector SEL2 is connected. Since the signal from the client PCA2 is a low priority signal, the selector SEL2 determines that the signal in the primary line containing user data is more important, selects the signal transmitted from the transponder W1, and transmits it to the transponder P2. Since an error has occurred on the transponder W2 side, a signal to be transmitted from the transponder W2 is transmitted from the transponder P2 through the standby line. Then, a switch SW2 inputs the signal not to the client PCA2, but to the input port of the optical switch (6×6 OSW) 10. The optical switch (6×6 OSW) 10 switches and connects the signal input from the switch SW2 so that it can be input to the transponder W1 connected to the output port of the optical switch (6×6 OSW) 10.

Using the optical switch (6×6 OSW) 10 of a complete group, A protection switch can be easily configured. Especially, when there are two upstream and downstream primary lines, two upstream and downstream standby lines as shown in FIG. 3, and two clients TE, the optical switch (6×6 OSW) 10 can be a 6×6 optical switch. Thus, an optical protection switch (ONPE 11) can be configured with a less expensive and simple structure obtained by adding a switch and a selector to the above mentioned 6×6 optical switch.

Figure 4:
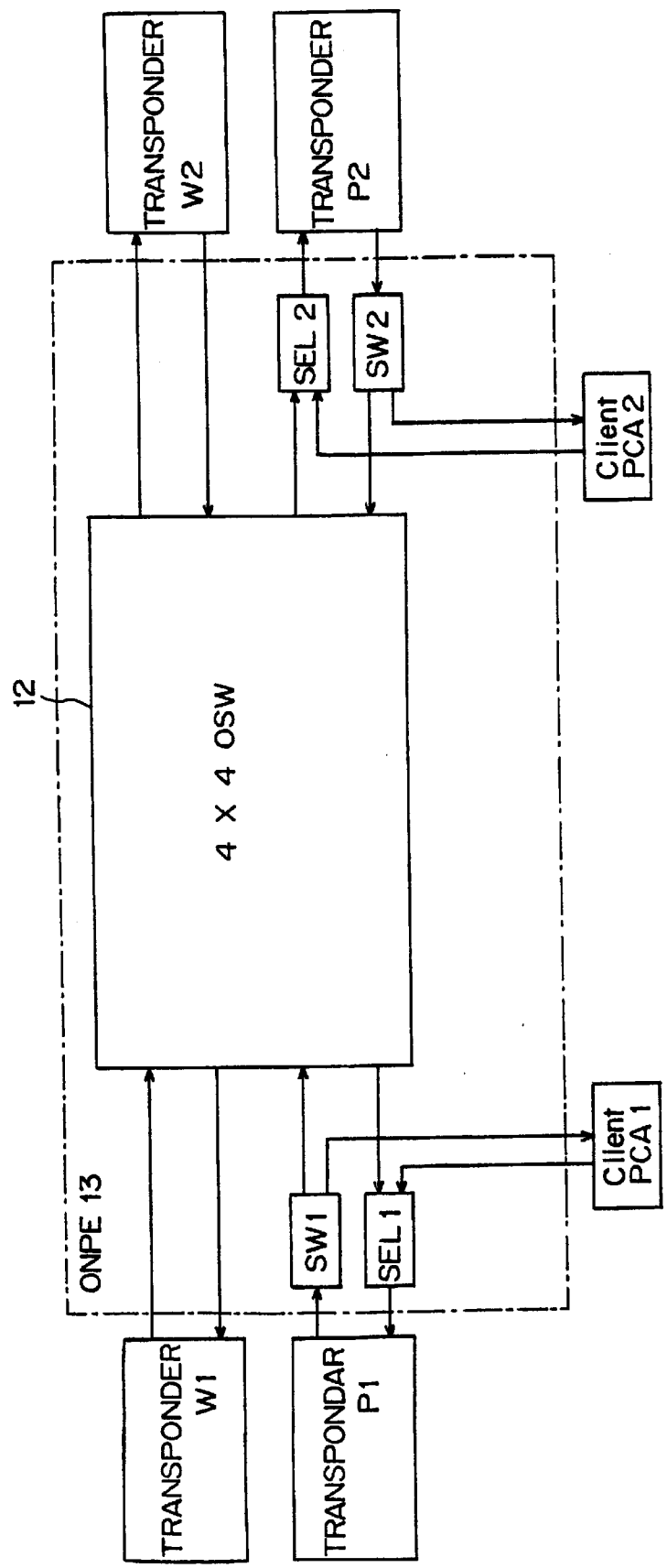
FIG. 4 shows an embodiment of the ONPE according to the present invention when ADD·DROP is not performed.

FIG. 4 shows an embodiment of the ONPE according to the present invention when no AD·DROP is used.

When no AD·DROP is used as shown in FIG. 4, a 2n×2n switch can be used. Especially, FIG. 4 shows the configuration where n=2. In FIG. 4, it is assumed that an optical switch is used, but an electric switch can also be used.

Normally, when there is no error, the transponder W1 to which the primary line is connected first regenerates the optical signal input from the primary line, and inputs it through the line connected to the input port of an optical switch (4×4 OSW) 12. The optical signal input to the optical switch (4×4 OSW) 12 passes through the optical switch (4×4 OSW) 12, and is transmitted to the transponder W2 connected to the output port of the optical switch (4×4 OSW) 12, regenerated by the transponder W2, and transmitted to the primary line. Similarly, the signal input from the transponder W2 through the primary line is input to the optical switch 12 through the line connected to the input port of the optical switch 12, passes through the optical switch (4×4 OSW) 12, and is transmitted to the transponder W1 connected to the output port of the optical switch 12, regenerated, and then transmitted to the primary line. The signal input from the transponder P1 of a standby system to an ONPE 13 is normally input to the client PCA1 through the switch SW1. The signal transmitted from the client PCA1 is transmitted to the transponder P1 through the selector SEL1. Since there is no error, the clients PCA1 and PCA2 transmit the low priority data signal to the free standby line as described above.

Similarly, in a normal operation, the signal input from the transponder P2 to the ONPE 13 through the standby line is input to the client PCA2 through the switch SW2, and the signal transmitted from the client PCA2 is transmitted to the transponder P2 through the selector SEL2, and then to the standby line.

If an error occurs on the transponder W2 side, the signal input from the transponder W1 to the ONPE 13 through the primary line is connected to the input port of the optical switch 12, switched and connected by the optical switch (4×4 OSW) 12, and then output to the selector SEL2. The selector SEL2 switches the signal from the client PCA2, transmits the signal from the optical switch (4×4 OSW) 12 to the transponder P2, and transmits the signal through the standby line. In addition, since there is an error in the transponder W2, the signal from the transponder W2 is output from the transponder P2 through the standby line. The signal output from the transponder P2 is connected to the switch SW2, and input to the switch SW2. Then, it is input not to the client PCA2, but to the input port of the optical switch (4×4 OSW) 12. The signal is switched and connected by the optical switch (4×4 OSW) 12, transmitted from the output port of the optical switch 12 to the transponder W1, regenerated, and then transmitted through the primary line.

When the transponder W2 normally operates, and the transponder W1 becomes faulty, the signal from the transponder W2 is transmitted to the transponder P1, and the signal from the transponder P1 is transmitted to the transponder W2.

When an error occurs as described above, the signal in the primary line is transferred to the standby line, and the signal transmitted and received by the clients PCA1 and PCA2 are discarded as being insignificant.

Described below is system based on, but is not limited to, a submarine optical communications system.

The configuration of the transponder is the same as the configuration of the conventional system. Therefore, the redundancy of the transponder is designed using a span switch. A span switch is a switch for bypassing the primary line which has become faulty by switching the signal transmission direction from the primary line to the standby line from west to east as is in a ring network.

Figure 5:
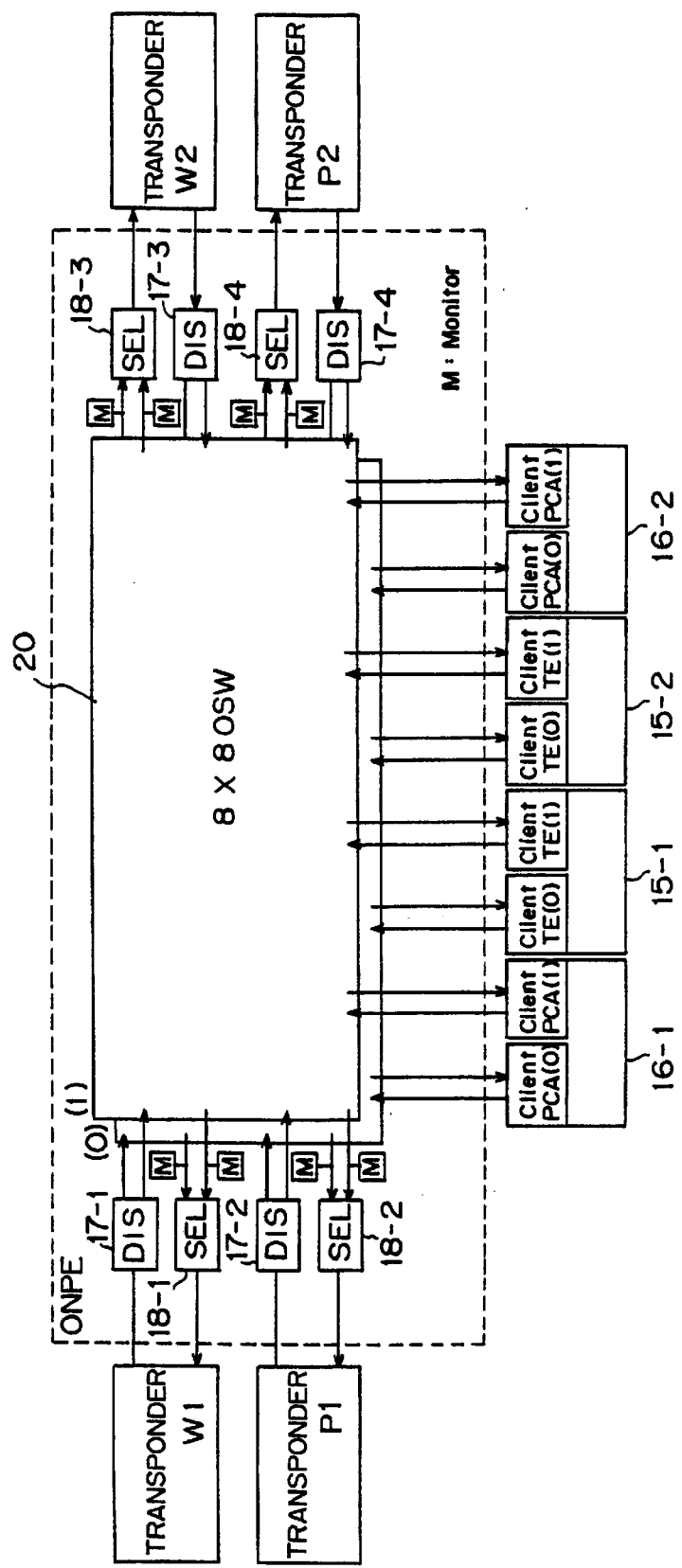
FIG. 5 shows the basic redundancy configuration according to an embodiment of the present invention.

FIG. 5 shows the configuration of basic redundancy according to an embodiment of the present invention.

FIG. 5 shows an example of configuring the optical NPE having the AD·DROP configuration using a 4n×4n, that is, an 8×8 switch.

The signal input from the transponder W1 on the primary line side through the primary line is input to a distributor 17-1. The distributor 17-1 distributes the signal from the transponder W1 to an optical switch (8×8 OSW) 20 developed into systems 0 and 1 for redundancy. When a signal is switched, connected, and passes through by the optical switch (8×8 OSW) 20 of either system 0 or 1, it is output to a selector 18-3. The selector 18-3 selects a signal output from the optical switch (8×8 OSW) 20 of either system 0 or 1, and outputs the selected signal to the transponder W2. In this case, a switch to the standby system or an AD·DROP process is not performed.

When the AD·DROP is performed, the signal from the transponder W1 is transmitted by the optical switch (8×8 OSW) 20 to clients TE15-1 and TE15-2. In this case, the client TE has both systems 0 and 1. A signal transmitted through the optical switch of the system 0 is received by a device of the system 0 while a signal transmitted through the optical switch of the system 1 is received by a device of the system 1. Signals transmitted from the clients TE15-1 and TE15-2 are output from the devices of the system 0 and the system 1 respectively, and output to the optical switch (8×8 OSW) 20 of the system 0 and the optical switch (8×8 OSW) 20 of the system 1 respectively. Then, the signals are input by the optical switch (8×8 OSW) 20 to either selector 18-1 or 18-3, and transmitted to the transponder W1 or W2.

In the normal operation, signals from clients PCA 16-1 and 16-2 are input to the input ports of the optical switch (8×8 OSW) 20, switched and connected, transmitted from the output ports to the transponders P1 and P2 provided in the standby line. The signals from the transponders P1 and P2 are transmitted to the clients PCA 16-1 and 16-2. The clients PCA 16-1 and 16-2 are provided with the devices of the systems 0 and 1. The signals from the clients PCA1 and PCA2 of the system 0 are input to the optical switch (8×8 OSW) 20 of the system 0, and the signals from the clients PCA1 and PCA2 of the system 1 are input to the optical switch (8×8 OSW) 20 of the system 1. Selectors 18-2 and 18-4 outputs any of the signals output from the optical switch (8×8 OSW) 20 of the systems 0 and 1 to the transponder P1 or P2.

Distributors 17-2 and 17-4 input a signal from the transponder PI or P2 to the input port of the optical switch (8×8 OSW) 20 of the system 0 or 1.

When the transponder W2 becomes faulty, a signal from the transponder W1 is switched and connected by the optical switch (8×8 OSW) 20, output to the transponder P2 side, and the signal from the transponder P2 is transmitted to the transponder W1. In this case, the signals transmitted from the clients PCA 16-1 and 16-2, or the signal to be transmitted to them are discarded. Thus, the optical switch (8×8 OSW) 20 can function as a span switch.

Furthermore, since the optical switch (8×8 OSW) 20 is a complete group switch, it can transmit the signals from the clients TE15-1 and TE15-2 to the transponders W1, W2, P1, and P2. The configuration is referred to as a ring switch function.

When both transponders W2 and P2 are faulty and inoperable, a signal from the transponder W1 can be connected to the transponder P1 by switch-controlling the optical switch (8×8 OSW) 20 for a loop switch function because the entire network is a ring network.

In FIG. 5, a reference character 'M' denotes a monitor for detecting whether or not an optical signal is correctly transmitted, and for detecting a fault in the optical switch (8×8 OSW) 20 of the systems 0 and 1.

Figure 6:
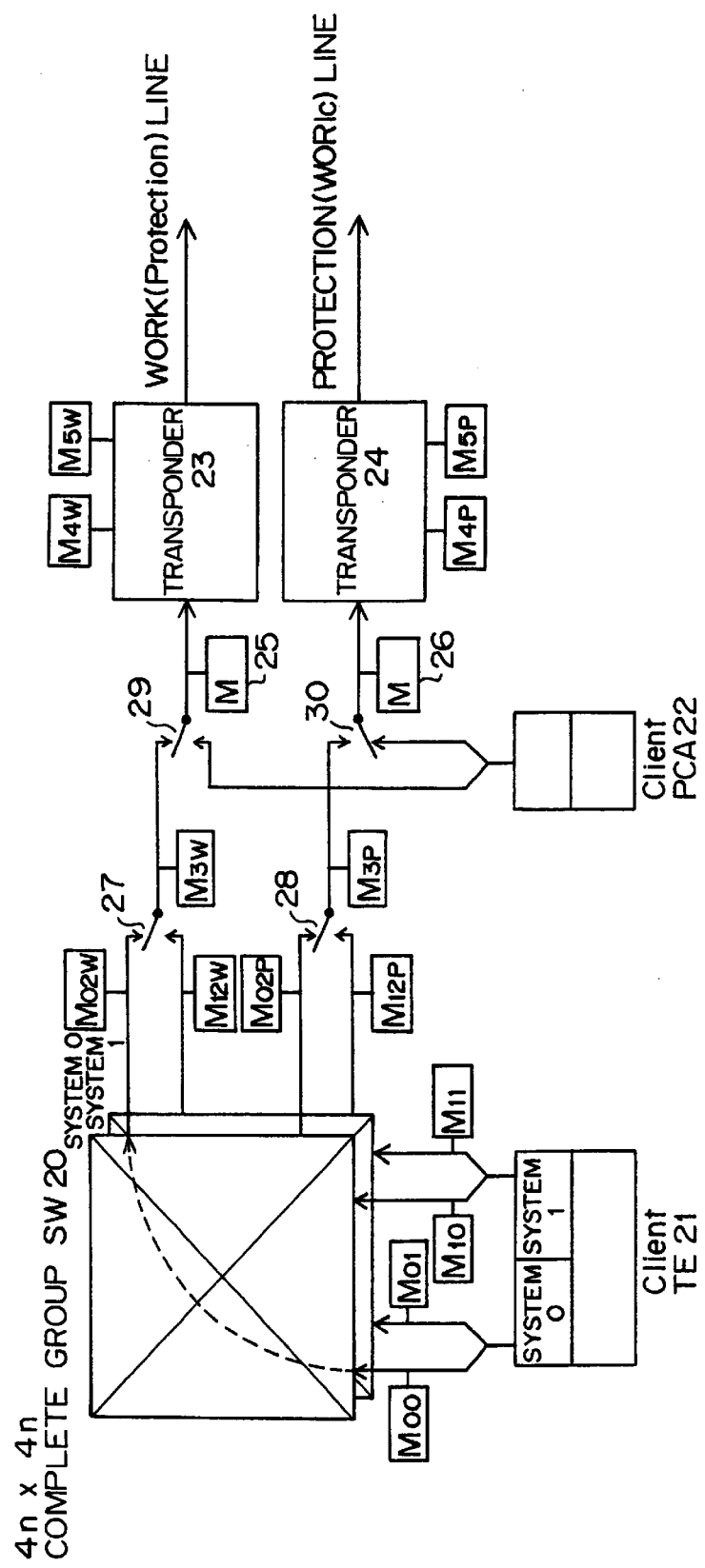
FIG. 6 shows an embodiment of a redundancy configuration on the ADD side of the optical NPE according to the present invention.

FIG. 6 shows an embodiment of the redundancy configuration on the ADD side of the optical NPE according to the present invention.

With the configuration shown in FIG. 6, a client TE21 is provided with devices of the systems 0 and 1 each of which outputs a signal. With the configuration shown in FIG. 6, unlike the configuration shown in FIG. 5, the signals from the systems 0 and 1 among the signals from the client TE21 are branched and input to the optical switch (4n×4n complete group switch) 20 of the systems 0 and 1. In the 4n inputs, n inputs are the signals of the system 0 from the client TE21, and another n inputs are signals to the add port of the 4n×4n complete group switch 20 from the system 1 of the client TE21. Other 2n inputs are the signals from a trunk path not shown in the attached drawings. The trunk path comprises a primary system and a standby system. N output ports are used as standby system lines, 2n ports are used as standby system lines, and another 2n ports are used as drop ports.

Thus, the signal from the client TE21 input to the optical switch (4n×4n complete group switch) 20 is added to the trunk path, and transmitted to selectors 27 and 28.

In this case, for example, a signal output from the device of the system 0 of the client TE21 is switched and connected to be input to the selector 27, and a signal output from the device of the system 1 of the client TE21 is switched and connected to be input to the selector 28. The selector 27 is an exchange of the systems 0 and 1 in the primary line, and the selector 28 is an exchange of the systems 0 and 1 in the standby line.

The selectors 27 and 28 select a signal to be transmitted from either system 0 or system 1 of the optical switch (4n×4n complete group switch) 20, and outputs the selected signal to selectors 29 and 30. The selectors 27 and 28 are controlled by a control circuit not shown in the attached drawings.

The signals selected by the selectors 27 and 28 are input to the selectors 29 and 30. The selectors 29 and 30 transmit the signal from the optical switch (4n×4n complete group switch) 20 to a transponder 23 or 24 when the primary line normally operates. At this time, the selectors 29 and 30 select and output the signal from a client PCA 22 to input it to the transponder 23 or 24 which is the standby line. The client PCA 22 can transmit a signal to the transponders 23 and 24. The line connected to either transponder 23 or 24 can be alternately the primary line and the standby line. That is, when either of the lines transmits a primary signal, and the line is not faulty, the signal of the client PCA 22 can be transmitted to the other line.

The transponders 23 and 24 temporarily convert a received optical signal into an electric signal, perform a signal regenerating process, reconvert it into an optical signal, and output the result to the respective lines. Assuming that the primary line is connected to the transponder 23, and the standby line is connected to the transponder 24, a signal from the client TE21 is output from the transponder 23, and a signal from the client PCA 22 is output from the transponder 24.

If the primary line (line connected to the transponder 23) or the transponder 23 itself has become faulty, then the optical switch (4n×4n complete group switch) 20 switches and connects a signal from the client TE21 to output it to the selector 28. The selector 30 connected to the client PCA 22 and the optical switch 20 inputs the signal from the optical switch (4n×4n complete group switch) 20, not the signal from the client PCA 22, to the transponder 24, thereby protecting the line against an error. If the line connected to the transponder 23 or the transponder 23 itself has recovered from an error, the signal from the optical switch (4n×4n complete group switch) 20 remains as is, and the signal from the client PCA 22 is selected by the selector 29, and output from the transponder 23.

Thus, the previous standby line now functions as a primary line, and the previous primary line which has become faulty functions as a standby line.

The signal from the client PCA 22 is transmitted only to the line connected to the transponder 24. If the transponder 23 has recovered from an error, the signal from the client TE21 can be controlled to be transmitted from the transponder 23. This process is commonly known as a recovery process.

The selectors 27 and 28 are set such that either system 0 or system 1 of the optical switch (4n×4n complete group switch) 20 can be selected. However, the optical switch (4n×4n complete group switch) 20 is configured for redundancy such that, for example, if both selectors 27 and 28 select the system 0, and the system 0 of the optical switch (4n×4n complete group switch) 20 become faulty, then the signal from the system 1 of the optical switch (4n×4n complete group switch) 20 can be switched and connected for use.

Furthermore, the client TE21 is also provided with the systems 0 and 1 for redundancy such that, if the device of the system 0 has become faulty when the signal of the system 0 is transmitted to the primary line, then the optical switch (4n×4n complete group switch) 20 switches and connects the signal from the system 1 of the client TE21 for transmission to the primary line.

In FIG. 6, monitors 25 and 26 expressed by 'M', and monitors expressed by Ms with subscripts obtain information for determination whether or not it is necessary to switch the primary line, the standby line, the optical signal, and the system 1 by measuring the level of the transmitted signal, and control the selectors 27, 28, 29, 30, etc. The control is performed by the control circuit not shown in the attached drawings, and described later in detail.

Figure 7:
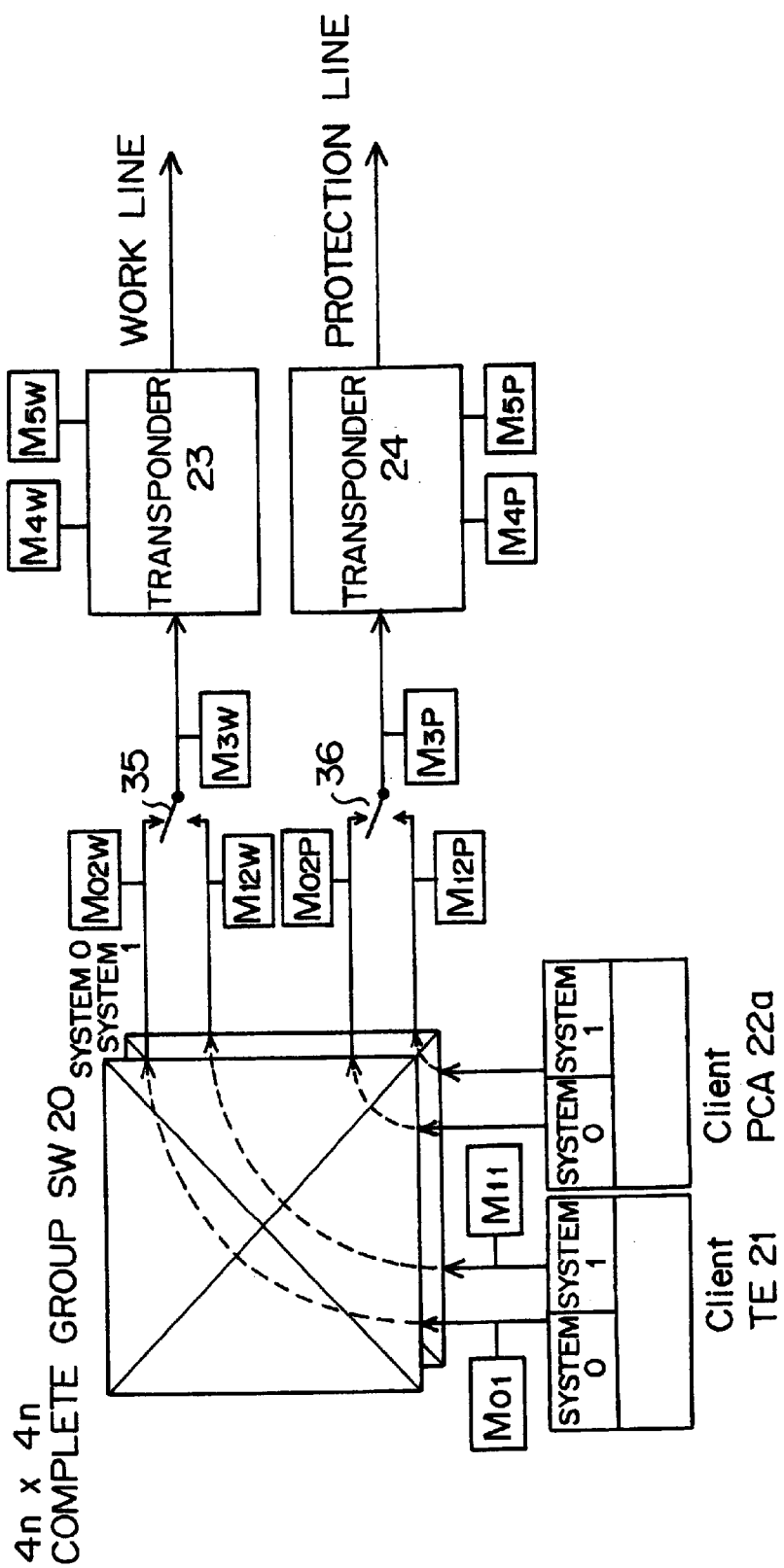
FIG. 7 shows another embodiment of a redundancy configuration of an ADD port in an optical NPE according to the present invention.

FIG. 7 shows another embodiment of the redundancy configuration of the ADD port in the optical NPE according to the present invention.

In the present embodiment, an ADD signal transmitted from the device of the system 0 of the client TE21 is input to the optical switch (4n×4n complete group switch) 20 of the system 0, and an ADD signal transmitted from the device of the system 1 of the client TE21 is input to the optical switch (4n×4n complete group switch) 20 of the system 1.

In the normal operation, the ADD signal transmitted from the system 0 of the client TE21 passes through the optical switch (4n×4n complete group switch) 20 of the system 0, and is input to the selector 35, and the ADD signal transmitted from the system 1 of the client TE21 passes through the optical switch (4n×4n complete group switch) 20 of the system 1, and is input to the selector 35.

With this configuration, there arises a room in the number of ports of the optical switch (4n×4n complete group switch) 20. Therefore, for example, 2n ports are used for input both clockwise and counterclockwise of the primary line, 2n ports are used for output both clockwise and counterclockwise of the primary line, and the remaining 2n ports connect ADD or DROP lines. However, since it is rare that all 2n ports are used for ADD and DROP lines, the signal from a client PCA 22a can also be processed by the optical switch (4n×4n complete group switch) 20. It is rare that all 2n ports are used because the number of lines of the primary lines of the trunk paths for transmitting signals to all nodes is n clockwise or counterclockwise while the ADD/DROP node is one of a plurality of nodes, thereby not dropping all lines to the node or adding it to all lines. In this case, the signal transmitted from the system 0 of the client PCA 22a is input to the optical switch (4n×4n complete group switch) 20 of the system 0, the signal transmitted from the system 1 of the client PCA 22a is input to the optical switch (4n×4n complete group switch) 20 of the system 1, and each of them is input to a selector 36.

The control circuit not shown in the attached drawings determines a signal transmitted from the system 0 of the optical switch or the system 1 of the optical switch for input to the transponders 23 and 24 based on the detection result of the monitors of the optical signals expressed by the Ms with subscripts as shown in FIG. 7, and controls selectors 35 and 36.

In the normal operation, a signal from the client TE21 is transmitted to the primary line, and a signal from the client PCA 22a is transmitted to the standby line. When the primary line becomes faulty, the signal from the client TE21 is output to the selector 36 by the optical switch (4n×4n complete group switch) 20, and transmitted to the standby line.

In this case, the signal of the client PCA 22a is discarded as an insignificant signal. If the primary line has recovered from an error, then the signal from the client TE21 is input again to the transponder 23, and the signal from the client PCA 22a can be input to the transponder 24, or the signal from the client TE21 is held as is, and the signal from the client PCA 22a can be input to the transponder 23.

Described below is the switch determining process on the ADD side.

In the following explanation, the system shown in FIG. 7 is described, but the case shown in FIG. 6 can also be easily realized in a practical processing method by one of ordinary skill in the art.

The monitors other than the monitors $M_{4W}$, $M_{5W}$, $M_{4P}$, and $M_{5P}$ are optical level monitor. The $M_{4W}$ and $M_{4P}$ are signal disconnection monitors for an O/E or an optical amplifier, $M_{5W}$ and $M_{5P}$ are the SF and SD bytes of the SDH (SDH is short for synchronous digital hierarchy which is a standard of an optical communications network used in Japan, etc. The SF and SD bytes are contained in the header of the frame forming data prescribed by the SDH, and contains the information for monitor of a system) for detecting a logical sum.

A package error and a missing package in the transponders 23 and 24 are to be a switch trigger, but are not specifically discussed here. The determination control to process as a switch trigger a fault in a package unit forming appliances of the transponders 23 and 24, or a missing package, that is, no package of an appliance to be provided with, etc. can be easily realized by one of ordinary skill in the art only by referring to the present embodiment.

An optical level monitor cannot appropriately perform a determining process using only one threshold. That is, a switch trigger sensitively reacts with small loss fluctuation of a portion if there is only one threshold, thereby obtaining an unreasonable detection result.

Therefore, according to the present embodiment, two thresholds are set for the optical level monitor. One threshold is set for a level (for example, 3 dB down) lower than the optical level at which an alarm is raised that an input optical level is low. This value depends on the optical loss deviation or fluctuation.

Figure 8:
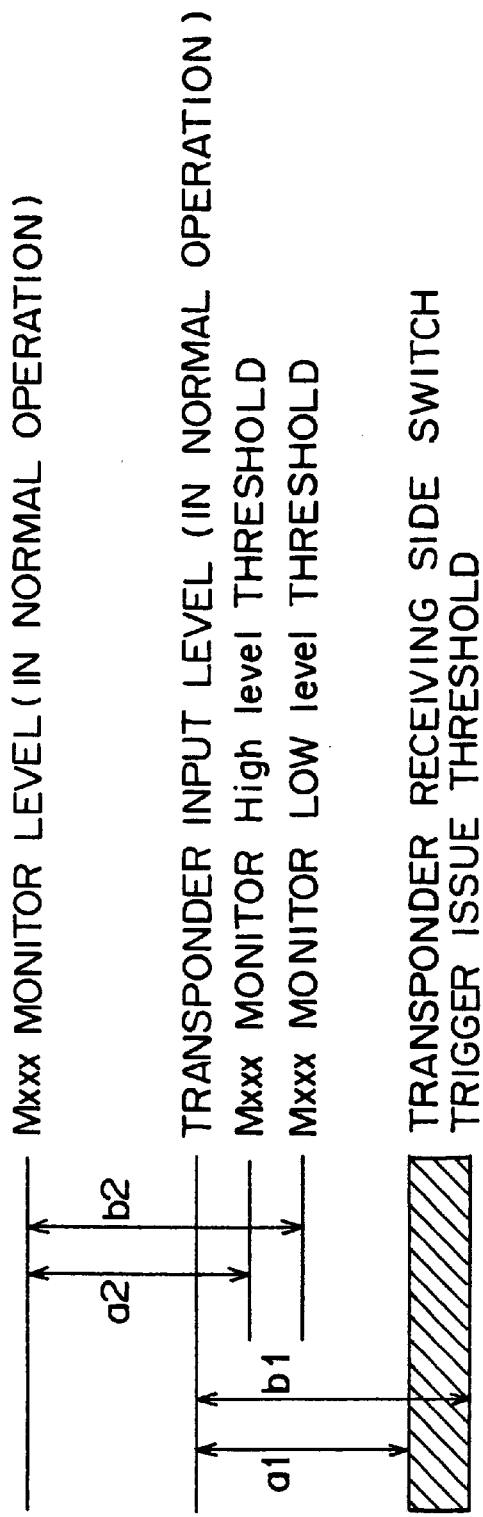
FIG. 8 shows the relation of monitor levels.

FIG. 8 shows the relationship among monitor levels.

In FIG. 8, the switch trigger on the reception side of a transponder includes a certain margin. A high level indicates a level at which the switch trigger does not work, and a low level indicates a level at which the switch trigger works without fail.

The method of setting the threshold shown in FIG. 8 is an example. That is, the difference a1 between the transponder input level in the normal operation and the upper limit of the receiving side switch trigger issue threshold of the transponder is set to be equal to the difference a2 between the monitor level in the normal operation of the optical level monitor Mxxx and the high level threshold of the Mxxx monitor. Similarly, the difference b1 between the transponder input level in the normal operation and the lower limit of the receiving side switch trigger issue threshold of the transponder is set to be equal to the difference b2 between the monitor level in the normal operation of the Mxxx monitor and the low level threshold of the Mxxx monitor. The transponder receiving side switch trigger issue threshold corresponds to the value between the Mxxx monitor high level threshold and the Mxxx monitor low level threshold. When a normal value of the Mxxx monitor level is larger than the high level threshold of the Mxxx monitor, the Mxxx monitor does not issues an abnormal status. Since the Mxxx monitor and the monitor M of the transponder observe the same optical signal transmitted through a transmission line, the Mxxx monitor level becomes smaller than a normal value when the transponder input level becomes smaller than the normal value, and their reduction values are substantially proportional to each other. Therefore, when a transponder reception switch trigger works, and the Mxxx monitor normally operates as an appliance, a signal informing that an error has occurred is generated.

Figure 9:
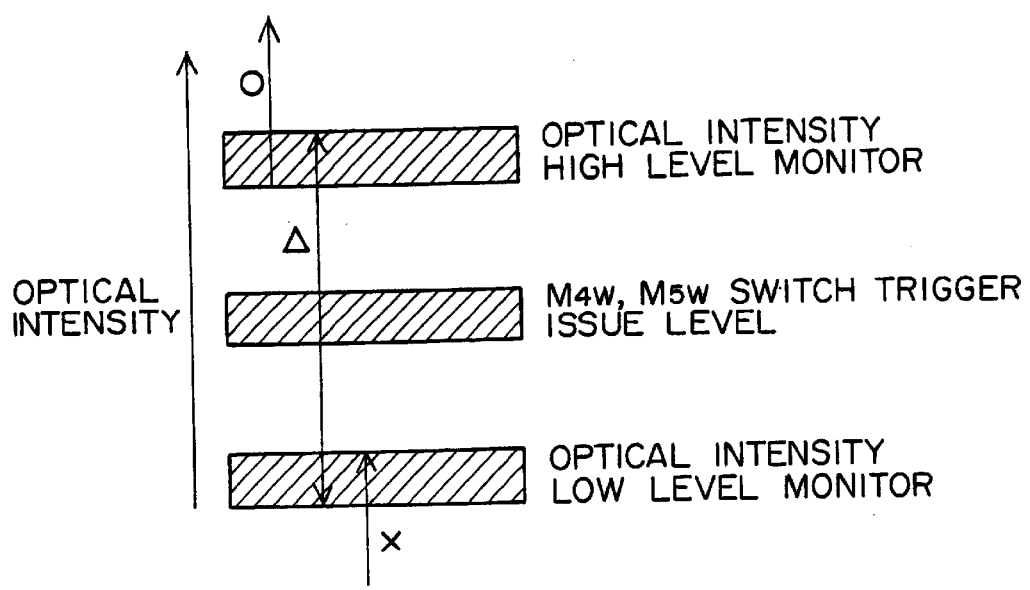
FIG. 9 shows the details of the relation of a threshold.

FIG. 9 shows the details of the correspondence among thresholds.

FIG. 9 shows the relative relation among the monitor thresholds observed from a certain view point.

FIG. 10 shows the status of the monitor when a monitor circuit normally operates. The threshold of each optical level monitor is not constant, ○ and Δ simultaneously exist, and Δ and X simultaneously exist. ○ indicates that the optical level is higher than the threshold of the high level. Δ indicates that a light having a level higher than the threshold of the low level but lower than the high level has been input. X indicates that a light having a level lower than the low level has been input.

The switch determination of an important line is described below. The switch determination and the switch of a selector based on the switch determination are performed by the control circuit not shown in FIGS. 6 and 7.

The monitors $M_{4W}$ and $M_{5W}$ of the transponder are used as a switch trigger. Then, a switching method is determined by observing an upstream monitor (on the optical switch side).

FIGS. 11 through 15 show a switch determination table based on the results detected by the monitors $M_{4W}$ and $M_{5W}$ with the configuration on the ADD side shown in FIG. 7.

FIG. 11 shows a protection line selected as a transient status. However, it is more appropriate to reduce wasteful determination by taking a protection time after a switching process, and reading a work line replacing a protection line without a recovery process. In this case, a bi-directional switch is required.

When the work line does not replace the protection line, a switching process is performed by referring to FIGS. 14 and 15. When the work line can recover from the error, a protection period is taken for a recovery process.

First, the status 1 shown in FIG. 11 shows the detection status of the monitor of the line through which a signal is transmitted from the device of the system 0 of the client TE21, and the determining method when the 4n×4n complete group switch 20 uses a work line in transmitting a signal from the client TE21 as shown in FIG. 7. FIG. 12 is a switch determination table.

In FIG. 12, when all monitors $M_{3W}$, $M_{02W}$, and $M_{01}$ are ○, that is, when the status 1 shown in FIG. 10 is entered (the optical level is higher than the threshold of the high level), the monitors $M_{3W}$, $M_{02W}$, and $M_{01}$ provided in the ONPE normally operate although the switch trigger works from the monitors $M_{4W}$ and $M_{5W}$ of the transponder 23. Therefore, as described in the determination column shown in FIG. 12, it is determined that the ONPE comprising the 4n×4n complete group switch 20, a 2:1 selectors (switch) 35 and 36 normally operate, but the transmission line between the ONPE and the transponder 23 is faulty.

In this case, as described in the column 'switch-to target' of No.1 shown in FIG. 12, the line selection of the 4n×4n complete group switch 20 is set as 'protection', thereby transferring control to the status 3 shown in FIG. 11. That is, the 4n×4n complete group switch 20 outputs the signal of the system 0 of the client TE21 to the line to which the monitor M02P is connected. The switch (2:1 selector) 36 transmits it to the transponder 24, and transmits the signal from the client TE21 to the protection line.

When control is transferred to the determination of the status 3 shown in FIG. 11, and the switch trigger is not applied from the monitors $M_{4P}$ and $M_{5P}$, the protection line is normal. Therefore, it transmits the signal from the client TE21 of the system 0.

Thus, any of the tables shown in FIGS. 11 through 15 is selected for detection of a monitor and determination depending on 'work' or 'protection' for the line selection of the 4n×4n complete group switch 20 for use in transmitting a primary signal when the switch trigger occurs from the transponder 23 or the transponder 24 shown in FIG. 7, and depending on 'system 0' or 'system 1' of the 2:1 selectors 35 and 36, the error occurrence status and the control are read from the corresponding line on each table from the status of each of the monitors $M_{01}$, $M_{11}$, $M_{02W}$, $M_{12W}$, $M_{3W}$, $M_{02P}$, $M_{12P}$, and $M_{3P}$, and the 4n×4n complete group switch 20 and the 2:1 selectors 35 and 36 are controlled to recover from the error. The tables are actually stored on memory provided in the control circuit as electronic data such that the control circuit not shown in the attached drawings can automatically read them, and the control circuit can refer to them as necessary to control the ONPE.

Described below is the switch determination on the DROP side.

Figure 16:
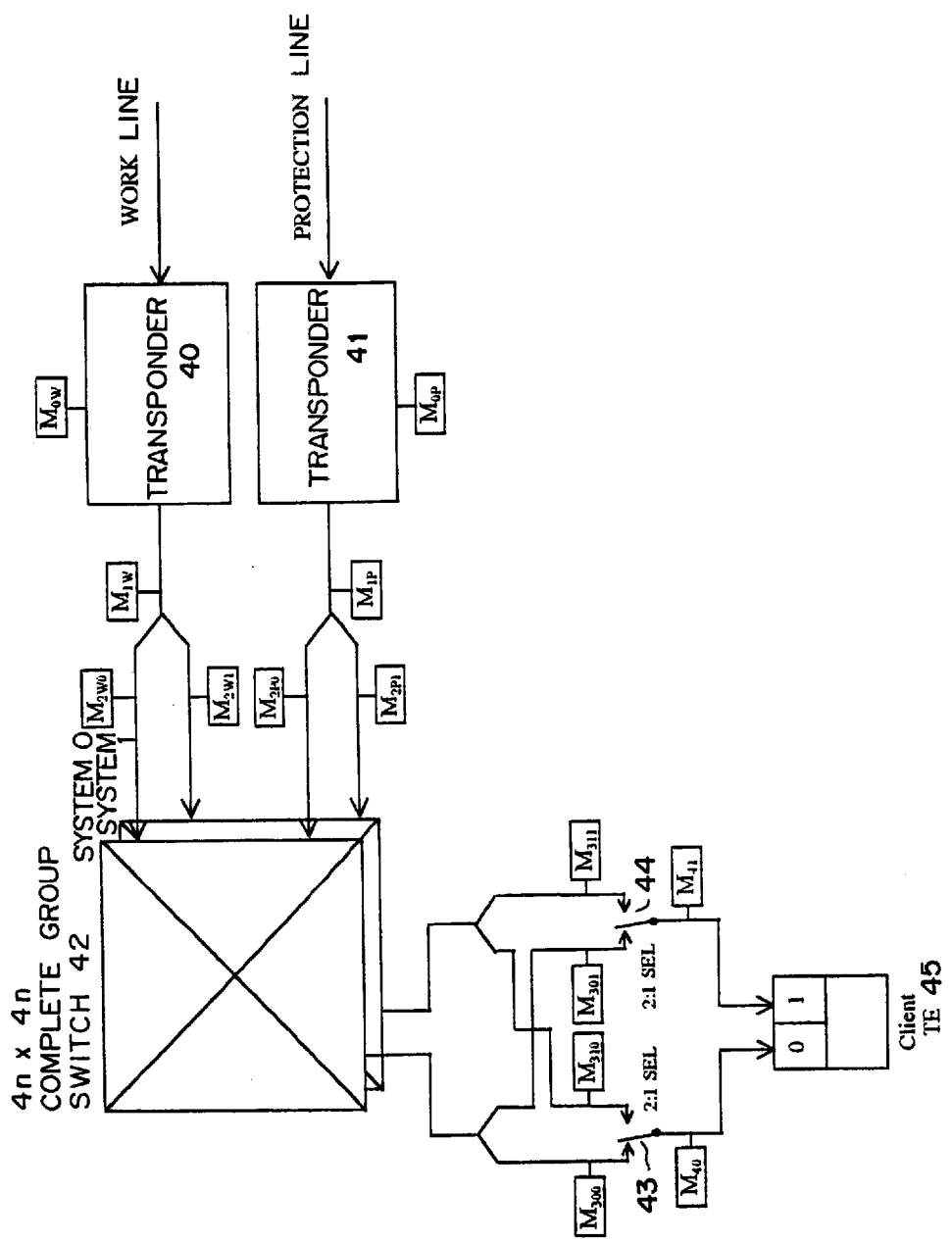
FIG. 16 shows the configuration of a monitor on the DROP side.

FIG. 16 shows the configuration of the monitor on the DROP side.

An $M_{OW}$ is an output monitor of a transponder 40, and $M_{1X}$, $M_{2XX}$, $M_{3XX}$, and $M_{4X}$ (X commonly indicates the subscript added to the name of the monitors shown in FIG. 16) are optical level monitors, have two thresholds, and the thresholds are similarly set.

The configuration is set such that a work line or a protection line can be used and the systems 0 and 1 of the 4n×4n complete group switch 20 can be switched for recovery from an error.

The FERF (far end received failure) stored in the header portion of the SDH frame of the optical signal from a network client (client TE, etc.) is used as a switch trigger. The FERF is a fault detecting byte stored in the SDH frame, and is used for detecting whether or not a fault has occurred by the client TE detecting the FERF contained in the header portion of the frame of the SDH.

A transponder optical output monitor, a missing transponder, a failure of a transponder can also be switch triggers, but they are not described here for simple explanation. When a device is practically designed, these switch triggers are to be considered, and they will be easily controlled by one of ordinary skill in the art.

The FERFs are retrieved from the headers of the signals input to transponders 40 and 41 to determine where or not there is a fault.

The signals output from the transponders 40 and 41 are input to an optical switch (4n×4n complete group switch) 42 of the systems 0 and 1. Then, they are dropped by the optical switch 42, and the signals from the optical switch 42 of the systems 0 and 1 are respectively input to the selectors 43 and 44. Selectors 43 and 44 are controlled by the control circuit not shown in the attached drawings, a signal input from any of the systems of the optical switch (4n×4n complete group switch) 42 is selected and output, and input to the device of the system 0 or the system 1 of the client TE45.

FIGS. 17 through 41 show switch determination tables.

The tables shown in FIGS. 17 through 41 can be used as those shown in FIGS. 11 through 15. For example, assume that the client TE45 of the system 0 detects a fault, and a switch trigger has occurred when a signal from the work line is input to the client TE45 of the system 0 by the 4n×4n complete group switch 42. In this case, in FIG. 17, the status is 1, and the detection and the determination by the monitor are performed by referring to FIGS. 18, 19, and 20. For example, when the status of the monitor is indicated by the number 1 as shown in FIG. 18, it is determined that there is a fault in the transmission line of the system 0 on the client TE45 side, the 2:1 selector 44 is connected to the 4n×4n complete group switch 42 of the system 0, the FERF monitor (not shown in the attached drawings) of the client TE45 is switched to the system 1, and the FERF monitor provided in the client TE analyzes the header of the frame of the SDH, and detects the FERF. Control is passed to the status 2 shown in FIG. 17. In the status 2 shown in FIG. 17, the fault determination and the destination of the control are determined by referring to FIGS. 21, 22, and 23. At this time, if the fault can be removed as a result of switching the FERF monitor into the system 1, then the fault determining process is not performed after the transfer of control to the status 2 shown in FIG. 17, but the communications are performed through the device of the system 1 of the client TE45.

In other cases, a fault is avoided by the method described above.

If all transmission lines between two nodes are faulty in a ring network, a signal flows through a standby line in the opposite direction. In this case, if the appliances connected to the primary line and standby line have become faulty, a significant signal is dropped. The redundancy is designed for an appliance to prevent the significant signal from being dropped. That is, if there is a standby appliance, then there is a small probability that both primary and standby appliances become faulty even if the primary appliance has become faulty. Therefore, since it is rare that the standby appliance is faulty when the primary appliance become faulty, a missing signal is avoided by switching the primary appliance to the standby appliance, thereby continuously providing a service.

Figure 42:
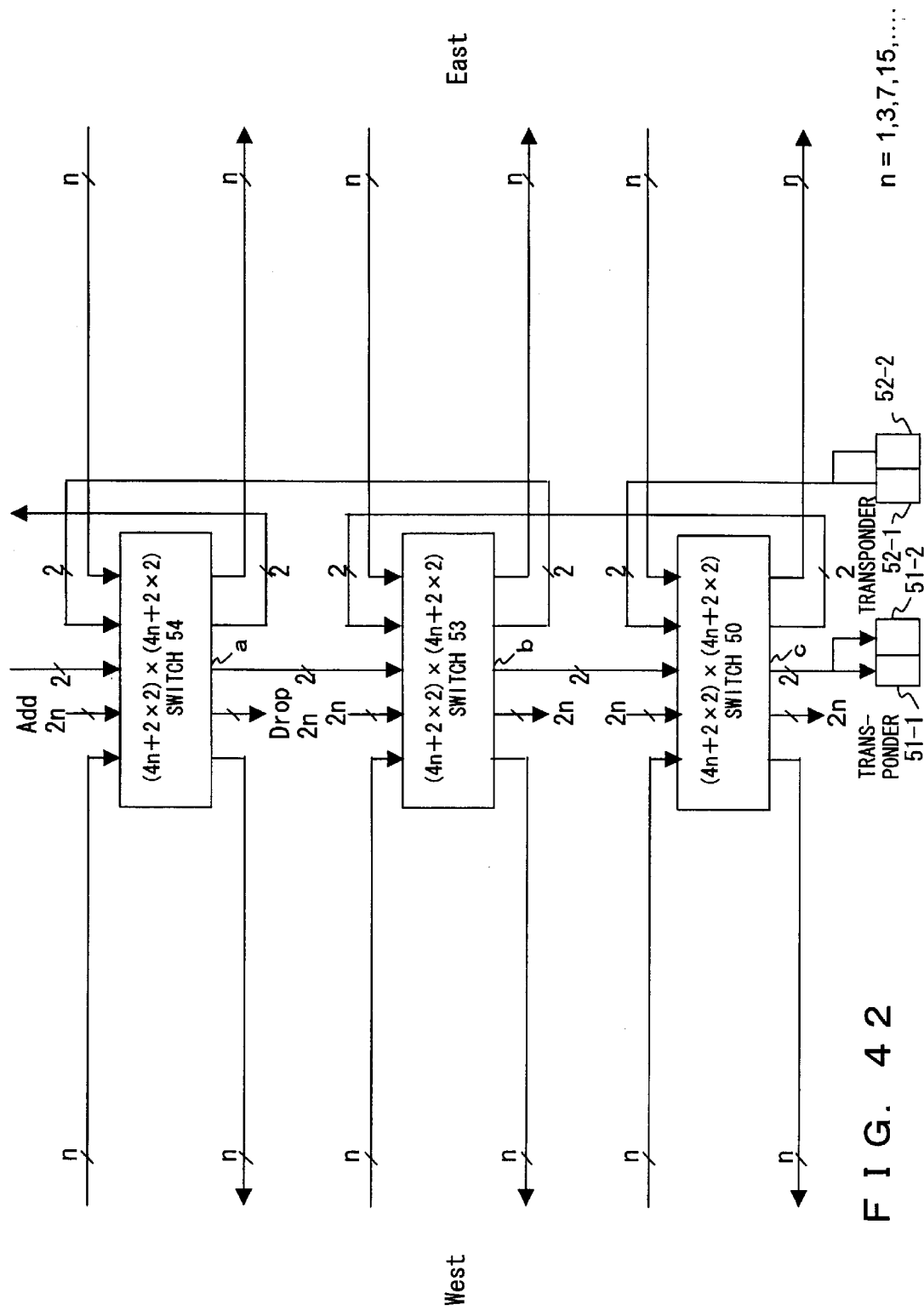
FIG. 42 shows an embodiment of the configuration of the switch realizing the redundancy of an appliance.

To realize the redundancy of an appliance in the above mentioned case, nodes are configured as shown in FIGS. 42 and 43. In a (4n+2s)×(4n+2s) complete group switch where s is 0 or a positive integer, primary lines and standby line are connected, and each switch is connected for a number of stages using ports other than those for ADD/DROP. As a result, k: 1 or k: 2 protection (k=n×number of complete group switches) can be realized.

Thus, by connecting a complete group switch for a number of stages, the number of trunk lines of a ring network can be increased.

FIG. 42 shows an embodiment of the configuration of a switch realizing the redundancy for an appliance.

In a (4n+2×2)×(4n+2×2) complete group switch for processing n (n=1, 3, 7, 15, . . . ) input/output ports for use between nodes, and 2n ADD/DROP ports, four inactive input/output ports are used for connection of each switch. Thus, the number of (4n+2×2)×(4n+2×2) switches can be increased, that is, extended.

In addition, two sets of transponders 51-1 through 52-2 for redundancy of appliances for transmission and reception are connected to each of the two input/output ports of a switch 50. Thus, when the redundancy of an appliance is designed simultaneously for the east side and the west side, a k: 1 protection can be realized. When the redundancy is designed for only one direction, k: 2 protection (k=n× number of complete group switches) can be realized. In the configuration for the redundancy of an appliance as described above, one extension is designed toward each of the west and east for k: 1 protection, or two extensions are designed toward the west or the east for k: 2 protection.

That is, when a fault occurs on the east side or the west side, the transponders 51-1 and 51-2 drop a line which cannot transmit signals, and output them from nodes. That is, if a fault occurs in an appliance connected to a line connected to a switch 54, for example, when the appliance is on the east side, then the signal input from the west side to the switch 54 is output from the port a, and input to a switch 53. This signal is output from the port b of the switch 53, and input to the switch 50. This signal is output from the port of the switch 50 is input to the transponder 51-1 or 51-2, and transmitted by bypassing a faulty device. Similarly, when there arises a fault with an appliance connected to a line connected to the switch 53, a bypassing signal is output from the port b, input to the switch 50, output from the port c, and input to the transponder 51-1 or 51-2. When the redundancy is designed toward both east and west, one of the transponders 51-1 and 51-2 is assigned to the east, and the other to the west.

The transponders 52-1 and 52-2 input signals transmitted along a redundancy line through the transponder 51-1 or 51-2 in another node to each switch for recovery to the original line. The signals output from the transponders 52-1 and 52-2 are sequentially input to the switches 50, 53, and 54, switched and connected when they are input to appropriate switches, and recover to the original line. In this example, a switch refers to a complete group switch as in the above mentioned embodiment.

Thus, in the k=n×(number of switches) lines, one redundancy path toward each of the east and west, or two redundancy paths toward the east or the west can be configured.

FIG. 43 shows another embodiment of the configuration of the switch realizing the redundancy appliance.

In a (4n+2×4)×(4n+2×4) complete group switch for processing n (n=2, 6, 14, . . . ) input/output ports between nodes, and 2n ADD/DROP ports, 8 inactive input/output ports are used for connection between switches.

To each of the four input/output ports of a switch 60, two sets of transponders 63-1 through 64-4 are connected for redundancy of appliances. Thus, when one redundancy line for an appliance is applied toward each of the east and the west, k: 2 protection is realized. When redundancy lines for appliances are simultaneously applied toward one of the east and the west, k: 4 protection (k=n×number of complete group switches) is realized.

In the present embodiment, the number of lines for transmission of a signal from each of the switches 60 through 62 to the transponders 63-1 through 63-4 is increased to four from two in the embodiment shown in FIG. 42. Furthermore, the number of lines for transmission of a signal from the transponders 64-1 through 64-4 to the switches 60 through 62 is increased to four from two of the above mentioned embodiment. Thus, k:j (j is a positive integer) protection can be realized by designing an improved scale of each complete group switch and configuring the switch containing a larger number of lines for the redundancy of an appliance. However, if the value j is too large, a required complete group switch also become too large. Therefore, in the present embodiment, the k: 2 protection toward each of the west and the east, or the k: 4 protection toward either west or east is realized.

In FIG. 42, n is set to 1, 3, 7, 15, . . . , and n is set to 2, 6, 14, . . . in FIG. 43 because the number of input/output ports is expressed in the power of 2, but it is not limited to this expression.

Figure 44:
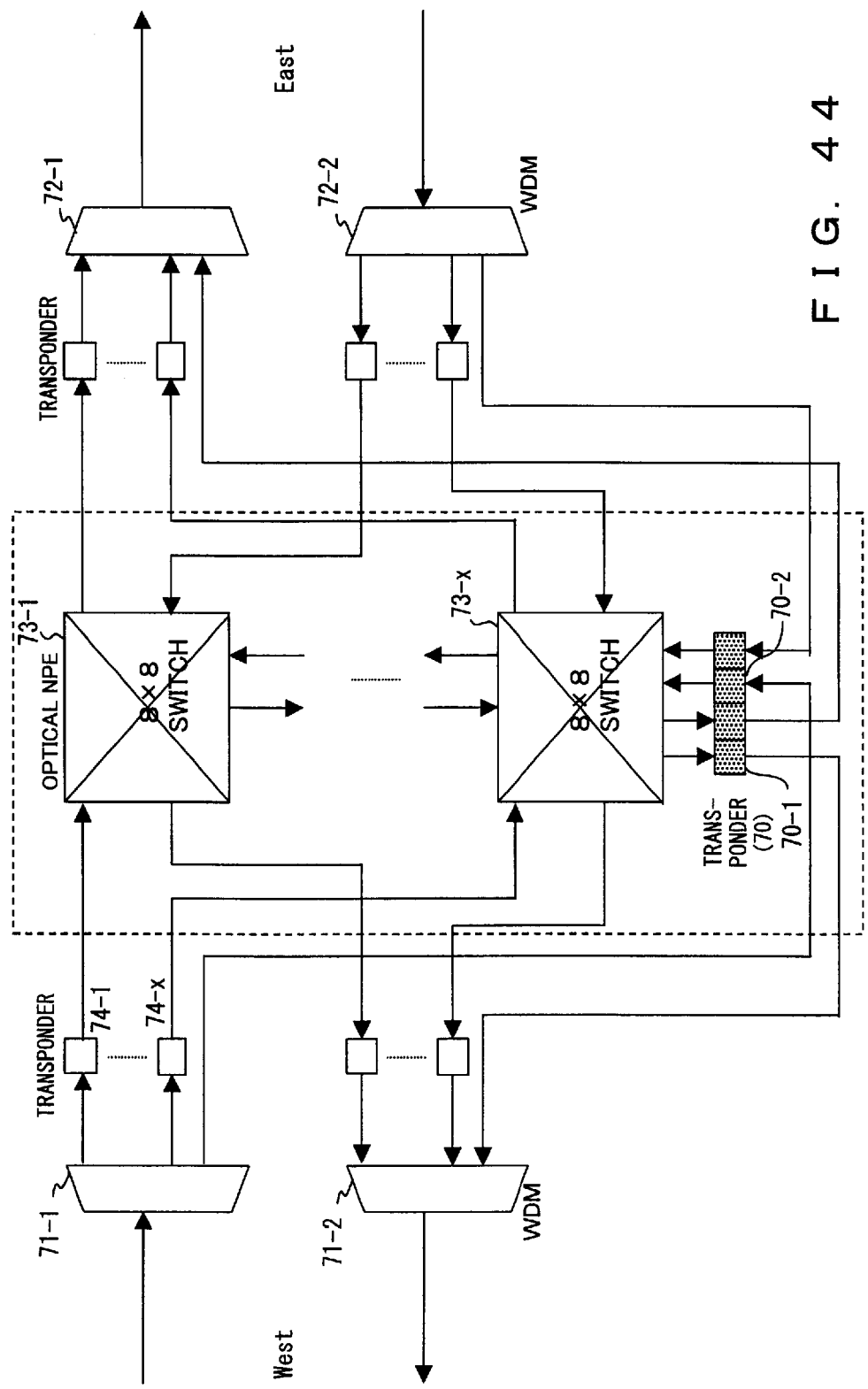
FIG. 44 shows an embodiment of the configuration of the protection device to which the configuration shown in FIG. 42 is practically applied.

FIG. 44 shows an embodiment of the configuration of the protection device to which the configuration shown in FIG. 42 is practically applied.

FIG. 44 shows an example of configuring an m: 1 (m indicates the number of wavelengths) protection simultaneously toward the east and the west of two fiber rings using an 8×8 complete group switch (n=1) and two appliance redundancy transmission/reception transponders 70. In FIG. 44, the configuration for AD·DROP is omitted.

A wavelength multiplexed optical signal to be input to a WDM (wavelength division multiplexer) 71-1 is demultiplexed into each wavelength by the WDM 71-1, and input to transponders 74-1 through 74-x. The signals of wavelengths output from the transponders 74-1 through 74-x are respectively input to 8×8 switches 73-1 through 73-x. When there is a fault on the east side and a signal having a wavelength which cannot be transmitted, the signal having the wavelength is transmitted from a corresponding 8×8 switch to a transponder 70-1. Then, it is input to a WDM 71-2, wavelength-multiplexed with other signals, and returned to the west side. A similar process is performed if the west side is faulty when a signal is transmitted from the east side. When a signal (signal having a wavelength for a redundancy line) is transmitted from the west side through a redundancy line, it is wavelength-demultiplexed by the WDM 71-1, and input to a transponder 70-2. Then, it is returned to the original line by an appropriate switch in the 8×8 switches 73-1 to 73-x, and transmitted to the east side. A similar process is performed when a signal is transmitted from the east side through a redundancy line.

Figure 45:
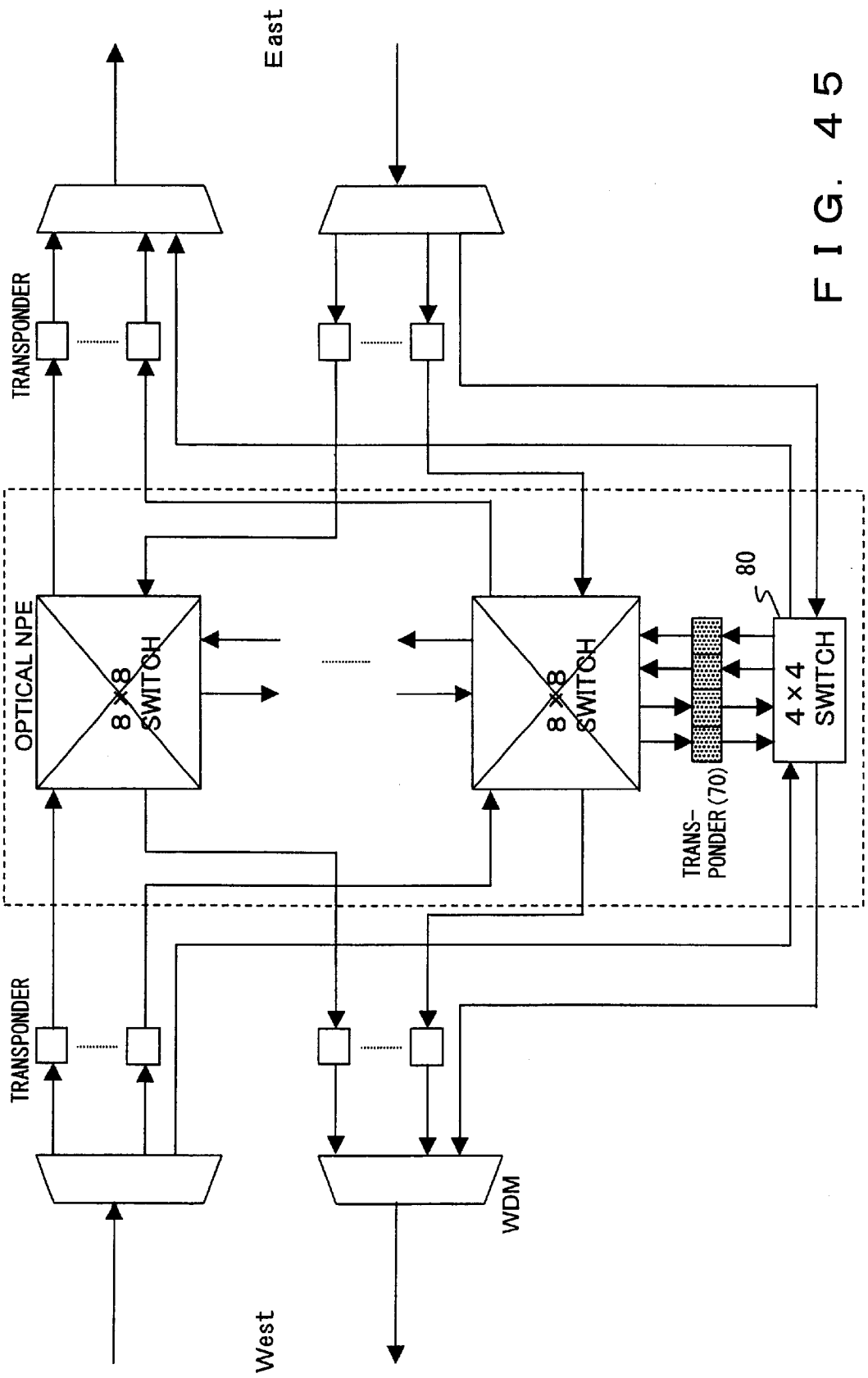
FIG. 45 shows another embodiment of the configuration of the protection device to which the configuration shown in FIG. 42 is practically applied.

FIG. 45 shows another embodiment of the configuration of the protection device to which the configuration shown in FIG. 42 is practically applied.

FIG. 45 shows another example of the configuration of the m: 1 (m=number of wavelengths) protection configured simultaneously on both east and west sides in a 2 fiber ring system using an n=1, 8×8 complete group switch, two appliance redundancy transmission and reception transponder 70, and a 4×4 complete group switch 80.

With the configuration shown in FIG. 44, a transponder for each direction is fixedly assigned, but, in this example, each transponder can be used in any direction using the 4×4 complete group switch 80.

Other units are the same as those shown in FIG. 44, and the detailed explanation is omitted here.

Figure 46:
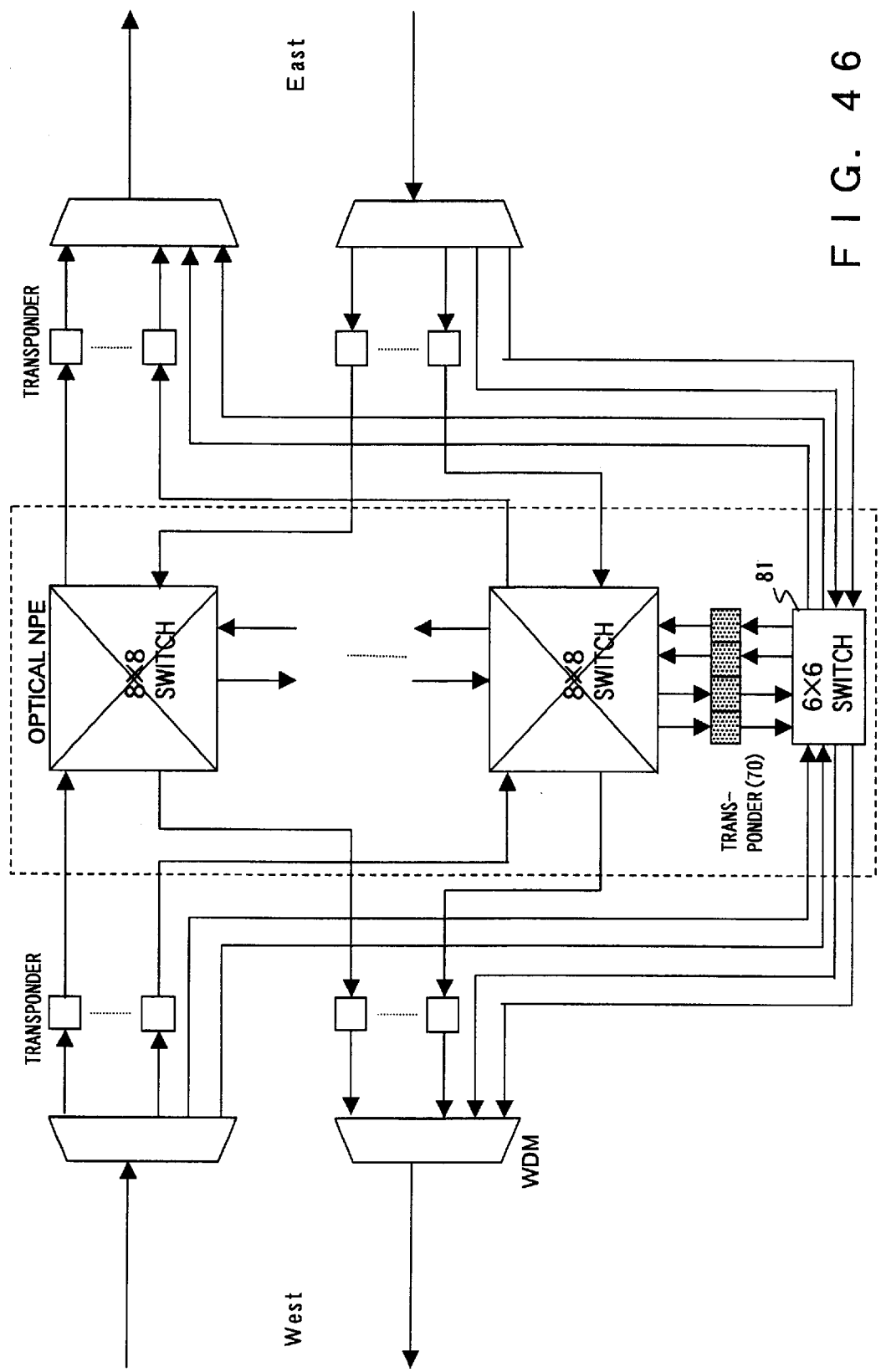
FIG. 46 shows a further embodiment of the configuration of the protection device to which the configuration shown in FIG. 42 is practically applied.

FIG. 46 shows a further embodiment of the configuration of the protection device to which the configuration shown in FIG. 42 is practically applied.

FIG. 46 shows an example of the configuration of the m: 2 (m=number of wavelengths) protection configured on one of the east and west sides in a 2 fiber ring system using an n=1, 8×8 complete group switch, two appliance redundancy transmission and reception transponder 70, and a 6×6 complete group switch 81.

Each transponder can be used in any direction using the 6×6 switch. Therefore, according to the embodiment shown in FIG. 44, one transmission/reception transponder 70 is used on the west side, and another transmission/reception transponder 70 is used on the east side. On the other hand, according to the present embodiment, a signal output from both transponders 70 can be switched and connected to either west or east side, and a redundancy signal input from the west or east side can be returned to the original line.

Other configurations are the same as the configurations shown in FIGS. 44 and 45, and the detailed explanation is omitted here.

FIG. 47 shows a further embodiment of the configuration of the protection device to which the configuration shown in FIG. 42 is practically applied.

FIG. 47 shows an example of the configuration of the m: 1 (m=number of wavelengths) protection configured simultaneously on both sides only for primary lines or on one of the east and west sides simultaneously for both primary and standby lines in a 4 fiber ring system using an n=3 (only 2 ports are actually used), 8×8 complete group switch, two appliance redundancy transmission and reception transponder 70, and a 6×6 complete group switch 85.

Using the 6×6 switch 85, each transponder can be used in either directions.

In FIG. 47, the transmission line comprises a primary system and a standby system. In this case, since two transmission/reception transponders 70 are provided for each of the transmitting and receiving systems, a pair of redundancy transmission/reception lines can be provided for either directions from the transmission/reception transponder 70 when both east and west sides are to be protected. Therefore, only the primary line can be provided with a redundancy configuration. When only one of the east and west sides is configured for redundancy, 2 pairs of redundancy transmission/reception lines can be provided in one direction with the configuration shown in FIG. 47. Therefore, both primary and standby systems can be configured for redundancy.

Since other configurations are basically the same as those of the embodiments shown in FIGS. 44, 45, and 46, the detailed explanation is omitted here.

Figure 48:
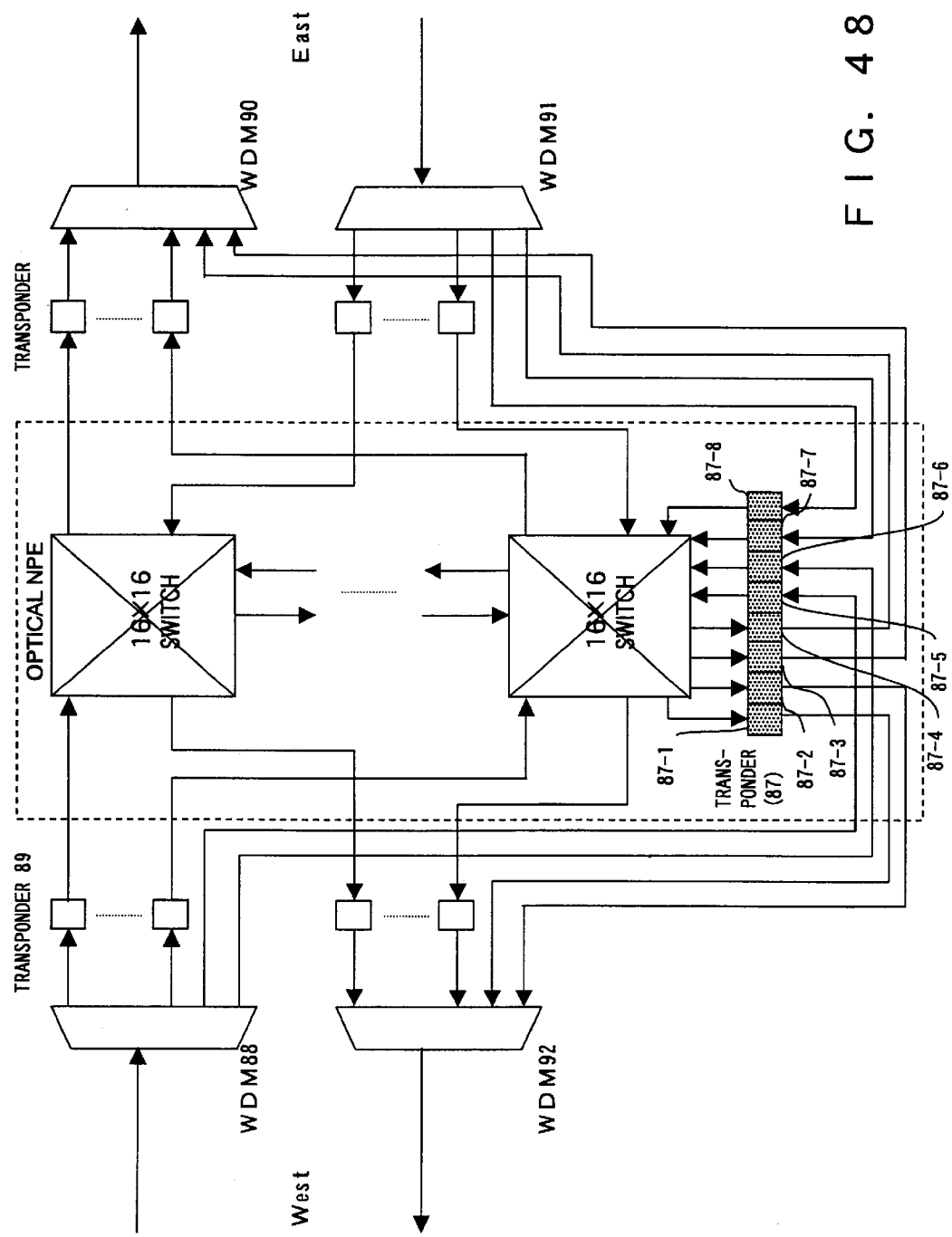
FIG. 48 shows an embodiment of the configuration of the protection device to which the configuration shown in FIG. 43 is practically applied.

FIG. 48 shows the embodiment of the configuration of the protection device to which the configuration shown in FIGS. 43 is practically applied.

FIG. 48 shows an example of the configuration of the m: 2 (m=number of wavelengths) protection configured simultaneously on both east and west sides in a 2 fiber ring system using an n=2 (only 1 port is actually used), 16×16 complete group switch, and four appliance redundancy transmission and reception transponder 87.

In FIG. 48, a wavelength-multiplexed signal input from the west side is demultiplexed into optical signals having respective wavelengths by a WDM 88, and input to each transponder 89. In addition, the wavelength for redundancy line is also demultiplexed, and input to transponders 87-5 and 87-6. Thus, the demultiplexed signals of the redundancy line are switched and connected, and output from a WDM 90. In the signals input from a WDM 91, signals having wavelengths to be switched and connected for protection are switched and connected in any of the 16×16 switches, and output to transponders 87-1 and 87-2. The optical signals output from these transponders are wavelength-multiplexed by a WDM 92, and output. Since the operations are similarly performed in the opposite direction, the explanation is omitted here.

Thus, two redundancy lines can be configured on both east and west sides for the number of wavelengths by configuring the protection device as shown in FIG. 48 based on the configuration shown in FIG. 43.

Figure 49:
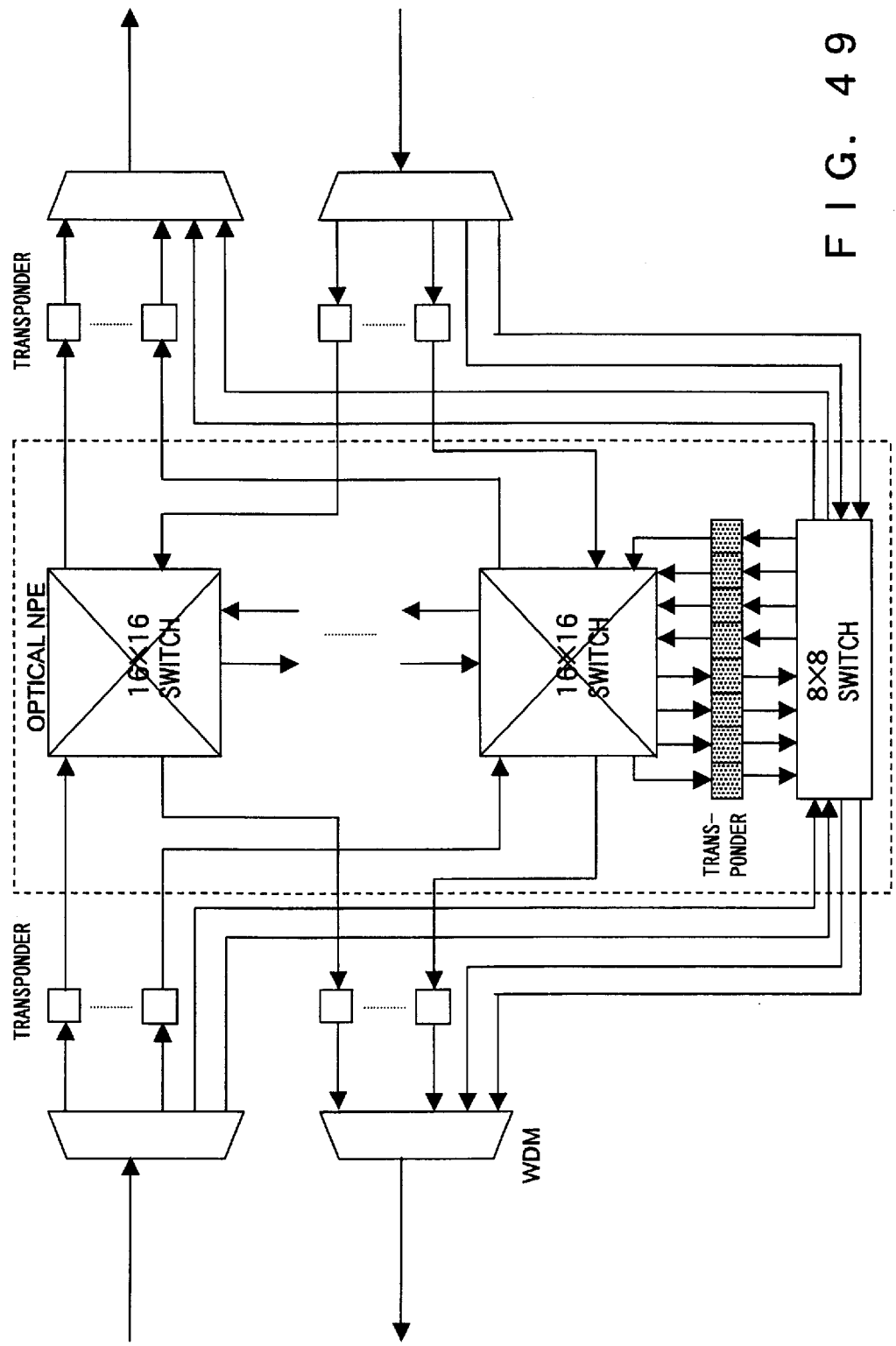
FIG. 49 shows another embodiment of the configuration of the protection device to which the configuration shown in FIG. 43 is practically applied.

FIG. 49 shows another embodiment of the configuration of the protection device to which the configuration shown in FIG. 43 is practically applied.

FIG. 49 shows an example of the configuration of the m: 2 (m=number of wavelengths) protection configured simultaneously on both east and west sides in a 2 fiber ring system using an n=2 (only 1 port is actually used), 16×16 complete group switch, four appliance redundancy transmission and reception transponder, and an 8×8 complete group switch.

According to the present embodiment, each transponder can be used on either directions by using an 8×8 switch. Therefore, the present embodiment is the same as the embodiment shown in FIG. 45 except that the present embodiment has four redundancy lines. Therefore, the detailed explanation is omitted here.

Figure 50:
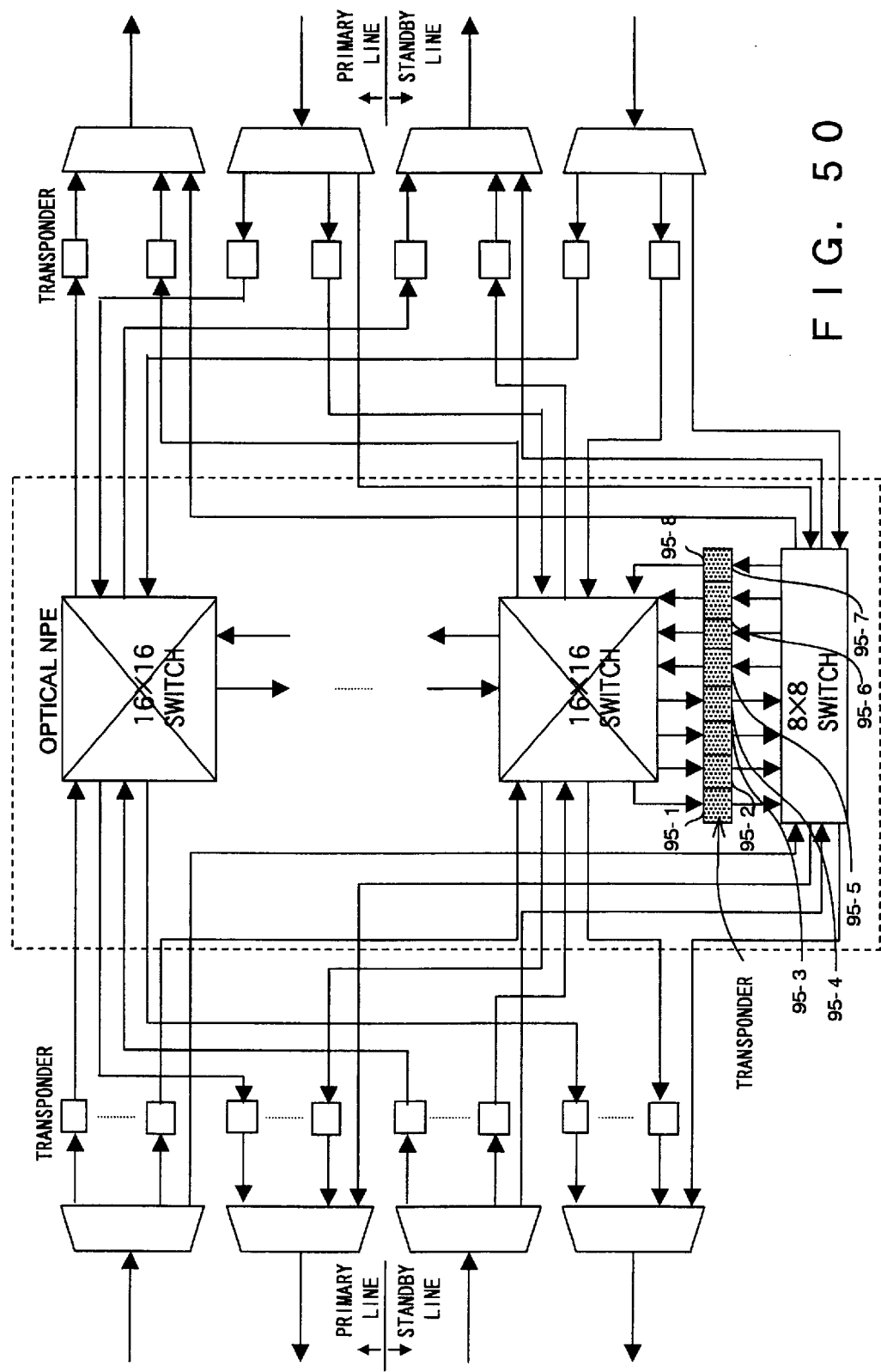
FIG. 50 shows a further embodiment of the configuration of the protection device to which the configuration shown in FIG. 43 is practically applied.

FIG. 50 shows another embodiment of the configuration of the protection device to which the configuration shown in FIG. 43 is practically applied.

FIG. 50 shows an example of the configuration of the m: 1 (m=number of wavelengths) protection configured simultaneously on both east and west sides and for both primary and standby systems in a 4 fiber ring system using an n=2, 16×16 complete group switch, four appliance redundancy transmission and reception transponder, and an 8×8 complete group switch.

Using an 8×8 switch, each transponder can be used in either directions. That is, each of transponders 95-1 to 95-4 is assigned to a redundancy line of the primary and standby systems on the west and east sides using an 8×8 switch, and each of transponders 95-5 to 95-8 is assigned to a redundancy line of the primary and standby systems on the west and east sides using an 8×8 switch. Thus, an m: 1 protection can be provided simultaneously for primary and standby systems on both west and east directions.

Figure 51:
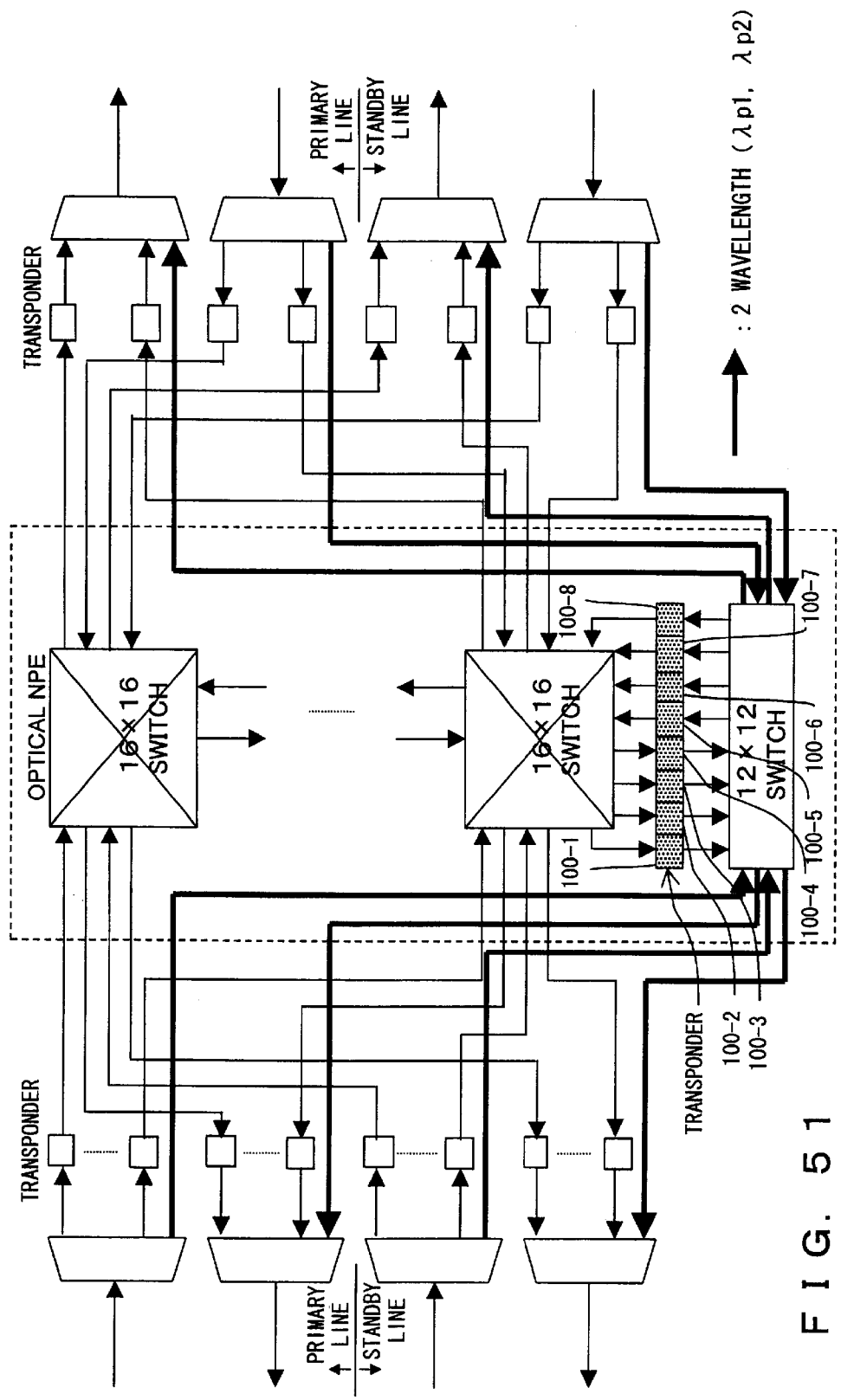
FIG. 51 shows a further embodiment of the configuration of the protection device to which the configuration shown in FIG. 43 is practically applied.

FIG. 51 shows another embodiment of the configuration of the protection device to which the configuration shown in FIG. 43 is practically applied.

FIG. 51 shows an example of the configuration of the m: 2 (m=number of wavelengths) protection configured only for a primary system, on both east and west sides, or for both primary and standby systems in a 4 fiber ring system using an n=2, 16×16 complete group switch, four appliance redundancy transmission and reception transponder, and a 12×12 complete group switch.

Using a 13×12 switch, each transponder can be used in either directions.

In FIG. 51, bold lines indicate that a two-wavelength optical signal is input to the 12×12 switch, but actually indicate two 1-wavelength lines.

In FIG. 51, using a 12×12 switch, an m: 2 protection can be configured by allotting transponders 100-1 to 100-4 only for the primary system on both west and east sides, and by using transponders 100-5 to 100-8 for input of a signal from both west and east sides. In addition, when a protection device is configured simultaneously for both primary and standby systems on either east or west direction, an m: 2 protection device can be configured by connecting the transponders 100-1 to 100-8 to either west or east side.

The above mentioned configurations are not limited to a 2 or 4 fiber rings, but any number of multifiber ring appliance redundancy can be realized.

In addition, when an unused port of a (4n+2s)×(4n+2s) switch (s=0 or a positive integer) is not only used for the redundancy of an appliance, but also used as an ADD or DROP port, for example, a signal from another ring network can be accommodated in any ring of a multifiber ring.

In addition, when an unused port of a (4n+2s)×(4n+2s) switch (s=0 or a positive integer) is not only used for the redundancy of an appliance, but also used as a test signal transmission/reception port, it can be used for a circuit test of any fiber ring.

Figure 52:
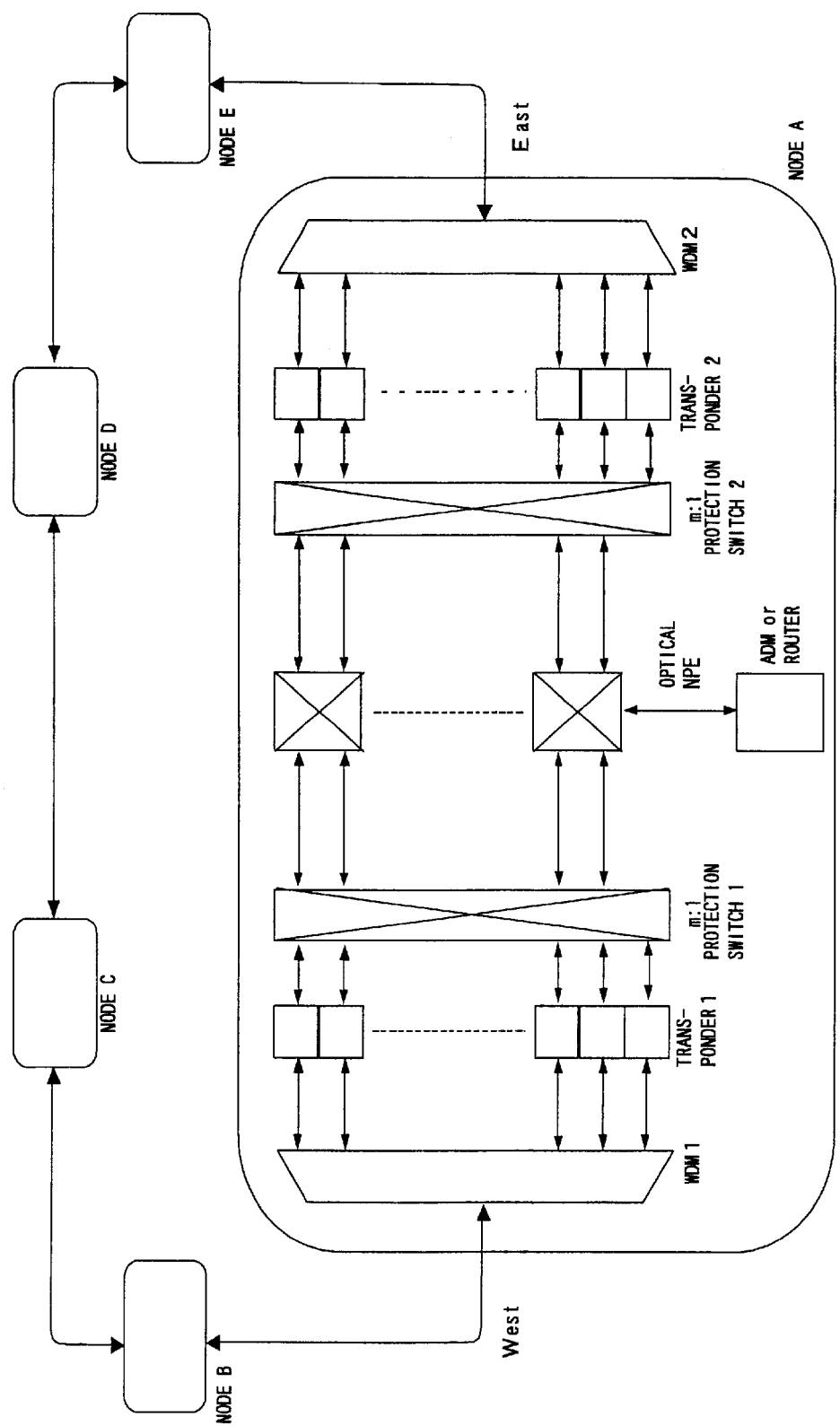
FIG. 52 shows the entire network including the embodiments shown in FIGS. 42 through 51.

FIG. 52 shows the entire network including the embodiments shown in FIGS. 42 through 51.

As shown in FIG. 52, a network has the configuration in which nodes A through E are connected as a ring through a transmission line. The configuration of each node is indicated by the node A.

For example, each node wavelength-demultiplexes using the WDM 1 a wavelength multiplexed signal received from the west side into signals of respective wavelengths. An optical signal of each wavelength is input to the transponder 1, and a signal is reproduced. Then, it is input to an m: 1 (or m: 2, m: 4) protection switch 1 shown in FIGS. 42 through 51. In the protection switch 1, as described above, the m: 1, m: 2, or m: 4 redundancy appliance is designed as described above. An optical signal output from the protection switch 1 is then input to the optical NPE for redundancy of a line. A signal to be dropped is transmitted to an ADM or a router. A signal to be added is input from an ADM or a router to an optical NPE. The optical signal output from the optical NPE is furthermore, input to an m: 1, m: 2, or m: 4 protection switch 2. The configurations shown in FIGS. 42 through 51 can be applied to this protection switch 2. The signal output from the protection switch 2 is input to the transponder 2, a signal is reproduced, and it is wavelength-multiplexed by the WDM 2 and output.

A flow of a signal from the east side to the west side is realized in the same method as the above mentioned process, and the detailed explanation is omitted here.

The description of the embodiments according to the present invention is based on the complete group switch, but these optical switches can be replaced with electric switches.

According to the present invention, a protection function is not incorporated into an ADM device, but a single complete group switch is used. Therefore, a simple and less expensive configuration can be provided for realizing and adding an extensible protection switch.

What is claimed is:

1. An optical node system, comprising:
    a first node having a first switch for switching each of a plurality of optical input channels, outputting lights from a plurality of optical output channels, and containing optical switching ports larger in number than the optical input channels and the optical output channels; and
    a second node having a second switch for switching each of a plurality of optical input channels, outputting lights from a plurality of optical output channels, and containing optical switching ports larger in number than the optical input channels and the optical output channels, wherein:

an output port of the second switch having no optical output channel is connected to an input port of the first switch; and an output port of the first switch having no optical output channel is connected to an input port of the second switch.

2. The system according to claim 1, wherein said switch is a complete group switch.

3. The system according to claim 2, wherein said complete group switch is connected to multiple stages.

4. The system according to claim 3, further comprising a transponder reproducing a signal, wherein a standby network appliance is connected to said transponder.

5. The system according to claim 1, wherein each switch allows switching between any of the input channels and any of the output channels.

6. An optical node system, comprising:

a first node having a first switch for switching each of a plurality of optical input channels, outputting lights from a plurality of optical output channels, and containing optical switching ports larger in number than the optical input channels and the optical output channels; and a second node having a second switch for switching each of a plurality of optical input channels, outputting lights from a plurality of optical output channels, and containing optical switching ports larger in number than the optical input channels and the optical output channels, wherein:

an output port of the second switch having no optical output channel is connected to an input port of the first switch; and an output port of the first switch having no optical output channel is connected to an input port of the second switch, wherein each said switch is a complete group switch, wherein said complete group switch is connected to multiple stages, and wherein said complete group switch comprises (4n+2s)×(4n+2s) complete group switches where n is a number of input and ports of an optical node, and s is any positive integer, said complete group switches are connected using 2n trunk line input ports, 2n trunk line output ports, 2n add input ports, 2n drop output ports, and 2s input and output ports, and a transponder for reproducing a signal is provided in the input/output ports used for connecting said complete group switches.

7. The system according to claim 6, further comprising a wavelength demultiplexer wavelength-demultiplexing a wavelength-multiplexed signal into signals of respective wavelengths, wherein after reproducing a signal for each wavelength, the signal is input to said complete group switch.

8. The system according to claim 7, wherein at least one of wavelength-multiplexed signals is used for a standby line.

9. A method of connecting an optical node system, comprising:

providing an optical switch switching each of a plurality of optical input channels, and outputting a light from a plurality of optical output channel; and providing a node in which an input/input port of the optical switch comprises, in an input/output unit, switching ports larger in number than the optical input channels and the optical output channels; and wherein when a node of another network is connected to the node, output ports of an optical switch of the node having no optical output channels are connected to an input port of the optical switch of the node of the other network, and input ports of an optical switch of the node having no optical input channels are connected to an output port of the optical switch of the node or the other network.

10. The method according to claim 9, wherein said switch allows switching between any of the optical input channels and the optical output channels.

11. An optical node system, comprising:

a first node having a first switch for switching each of a plurality of optical input channels, outputting signals from a plurality of output channels, and containing switching ports larger in number than the input channels and the output channels; and a second node having a second switch for switching each of a plurality of input channels, outputting signals from a plurality of output channels, and containing switching ports larger in number than the input channels and the output channels, wherein:

an output port of the second switch having no output channel is connected to an input port of the first switch; and an output port of the first switch having no output channel is connected to an input port of the second switch.

12. The system according to claim 11, wherein each switch allows switching between any of the input channels and the output channels.

13. A method of connecting a node system, comprising:

providing a switch switching each of a plurality of input channels, and outputting a signal from a plurality of output channels;

providing a node in which an input/input port of the switch comprises, in an input/output unit, switching ports larger in number than the input channels and the output channels;

when a node of another network is connected to the node, output ports of a switch of the node having no output channels are connected to an input port of the switch of the node of the other network, and input ports of a switch of the node having no input channels are connected to an output port of the switch of the node or the other network.

14. The method according to claim 13, wherein said switch allows switching between any of the input ports and any of the output ports.

15. A method of connecting a node system, comprising:

providing a first switch for switching each of a plurality of optical input channels, outputting lights from a plurality of optical output channels, and containing optical switching ports larger in number than the optical input channels and the optical output channels;

providing a second switch for switching each of a plurality of optical input channels, outputting lights from a plurality of optical output channels, and containing optical switching ports larger in number than the optical input channels and the optical output channels;

connecting an output port of the second switch having no optical output channel to an input port of the first switch; and connecting an output port of the first switch having no optical output channel to an input port of the second switch.

16. The method according to claim 15, wherein each switch allows switching between any of the optical input channels and the optical output channels.

* * * * *